US012404717B2

(12) United States Patent
Smith et al.

(10) Patent No.: US 12,404,717 B2
(45) **Date of Patent: *Sep. 2, 2025**

(54) CORDLESS RETRACTABLE ROLLER SHADE FOR WINDOW COVERINGS

(71) Applicant: Hunter Douglas Inc., New York, NY (US)

(72) Inventors: Stephen P. Smith, Denver, CO (US); Kent A. Smith, Broomfield, CO (US); Galen B. Rhodes, Henderson, CO (US); Stephen M. Winters, Erie, CO (US); Kenneth M. Faller, Thornton, CO (US)

(73) Assignee: Hunter Douglas Inc., New York, NY (US)

(*) Notice: Subject to any disclaimer, the term of this patent is extended or adjusted under 35 U.S.C. 154(b) by 294 days.

This patent is subject to a terminal disclaimer.

(21) Appl. No.: 18/089,254

(22) Filed: Dec. 27, 2022

(65) Prior Publication Data

US 2023/0138944 A1 May 4, 2023

Related U.S. Application Data

(63) Continuation of application No. 17/152,005, filed on Jan. 19, 2021, now Pat. No. 11,566,469, which is a (Continued)

(51) Int. Cl.

*E06B 9/32* (2006.01)
*E06B 9/24* (2006.01)

(Continued)

(52) U.S. Cl.

CPC ................ *E06B 9/322* (2013.01); *E06B 9/24* (2013.01); *E06B 9/262* (2013.01); *E06B 9/264* (2013.01);

(Continued)

(58) Field of Classification Search

CPC . E06B 9/322; E06B 9/24; E06B 9/262; E06B 9/264; E06B 9/38; E06B 9/40;

(Continued)

(56) References Cited

U.S. PATENT DOCUMENTS

| | | | |
|---|---|---|---|
| 778,660 | A | 12/1904 | Hadden |
| 1,416,071 | A | 5/1922 | Smurr |

(Continued)

FOREIGN PATENT DOCUMENTS

| | | | |
|---|---|---|---|
| CN | 101641488 | A | 2/2010 |
| DE | 20 2009 001 070 | U1 | 4/2009 |

(Continued)

OTHER PUBLICATIONS

Opposition filed Nov. 22, 2017 in related Japanese Patent No. 6145093 (71 pages).

(Continued)

*Primary Examiner* — Beth A Stephan

(74) *Attorney, Agent, or Firm* — Dority & Manning, P.A.

(57) ABSTRACT

A cordless retractable shade including an operating system for the shade that varies a biasing force of a spring to counterbalance the shade. The bottom rail of a retractable shade can be raised or lowered, and due to the operating system remains in any selected position of the covering between fully extended and fully retracted, without the use of operating cords. The system includes a method of negating and reversing the spring bias effect at a strategic position whereby the flexible vanes of the shade can be adjusted between open and closed.

31 Claims, 61 Drawing Sheets

Related U.S. Application Data continuation of application No. 16/042,995, filed on Jul. 23, 2018, now Pat. No. 10,907,406, which is a continuation of application No. 15/155,304, filed on May 16, 2016, now Pat. No. 10,030,439, which is a continuation of application No. 14/240,304, filed as application No. PCT/US2012/052514 on Aug. 27, 2012, now Pat. No. 9,353,570.

(60) Provisional application No. 61/527,820, filed on Aug. 26, 2011.

(51) Int. Cl.

| | |
|---|---|
| ***E06B 9/262*** | (2006.01) |
| ***E06B 9/264*** | (2006.01) |
| ***E06B 9/322*** | (2006.01) |
| ***E06B 9/38*** | (2006.01) |
| ***E06B 9/40*** | (2006.01) |
| ***E06B 9/44*** | (2006.01) |
| ***E06B 9/56*** | (2006.01) |
| ***E06B 9/80*** | (2006.01) |
| ***E06B 9/90*** | (2006.01) |

(52) U.S. Cl.
CPC .................. *E06B 9/38* (2013.01); *E06B 9/40* (2013.01); *E06B 9/44* (2013.01); *E06B 9/56* (2013.01); *E06B 9/80* (2013.01); *E06B 9/90* (2013.01); *E06B 2009/2435* (2013.01)

(58) Field of Classification Search
CPC ..... E06B 9/44; E06B 9/56; E06B 9/80; E06B 9/90; E06B 2009/2435
See application file for complete search history.

(56) References Cited

U.S. PATENT DOCUMENTS

| | | | | |
|---|---|---|---|---|
| 1,786,512 | A | 12/1930 | Whitworth | |
| 4,346,749 | A | 8/1982 | Singletary et al. | |
| 4,427,050 | A | 1/1984 | Toppen | |
| 5,078,198 | A | 1/1992 | Tedeschi | |
| 5,437,324 | A | 8/1995 | Sternquist | |
| 5,996,923 | A | 12/1999 | Junquera | |
| 6,467,714 | B1 | 10/2002 | Rasmussen | |
| 6,470,951 | B1 | 10/2002 | Tao | |
| 6,782,938 | B2 | 8/2004 | Colson et al. | |
| 7,546,866 | B2 | 6/2009 | Strand et al. | |
| 7,549,455 | B2 | 6/2009 | Harper et al. | |
| 8,186,413 | B2 | 5/2012 | Fujita et al. | |
| 8,210,230 | B2 | 7/2012 | Glasi | |
| 8,662,139 | B2 | 3/2014 | Anthony et al. | |
| 8,752,607 | B2 | 6/2014 | Anderson et al. | |
| 8,800,633 | B2 | 8/2014 | Mullet et al. | |
| 8,807,196 | B2 | 8/2014 | Mullet et al. | |
| 9,353,570 | B2 | 5/2016 | Smith et al. | |
| 11,566,469 | B2 * | 1/2023 | Smith | E06B 9/264 |
| 2001/0001414 | A1 | 5/2001 | Colson et al. | |
| 2002/0189771 | A1 | 12/2002 | Colson et al. | |
| 2004/0182526 | A1 | 9/2004 | Strand et al. | |
| 2005/0269041 | A1 | 12/2005 | Anderson et al. | |
| 2006/0137837 | A1 | 6/2006 | Costello et al. | |
| 2006/0162876 | A1 | 7/2006 | Kwak | |
| 2008/0223532 | A1 | 9/2008 | Auger | |
| 2009/0223641 | A1 | 9/2009 | Cheng | |
| 2010/0018656 | A1 | 1/2010 | Fujita et al. | |
| 2010/0122780 | A1 | 5/2010 | Cheng | |
| 2014/0096920 | A1 | 4/2014 | Macdonald | |
| 2014/0216666 | A1 | 8/2014 | Smith et al. | |
| 2015/0082706 | A1 | 3/2015 | Rejc | |

FOREIGN PATENT DOCUMENTS

| | | | |
|---|---|---|---|
| JP | H03-16400 | Y2 | 4/1991 |
| JP | H0-6559 | Y2 | 1/1994 |
| JP | HEI 8-028168 | A | 1/1996 |
| JP | HEI 8-049484 | A | 2/1996 |
| JP | 2004-238827 | A | 8/2004 |
| JP | 2006-257865 | A | 9/2006 |
| JP | 4017040 | B1 | 12/2007 |
| JP | 2009-102916 | A | 5/2009 |
| JP | 2009-155892 | A | 7/2009 |
| JP | 4355741 | B2 | 11/2009 |
| JP | 2011-038340 | A | 2/2011 |
| TW | M322459 | U | 11/2007 |

OTHER PUBLICATIONS

English translation of Opposition filed Nov. 22, 2017 in related Japanese Patent No. 6145093 (93 pages).

English translation of Office Action issued in related Japanese Patent Application No. 2016-230841 (3 pages).

PCT International Search Report and Written Opinion dated Nov. 6, 2012, PCT Application No. PCT/US2012/052314, 15 pages.

Office Action dated Aug. 13, 2018, issued in related Taiwanese Patent Application No. 106116777, 8 pages.

List of Patents or Patent Applications Treated as Related dated Dec. 27, 2022, 2 pages.

* cited by examiner

CORDLESS RETRACTABLE ROLLER SHADE FOR WINDOW COVERINGS

CROSS REFERENCE TO RELATED APPLICATIONS

The application is a continuation of U.S. application Ser. No. 17/152,005 filed Jan. 19, 2021, which is a continuation of U.S. application Ser. No. 16/042,995 filed Jul. 23, 2018, now U.S. Pat. No. 10,907,406, issued Feb. 2, 2021, which is a continuation of U.S. application Ser. No. 15/155,304, filed May 16, 2016, now U.S. Pat. No. 10,030,439, issued Jul. 24, 2018, which is a continuation of U.S. application Ser. No. 14/240,304, filed Feb. 21, 2014, now U.S. Pat. No. 9,353,570, issued May 31, 2016, which is a 371 of international patent application No. PCT/US2012/052514, filed Aug. 27, 2012, which claims the benefit of priority under 35 U.S.C. § 119(e) to U.S. Application No. 61/527,820, filed Aug. 26, 2011, which are hereby incorporated by reference in their entireties.

TECHNICAL FIELD

The present disclosure relates generally to retractable shades for architectural openings and more particularly to such a shade that does not include operating or lift cords, but rather is operable between selected extended conditions of the shade by manual movement of the bottom rail of the shade.

BACKGROUND

Retractable shades have been popular for many years and generally extend across or are retracted from covering architectural openings such as windows, doorways, archways, and the like. Such retractable coverings may include a roller rotatably supported with a shade material suspended therefrom. The shade material can either be wrapped about the roller when retracting the shade or unwrapped from the roller when extending the shade.

Some retractable coverings such as Venetian blinds do not have a shade material that wraps around or unwraps from a roller, but rather a rotatable shaft in the head rail that is adapted to wrap or unwrap lift cords thereabout. The lift cords generally may extend downwardly through the slats of the blind to a bottom rail to raise or lower the bottom rail when retracting or extending the blind.

Many retractable coverings are operated with flexible operating cords which may extend, for example, downwardly through the shade material to the bottom rail of the covering from the head rail and be operated from free ends of the cords. The free ends of the cords may be exposed adjacent to one end of a head rail for manipulation of an operator.

Operating and pull cords can be an issue with retractable coverings, as in some instances the cords may become tangled and difficult to use, fray or break, damage the covering from repeated wear, and may sometimes form loops that may present a risk to users.

SUMMARY

The cordless retractable shade of the present disclosure includes an operating system that applies a counterbalancing force to support the shade element at any level of extension selected by the user. Where the shade includes operable vanes, the operating system may also include a vane orientation mechanism. The vane orientation mechanism allows the user to position the vanes in an open orientation, or in a closed orientation.

The present disclosure includes an operating system configured to act on a collapsible shade element rotatably positioned in a head rail. The collapsible shade element is connected along its upper edge to the roller for wrapping about and unwrapping therefrom. The shade material includes vertically suspended front and rear sheets of flexible translucent or transparent material, such as sheer fabric, and a plurality of horizontally extending, vertically spaced flexible vanes preferably of a translucent or opaque material. The vanes are secured along front and rear edges to the front and rear sheets along horizontal lines of attachment. The front and rear sheets are attached to the roller at circumferentially spaced locations so that pivotal movement of the roller moves the front and rear sheets vertically relative to each other to shift or rotate the vanes gradually between closed and open positions.

In the closed position the front and rear sheets are spaced close together and the depth dimension of vanes are aligned generally parallel to or along the direction of the front and rear sheets. When positioned in an architectural opening, the depth dimension of the closed vanes would extend generally vertically in coplanar contiguous relationship with the front and rear sheets. In the open position, the front and rear sheets are spaced apart by a distance defined by the depth of the vanes, and the vanes are generally perpendicular to the front and rear sheets. When positioned in an architectural opening, the depth dimension of the open vanes would extend generally horizontally. The vanes are in the closed position when wrapped around the roller, and when extended from the roller to the fully extended position.

A bottom rail may be secured to the lower edge of the shade element with bottom edges of the front and rear sheets of the shade material secured along front and rear edges of the bottom rail.

An operating system is provided that includes a biasing element (or also a biasing component) operably engaged between the head rail and the roller to apply a counterbalancing force to the roller that allows the shade element to be positioned in any location between fully retracted and fully extended. The configuration of the operating system is designed to increase the tension in the biasing element (i.e. increase the spring load where a spring is utilized), as the roller is rotated in the direction to extend the shade element. This increased load in the bias element is then converted by the operating system to apply a rotational force to the roller in the direction of retracting the shade element. To do this, in the operating system the bias element is operably engaged between the head rail and the roller in order to convert the load in the bias element into a rotational bias applied to the roller. The operating system could be oriented to create the operating bias in the direction of extension if desired.

The rotational bias applied to the roller is a counterbalancing force to compensate for the increasing weight of the shade as the shade extends. The force increases with the extension of the shade because the bias element in the operating system develops an increasing load as the shade extends. As the shade retracts, the load on the bias element decreases and the rotational bias force decreases. The counterbalancing force created in the operating system may be set to fully support the shade element in any position, or it may be set to have a greater or lesser level. In some scenarios, the counterbalancing force co-acts with the friction in the operating system to combine together to provide sufficient rotational force to support the shade in any position of extension. The operating system may apply a slight rotational bias to the roller in the fully retracted position.

A vane orientation stop structure is another aspect of the disclosure that may either be used independent of or in combination with the operational system described herein. The vane orientation stop structure operates on the fully extended shade element to allow the vanes to be positioned in at least a fully opened position even where the rotational bias of the operating system is acting on the roller. The vane orientation stop structure may be implemented in the operating system and specifically in conjunction with the drive mechanism.

In one example of the operating system, the biasing component is a spring motor in the form of a coil spring positioned inside the roller to extend along a portion of the roller's length. One end of the coil spring is operably connected to the roller at a fixed location for unitary rotation therewith. An opposite end of the coil is movably connected to the roller for unitary rotation with the roller and reversible translation along the length of the roller. The movable end of the coil spring is driven or moved by a drive system or drive mechanism that includes a longitudinally extending threaded shaft fixed to the head rail so that the roller can rotate thereabout. A nut connected to the movable end of the coil spring is operably mounted on the threaded shaft for reversibly translatable movement along the length of the threaded shaft upon rotation of the roller. As the roller rotates, the nut moves along the threaded length of the shaft and also along the length of the roller. Movement of the nut along the shaft causes the coil spring to extend (placing tension and bias in the spring) or retract (relieving such tension and bias) depending upon the direction of movement of the nut. The spring generally retains a degree of extension, even with the shade in the fully retracted position, so as to at least slightly bias the bottom rail, through the operating system, upwardly toward the head rail. Movement of the bottom rail downwardly away from the head rail causes the roller to rotate, which thereby causes the nut to extend the spring and increase the rotational bias or force applied to the roller. Movement of the bottom rail upwardly toward the head rail causes the nut to move toward the fixed end of the coil spring to reduce the bias of the spring.

The coil spring thereby assists an operator in raising the bottom rail. A predetermined amount of friction is built into the system via the inter-relationship of the nut to the threaded shaft so as to help retain the bottom rail at any displaced relationship from the head rail. The amount of built-in friction is determined by the variable operative strength of the spring at various displacements of the bottom rail from the head rail.

The fixed position of the first end of the spring is further adjustable between predetermined fixed positions so that the effective strength of the coil spring can be set for a predetermined size and weight of shade material to thereby cooperate with the built-in friction in assuring the bottom rail remains in any predetermined position.

In another example of the present disclosure, the operating system may include a biasing element in the form of a spring motor including a clock spring structure. The spring motor in this example may include one or more counter-balancing spring motors. The counter-balancing motors in this example may include a spring that may provide a counter-balancing force against the weight of the shade. The counter-balancing motors may include one anchored or fixed member and one rotatable member, with a clock spring operably connected to each the anchored member and the rotatable member. The rotatable member may be keyed to the roller, such that as the roller rotates, such as to extend or retract the shade, the rotatable member may rotate therewith. Because one end of the spring is anchored and one end is connected to the rotatable member, the spring may be wound around itself as the roller rotates to extend the shade (which builds up tension in the spring) and the spring may be unwound as the roller rotates in the opposite direction to retract the shade (which reduces the tension in the spring). Varying the number of spring windings by rotating the roller correspondingly changes a biasing force exerted by the spring, which acts to balance the load exerted by the shade in substantially any position of the shade.

In a general depiction of the disclosure herein, a cordless retractable shade is described, which includes a shade element, a rotatable roller operably connected to the shade element, whereby the shade element is wrapped around the roller when in a retracted configuration, and is at least partially unwrapped from around the roller when in an at least partially extended configuration. A biasing component is operably associated with the roller and configured to exert a variable biasing force on the roller to counterbalance a weight of that portion of the shade element at least partially extended from the roller. The biasing component is configured to apply greater amounts of force to the roller as greater amounts of the shade element is extending from the roller. The biasing component engages the roller with sufficient biasing force to support the shade for at least one amount of shade extension from the roller, and may support the shade in many positions of extension.

Additionally to this first example, the cordless retractable shade includes a non-rotatable element operably associated with the roller, wherein the biasing component further comprises a spring operably connected between the roller and the non-rotatable element. Rotation of the roller in a first direction increases a biasing force exerted by the spring on the roller, and rotation of the roller in a second direction decreases the biasing force exerted by the spring on the roller.

With respect to the general depiction of the disclosure here, a vane orientation stop mechanism may be provided. In this vane orientation stop mechanism, the shade component includes a front sheet, a back sheet, and at least one vane positioned between the front sheet and back sheet, the vane engaging the front sheet along a front edge and engaging the back sheet along a rear edge. The roller is operably engaged with the front sheet and back sheet to transition the vane from a closed configuration to an open configuration when substantially the entire shade element is extended from the roller. A vane orientation stop mechanism is operably engaged with the biasing component, the vane orientation stop mechanism is operable to selectively engage the roller in at least one orientation where the at least one vane is oriented in an open configuration.

Additionally, the vane orientation stop mechanism may define more than one engagement position, each corresponding to a discrete open configuration of the at least one vane.

With respect to a first example of the disclosure, and based on the general depiction provided above, a first end of the spring is operably connected to the roller at a fixed position, and the second end of the spring is reversibly translatable along at least a portion of a length of the roller, wherein as the second end of the spring translates along a portion of the length of the roller, the spring extends or retracts to vary the biasing force exerted by the spring on the roller.

A head rail may rotatably receiving the roller, and a drive mechanism is adjacent to the second end of the spring for reversibly moving the second end along the length of the roller upon rotation of the roller. The drive mechanism is operably connected to the head rail. There is a predetermined amount of friction between selected relatively movable parts of the shade.

The drive mechanism may include a nut operably mounted on the non-rotatable shaft, the nut movable along the length of the non-rotatable shaft upon rotation of the roller. The nut may be keyed to the roller to rotate therewith.

The non-rotatable shaft is a threaded shaft fixed relative to the head rail and extending longitudinally thereof, and the movable connector is fixed to one end of the spring with the opposite end of the spring fixed relative to the roller. The movable connector has an internal thread received on the threaded shaft for both rotation about the threaded shaft and translation there along. The movable connector translates along the length of the threaded shaft upon rotation of the roller to vary the effective length of the spring. There may be an abutment formed on the threaded shaft adapted to engage the internal thread to limit translating movement of the movable connector in one direction.

A vane orientation stop mechanism may be associated with this first example of the disclosure herein. The vane orientation stop mechanism is adjacent to the abutment to releasably retain the movable connector adjacent to the abutment. The vane orientation stop mechanism may include a releasably directed end of the thread on the threaded shaft against which an end of the internal thread on the movable connector stationarily abuts. The end of the internal thread on the movable connector defines a releasably directed end of the internal thread, wherein each of the releasably directed ends forms a respective tab. Each respective tab extends at a reverse angle to the respective thread. The transition from the thread on the threaded shaft to the tab forms a first apex, and the transition from the thread on the movable connector to the tab forms a second apex. The relative movement between the movable nut and the threaded shaft causes the first apex to pass the second apex where the tab on the threaded shaft engages the tab on the movable connector.

The first example of the disclosure herein also may include a bottom rail including a front edge and a rear edge, the shade element including a front sheet and a rear sheet, each of the front and rear sheets having bottom edges operably connected respectively to the front and rear edges of the bottom rail, and a plurality of horizontally extending vertically spaced flexible vanes operably connected to the front and rear sheets along respective front and rear edges thereof. Tilting the bottom rail to raise or lower the front and rear edges moves the vanes between a closed vertically oriented position and an open substantially horizontal position.

A second example of the disclosure herein, based on the general depiction provided above, includes a first end of the spring operably connected to the roller in a manner to resist radial movement relative to an axis of the roller. The second end of the spring is operably connected to the roller to rotate with the roller, and is positioned at a location spaced at least radially from the first end. The rotation of the second end of the spring in conjunction with the roller acts to coil or uncoil the spring to vary the biasing force exerted by the spring on the roller.

Additionally, a head rail may rotatably receiving the roller, and an elongated member, which may be an elongated shaft or rod, may be operably connected with the head rail in a non-rotatable manner and positioned within the roller. The first end of the spring defines an anchor and engages the elongated member. The second end of the spring may be rotationally keyed with the roller. The elongated member extends along at least a portion of the length of the roller. The anchor may be an arbor for connecting to the first end of the spring. The second end of the spring may engage a housing, and the housing may be rotationally keyed to the roller.

Further to this second example of the disclosure, the spring may be a clock spring having a radially inner end and a radially outer end. The first end is the radially inner end, which is operably secured in a rotationally stable manner with the roller, and the second end is the radially outer end. The clock spring is received in a housing, and the housing is attached to the radially outer end, and keyed with the roller. The arbor is received in an open center of the clock spring and attached to the radially inner end. The arbor is connected to the shaft in a non-rotatable manner.

Additionally to the second example of the disclosure herein, the shaft defines a threaded outer portion extending along a portion of the length of the shaft. A screw limit nut is keyed to the roller such that rotation of the roller rotates the screw limit nut to translate the nut along a threaded portion of the non-rotatable shaft. A stop is disposed on the non-rotatable shaft and engages the screw limit nut at an end point of travel along the threaded portion of the non-rotatable shaft, end point is substantially corresponding to the full extension of the shade material from the roller.

The stop may include a protrusion extending radially outward from a surface of the non-rotatable shaft, the protrusion configured to engage a knuckle disposed on the screw limit nut when the screw limit nut reaches the end point. When the screw limit nut is adjacent the end point, the roller may be further rotated to open the shade and to thereby move the screw limit nut such that a center of the knuckle moves over the protrusion to thereby hold the roller in place. The stop may include a collar fixed to the non-rotatable shaft, the collar and the screw limit nut together having a detent structure configured to engage when the screw limit nut reaches the end point. The detent structure engages when the roller rotates to open the shade.

The detent structure includes a pin disposed on the screw limit nut, the pin configured to engage a groove disposed on the collar. The detent structure may alternatively include a pin disposed on the collar, the pin configured to engage a groove disposed on the screw limit nut. The detent structure may alternatively include a molded spring disposed on the screw limit nut, the molded spring configured to engage a groove disposed on the collar. The detent structure may alternatively include a leaf spring disposed on the screw limit nut, the leaf spring configured to engage a groove or recess disposed on the collar. The detent structure may include a pin disposed on the screw limit nut, the pin configured to engage a plurality of grooves disposed on the collar.

A method of using the operating system aspect of the disclosure includes a method for counterbalancing the load of a shade element extending from a roller shade structure comprising the steps of unrolling the shade element to a desired extended position by rotating the roller in a first direction, creating an amount of biasing force in an operating system by rotation of the roller in a first direction, applying the amount of biasing force to the roller in a second direction opposite the first direction, wherein the amount biasing force sufficient to counterbalance the load of the shade element.

The amount of biasing force may be sufficient to maintain the shade in the selected extended position, or it may be less or more than the amount needed to maintain the shade in the selected extended position. Additionally, a predetermined level of friction may be created between components of the operating system, wherein the amount of biasing force in addition to the friction is sufficient to maintain the shade in the selected extended position. The biasing force may be a spring motor, which in turn may be a coil spring or a clock spring.

Further, the shade element may include a shade element extending from a roller shade structure, where the shade element includes a front sheet, a rear sheet, and at least one vane connected along a front edge to the front sheet and along a back edge to a back sheet, where the relative motion of the front and rear sheets move the at least one vane between open and closed orientations. In this case, the method comprises the steps of unrolling the shade element to a fully extended position, with at least one vane in a closed orientation; further rotating the roller in a first direction to cause the front sheet and back sheet to move relatively to orient the at least one vane in an open position; and engaging a vane orientation stop mechanism to overcome the biasing force and hold the roller in position to maintain the open orientation of the at least one vane.

This summary of the disclosure is given to aid understanding, and one of skill in the art will understand that each of the various aspects and features of the disclosure may advantageously be used separately in some instances, or in combination with other aspects and features of the disclosure in other instances.

Other aspects, features and details of the present disclosure can be more completely understood by reference to the following detailed description of a preferred embodiment, taken in conjunction with the drawings and from the appended claims.

BRIEF DESCRIPTION OF THE DRAWINGS

FIG. 3 is a front elevation of the shade of FIG. 1 in a fully extended position, and the horizontal vanes in the open position to allow light to pass through.

DETAILED DESCRIPTION

The present disclosure provides a retractable covering that includes a counterbalance that allows the shade material to be stopped at a number of different locations, selected by the user, along a drop length of the shade. Conventional cordless operating systems may generally have a finite number of stop positions for the extension of the shade and/or generally may be limited to shades in which the only function is to raise and lower, and are not capable of adjusting the graduated amount of light passing through the shading when in the fully extended position. As such, these systems are not capable of operating shades with a plurality of tiltable horizontal vanes. However, the covering and operating system of the present disclosure may provide for a shade that may vary light passage there through when in the fully extended position, as well as be positionable at substantially any position between full extension and full retraction.

Figure 1:
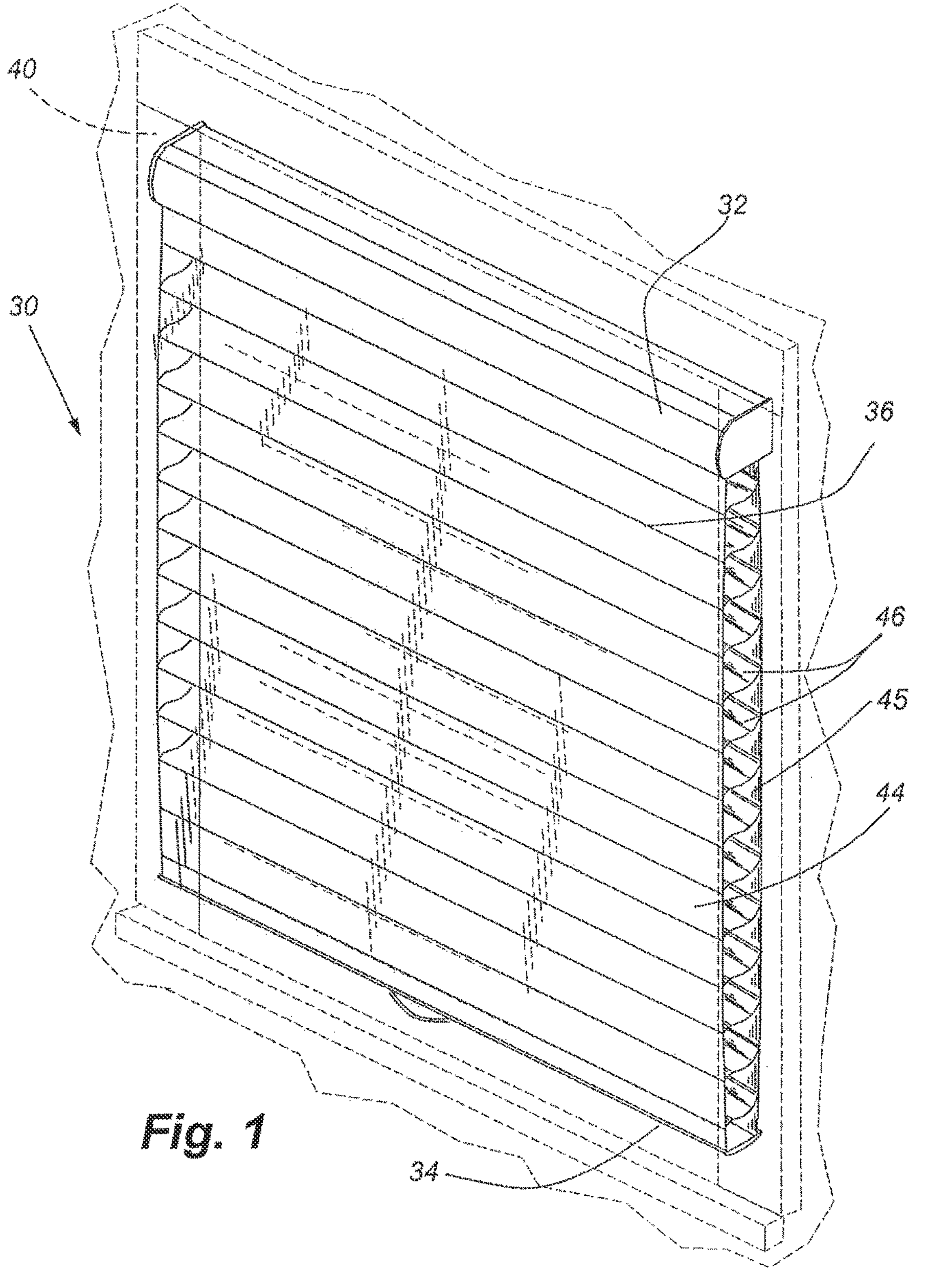
FIG. 1 is an isometric of a retractable shade in accordance with the present disclosure in a fully extended open position with vanes adjusted to allow light to pass through and mounted within an architectural opening shown in dashed lines.
Figure 2:
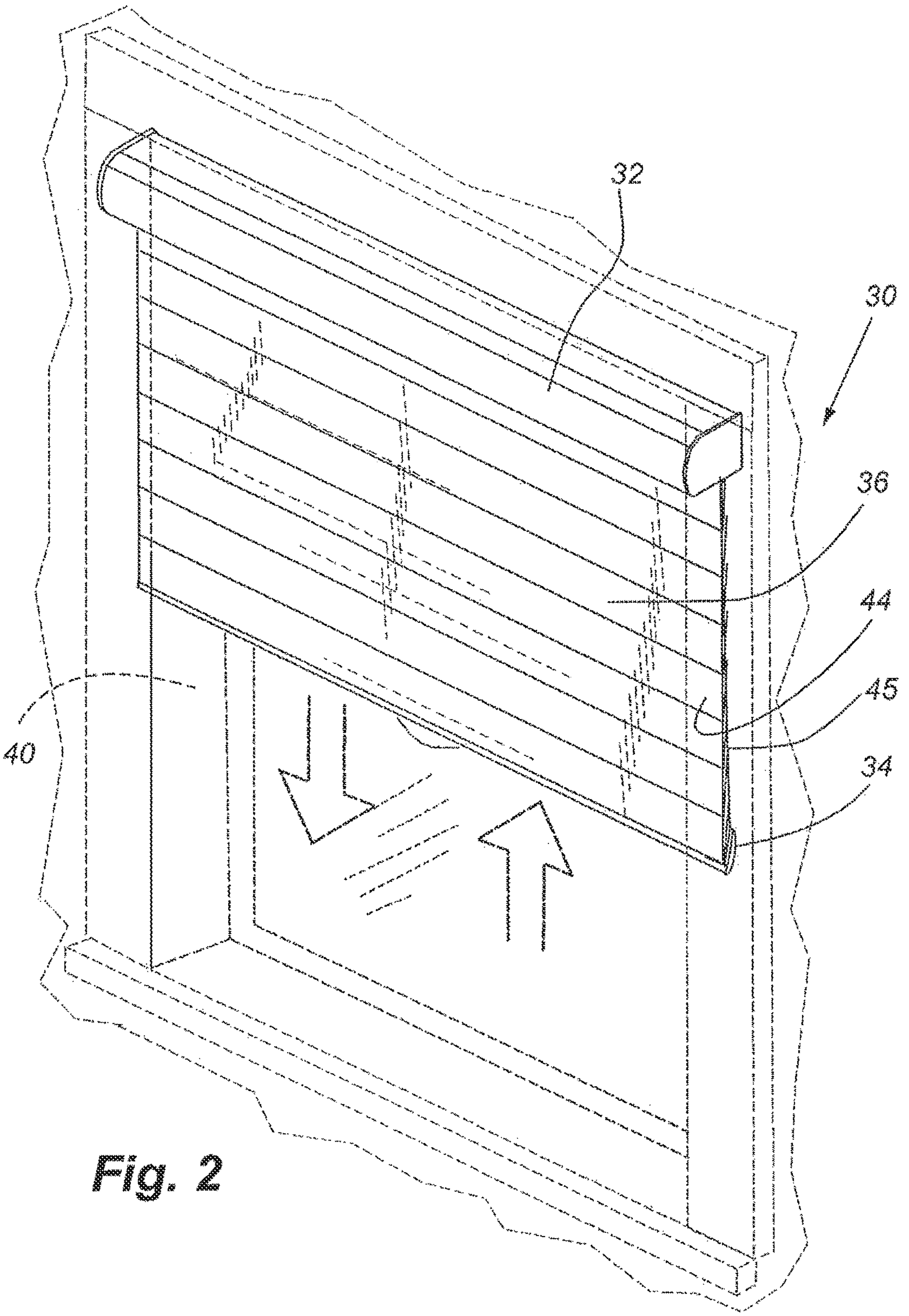
FIG. 2 is an isometric similar to FIG. 1 with the shade partially retracted.

Referring to FIGS. 1 and 2, the retractable shade 30 of the present disclosure is a cordless roll-up shade including a head rail 32, a bottom rail 34, and a flexible shade material 36 extending therebetween. The shade material includes vertically suspended front 44 and rear 45 sheets of flexible translucent or transparent material, such as sheer fabric, and a plurality of horizontally extending, vertically spaced flexible vanes 46. The vanes are preferably of a translucent or opaque material and are secured along front and rear edges to the front and rear sheets along horizontal lines of attachment. However, in other instances, the shade material may be substantially any type of material, such as but not limited to: woven, non-woven, knits, or the like. Additionally, the shade may be non-translucent or opaque, or may include a combination of opaque and translucent or semi-translucent materials.

The front and rear sheets are attached to a roller 42 at circumferentially spaced locations (see FIG. 7A) so that pivotal movement of the roller, when the shade is fully extended, moves the front and rear sheets vertically (relative to each other) to shift the vane material between open and closed positions. Rotation of the roller causes the shade material in its closed position of FIG. 2 to wrap around or unwrap from the roller depending upon the direction of rotation. In the closed position of the shade material, the vanes extend vertically in coplanar contiguous relationship with the front and rear sheets. The front and rear sheets are relatively close together in the closed configuration. In the open position of FIG. 1, the front and rear sheets are horizontally spaced with the vanes extending substantially horizontally therebetween.

The shade includes an operating system whereby an operator of the shade can manually lift or lower the bottom rail of the shade and leave it in any desired position between and including fully retracted and fully extended and it will maintain this position until moved again. The operating system for maintaining the extension of the shade in a desired position between fully retracted and fully extended may include many different types of counter-balancing units, or also referred to as biasing components. For example, a coil spring (one example of a counter balancing spring motor) operably associated with the operating system and extending laterally (to create a counter balancing spring force to hold the desired position of the shade) within the roller positioned in the head rail may be used. A piano spring oriented orthogonally to the lateral extension of the roller, and positioned inside the roller, may alternatively be used as a counter balancing spring motor or unit. In addition, the horizontal vanes may be tilted to control the amount of light passing through the shade. The shade does not require an operating cord or cords, and so may reduce risk presented to children, infants, or animals.

Before describing the details of the system, it is felt helpful to understand that in a retractable shade of the type described in detail hereafter, the effective weight of the shade material increases as the shade is extended. In some embodiments described herein, in order to maintain the bottom rail at any desired position between fully retracted and fully extended, a system combining the friction of relatively movable parts within the operating system and the strength and spring rate of a spring motor (which may be, for example, a coil biasing spring 38 or other type of spring structure, such as a clock spring) in the head rail 32 are utilized. In one example, the spring motor is mounted in relation to the head rail, and the operating system is designed to increase the load on the spring motor (thus increasing the bias force in the spring) as the bottom rail 34 is lowered (which increases the effective weight of the shade material extended off the roller). To complement the bias force of the spring motor, a predetermined coefficient of friction is built into relatively moving parts of the operating system of the shade so that the friction within the system, in combination with the bias force of the coil spring, will equal, overcome or generally counterbalance the gravity force acting on the bottom rail and shade material, so that the bottom rail will remain positioned at any user selected location between fully retracted and fully extended. In other words, the biasing force (biased towards retracting the shade) exerted by a counterbalancing spring motor may counter the effective force exerted by the shade, and as the effective weight of the shade varies, the biasing force may also vary. This may allow the counter-balancing spring motor to balance the weight of the shade to hold the shade at substantially any position along an extension length of the shade. Note that the counterbalance properties of the spring motor in the operating system may either include the effects of the friction in the operating system, or it may not include the effects of the friction in the operating system. Also, the term "counterbalance" is interpreted to include creating a force equal to the load caused by the extended shade, or a force less than or greater than, the force equal to the load, unless defined explicitly or by clear intention otherwise. Additionally, it should be noted that the shade element utilized with the operating system does not need to have operable vanes. The operating system can be implemented to provide a counter-balancing bias force roller used with many different shade elements that are rolled up on a roller. In this instance, the vane orientation stop mechanism(s) as described below would simply not be utilized.

As will be appreciated with the description hereafter, the bias force of the spring motor is also adjustable as a fine-tuning mechanism to complement the fixed built-in friction of the system. Alternatively or additionally, the system may include single springs, multiple springs or other counter-balancing units or spring structures to complement the friction of the system, and to achieve the desired counterbalance against the weight of a selected shade. As used herein, the spring motor utilized in the operating system may also be referred to as a bias component or bias element, or variations thereof.

As can be appreciated by reference to FIGS. 1 and 2, the retractable shade 30 is shown mounted within an architectural opening 40 which is illustrated as a window opening, but could be a doorway, archway, room dividers, or the like. The shade material illustrated could be any one of numerous, flexible materials that can be wrapped on or unwrapped from a roller 42. The shade material may be shifted from the open position of FIG. 1 to the closed position of FIG. 2 upon initial rotation of the roller as will be described in more detail hereafter. Reverse movement of the shade material from the closed position of FIG. 2 to the open position of FIG. 1 may be accomplished by opposite rotation of the roller under the force of a spring motor or motors.

Figure 4:
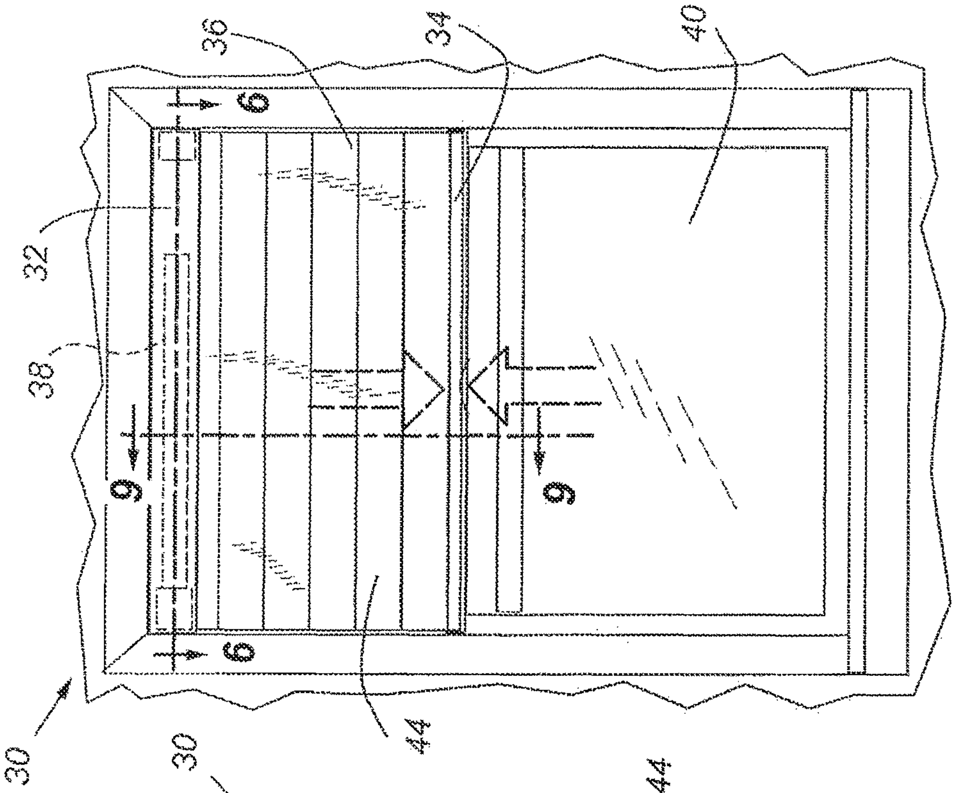
FIG. 4 is a front elevation of the shade in the partially retracted position of FIG. 2.
Figure 3:
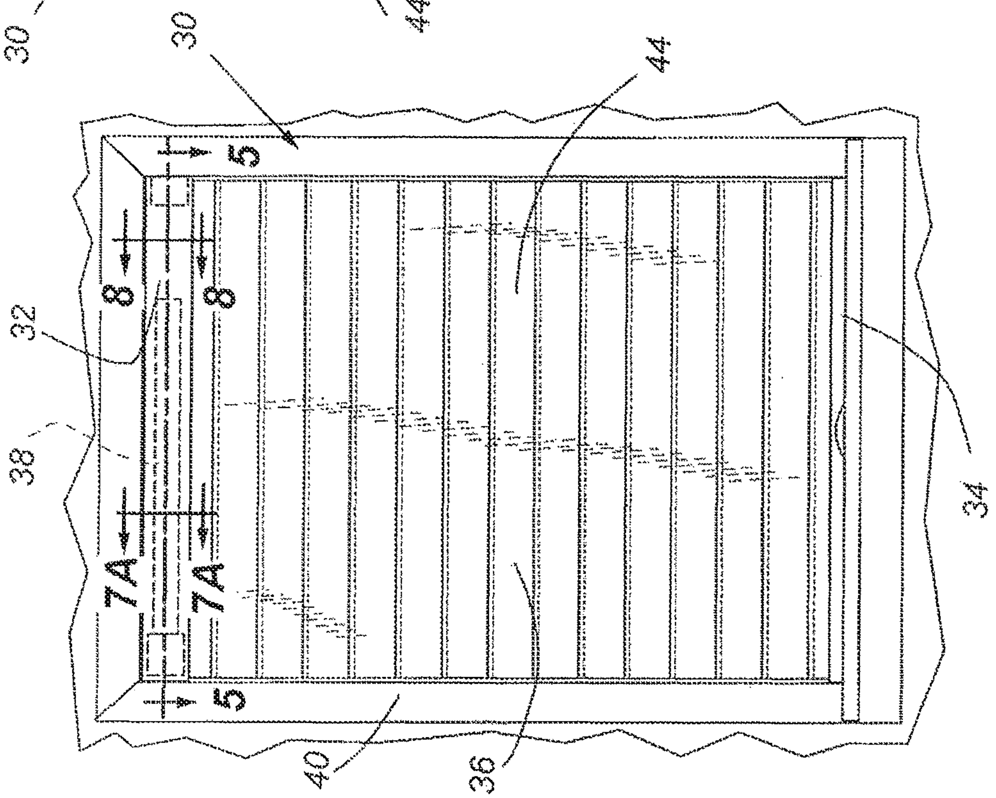

FIGS. 3 and 4 are front elevations of FIGS. 1 and 2, respectively, and show diagrammatically components of the operating system for the shade 30 in dashed lines.

Figure 5:
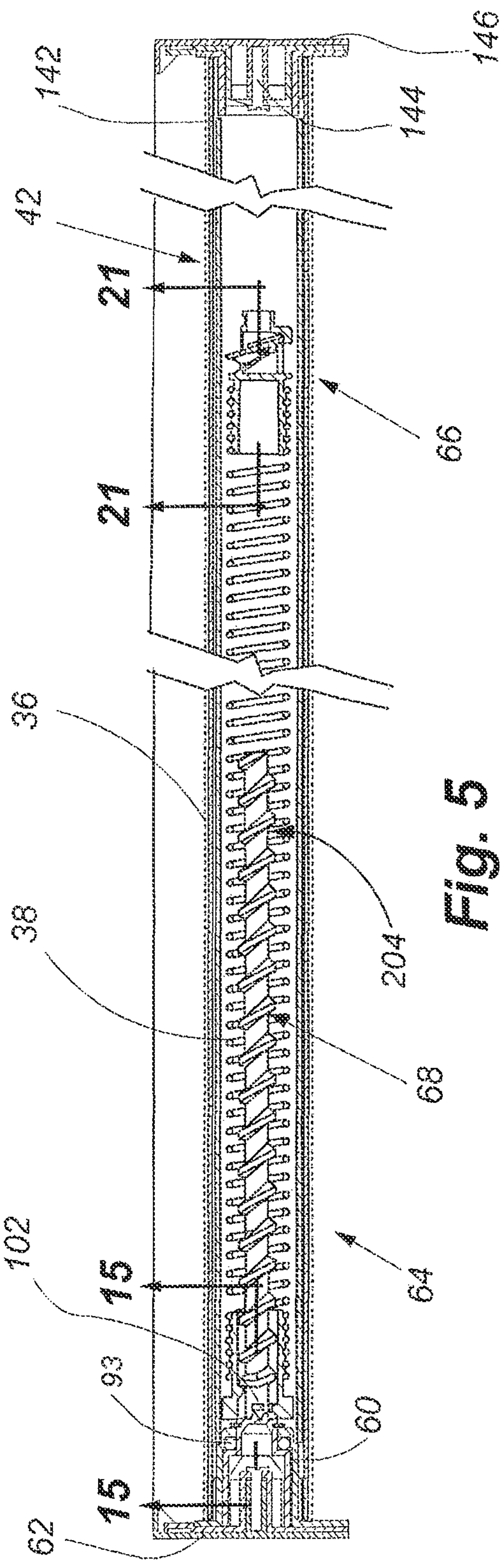
FIG. 5 is an enlarged fragmentary section taken along line 5-5 of FIG. 3.
Figure 6:
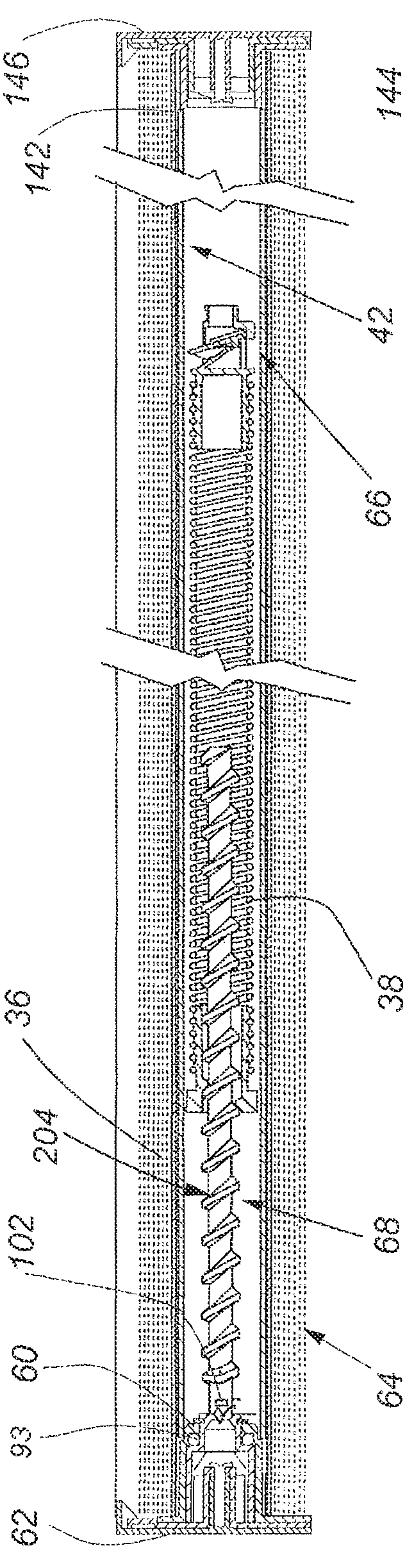
FIG. 6 is an enlarged fragmentary section taken along line 6-6 of FIG. 4.

FIG. 5 is a section taken along line 5-5 of FIG. 3 and is therefore a horizontal section through the head rail 32 with the roller 42 and an operating system being shown. FIG. 6 is a section similar to FIG. 5 taken along line 6-6 of FIG. 4 therefore illustrating the retractable shade 30 with a portion of the shade material 36 wrapped about the roller within the head rail.

Figure 7A:
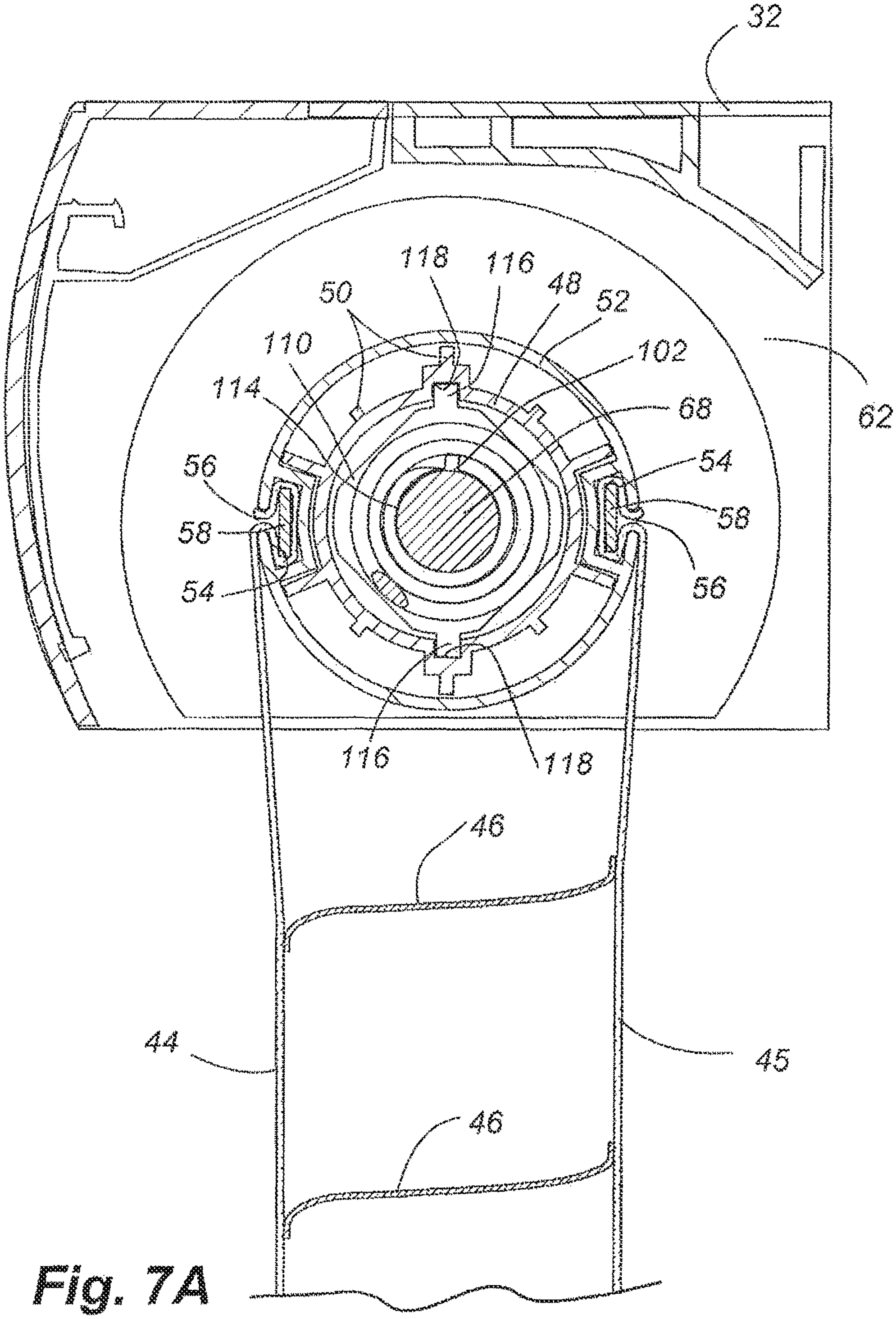
FIG. 7A is an enlarged section taken along line 7-7 of FIG. 3.
Figure 7B:
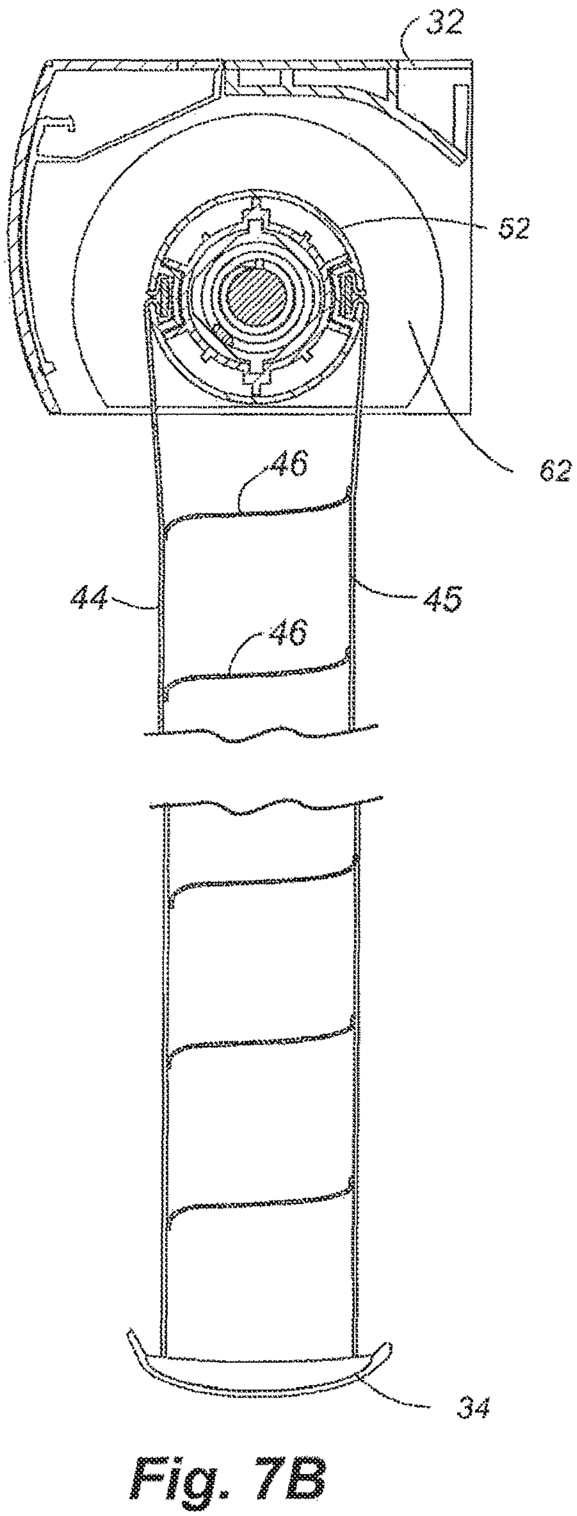
FIG. 7B is a section similar to FIG. 7A showing the bottom rail.

Referring to FIGS. 7A and 7B, the roller 42 is shown as a two-part roller having an inner component 48 that is cylindrical in nature with a plurality of radiating longitudinally extending ribs 50 around its periphery. The larger of the ribs are sized to support the inner component 48 concentrically within an outer component 52 of the roller. The outer component 52 is also generally cylindrical in configuration, with the outer component having a pair of diametrically opposed longitudinally extending channels 54 formed therein that open through the outer surface of the outer component through a relatively small slot 56. The opposed channels 54 are provided to anchor the upper edges of the front 44 and rear 45 sheets, respectively, of the shade material. For example, an anchor strip 58 may be used to secure the fabric, such as by forming a loop in the upper edge of the sheets of material, inserting the loop into an associated channel of the outer roller component and inserting the anchor strip to render a connection of the associated sheet with the associated channel in the roller. Alternatively, the shade may be glued, sewed, or otherwise connected to the anchor strip and/or roller with or without the channels 54.

Figure 8:
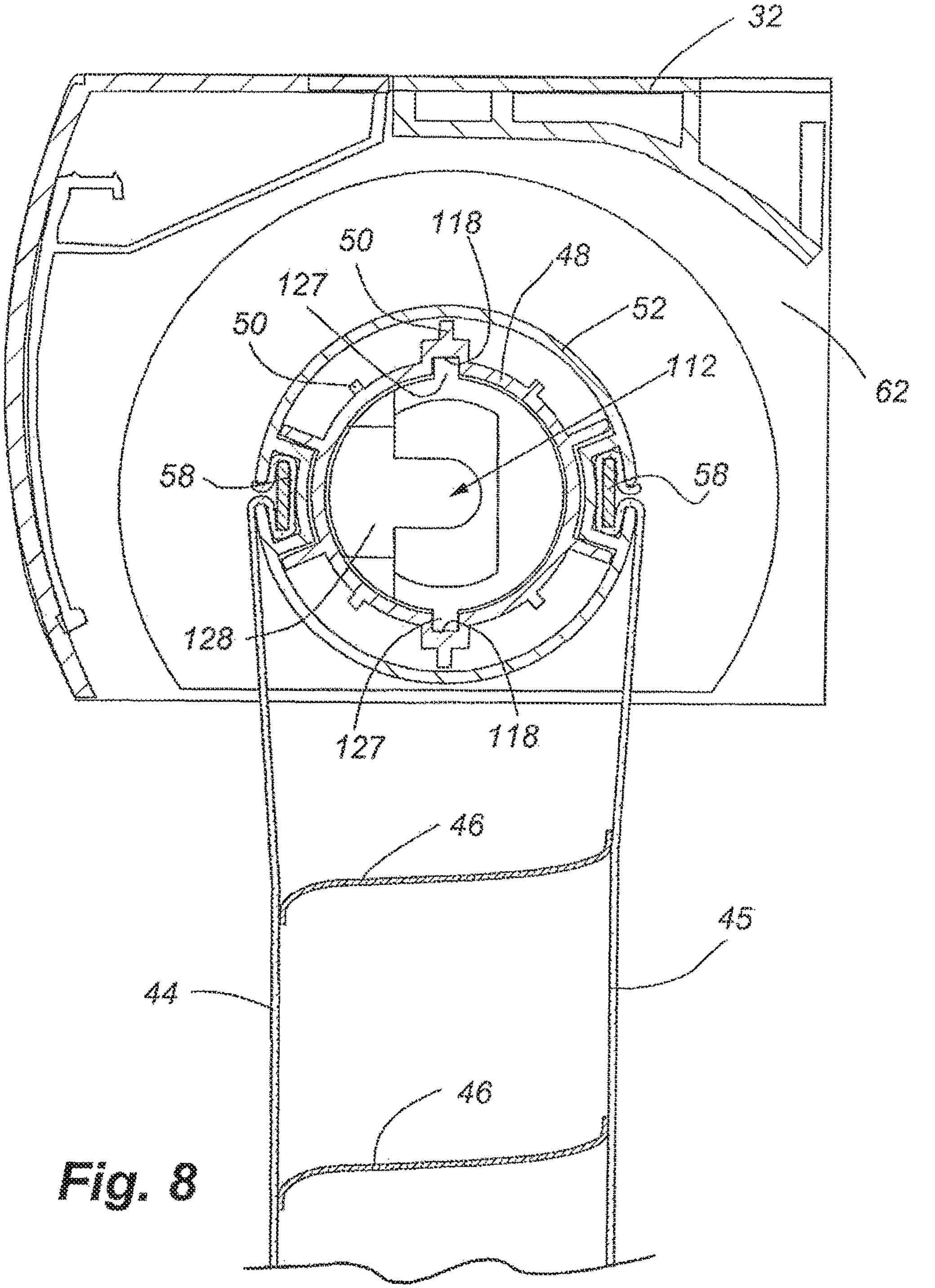
FIG. 8 is an enlarged section taken along line 8-8 of FIG. 3.

FIG. 8 is a section similar to FIG. 7A taken at a different location along the length of the roller 42, but again illustrating the two-component roller and the connection of the shade material 36 thereto. As can be appreciated from FIGS. 7A, 7B and 8, the shade material is shown in its open position with the front 44 and rear 45 sheets of material being separated and the vanes 46 disposed substantially horizontally therebetween. It can be appreciated, however, that if the roller were to rotate 90 degrees in either direction, the front and rear sheets of the shade material would move vertically relative to each other and into closer adjacent relationship. If the roller is rotated 180 degrees or more, in a counter-clockwise direction, the flexible vanes would be substantially vertically oriented in a vertical plane and in a horizontally stacked relationship with the front and rear sheets as seen, for example, in the closed position of the covering of FIG. 9.

Figure 9:
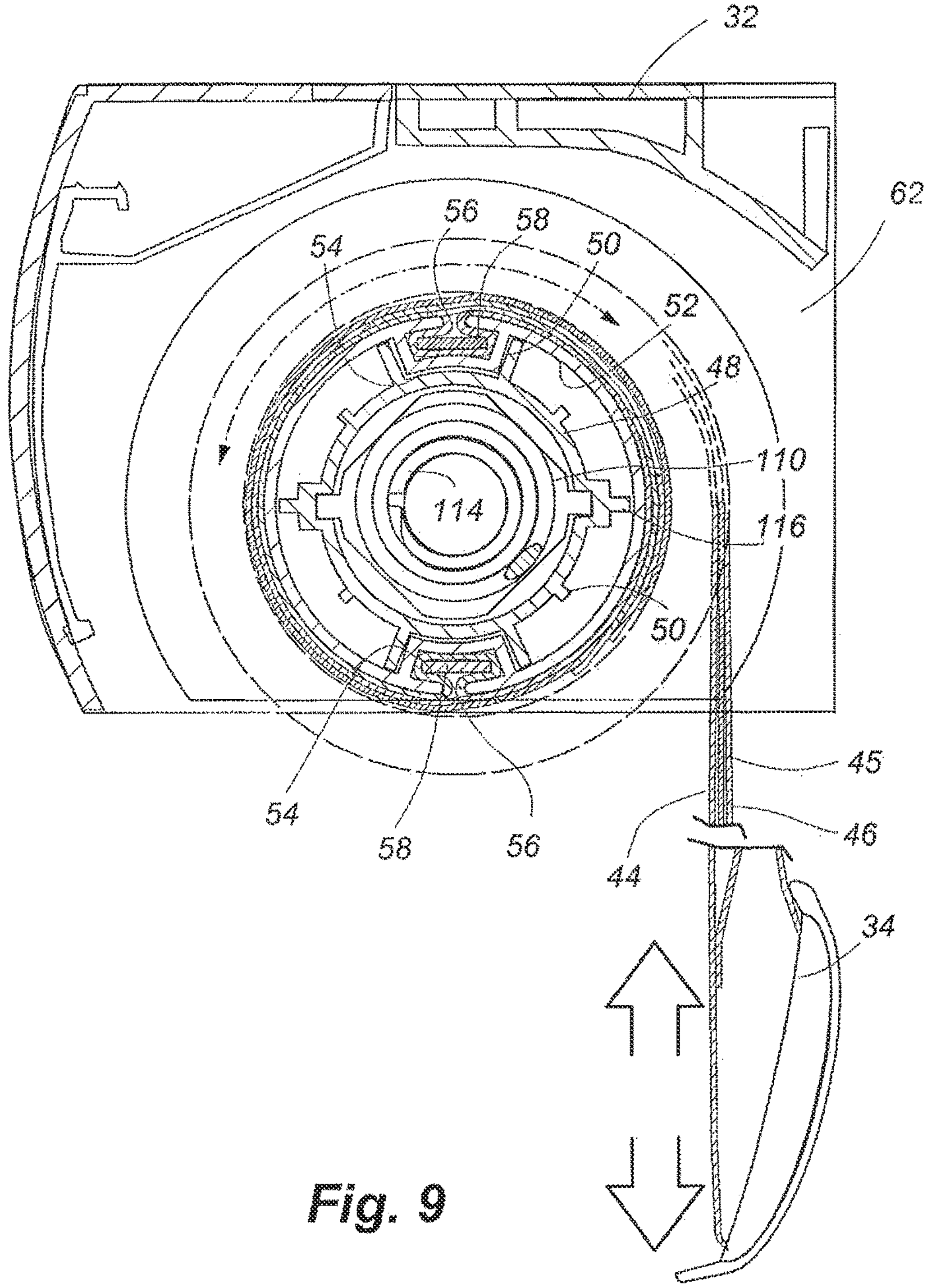
FIG. 9 is an enlarged fragmentary section taken along line 9-9 of FIG. 4.

FIG. 9 is a vertical section through the head rail 32 showing the shade material 36 partially wrapped about the two-component roller 42. As will also be appreciated by referencing FIGS. 7A-9, the bottom rail 34 is horizontally disposed when the shade material is open as shown in FIGS. 7A and 8 but may become substantially vertically oriented when the shade material is closed (FIG. 7C) as when the front and rear sheets are shifted vertically relative to each other upon a 180 degree rotation of the roller.

Figure 10:
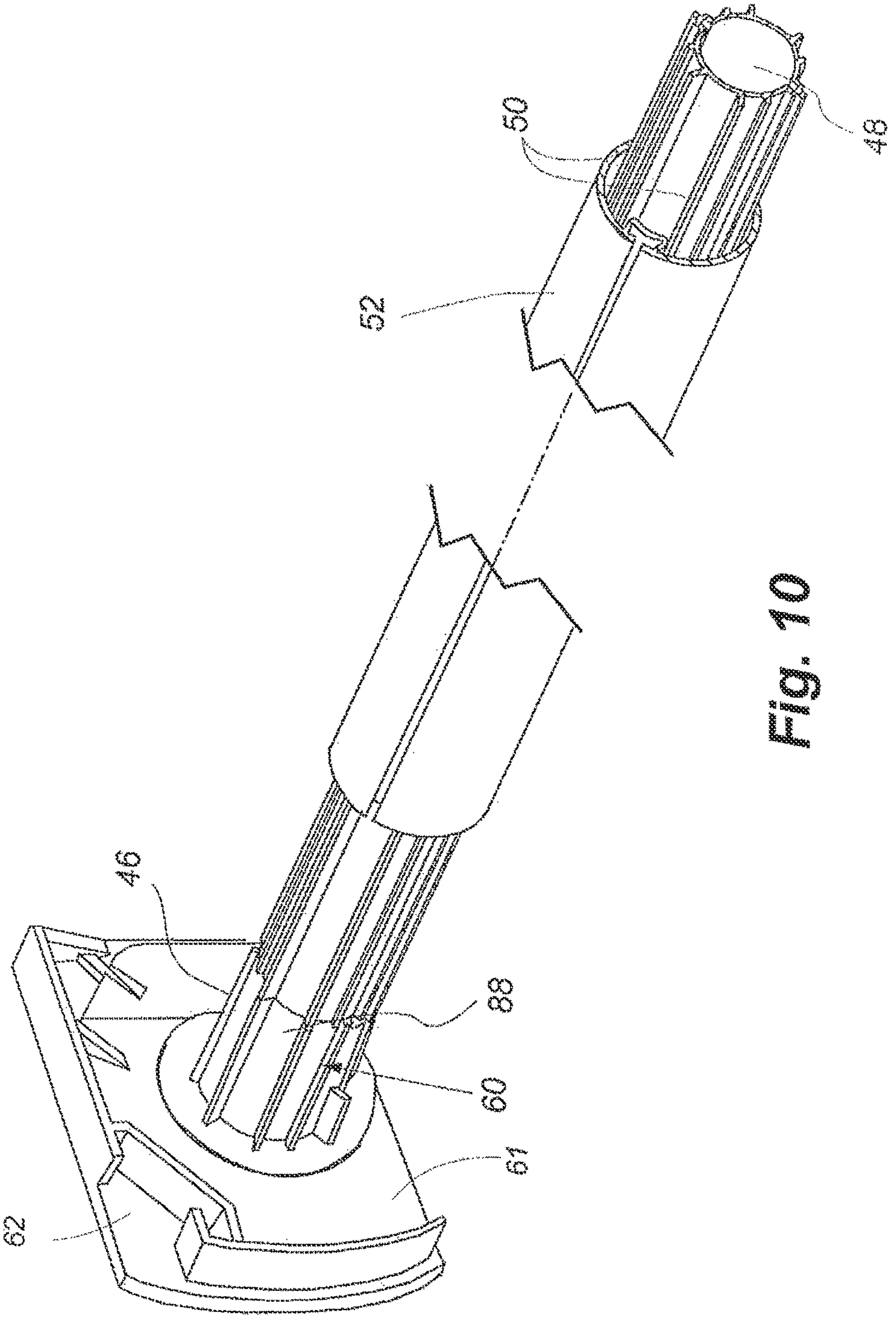
FIG. 10 is a fragmentary isometric showing the left end cap of the head rail and the roller connected thereto.
Figure 15:
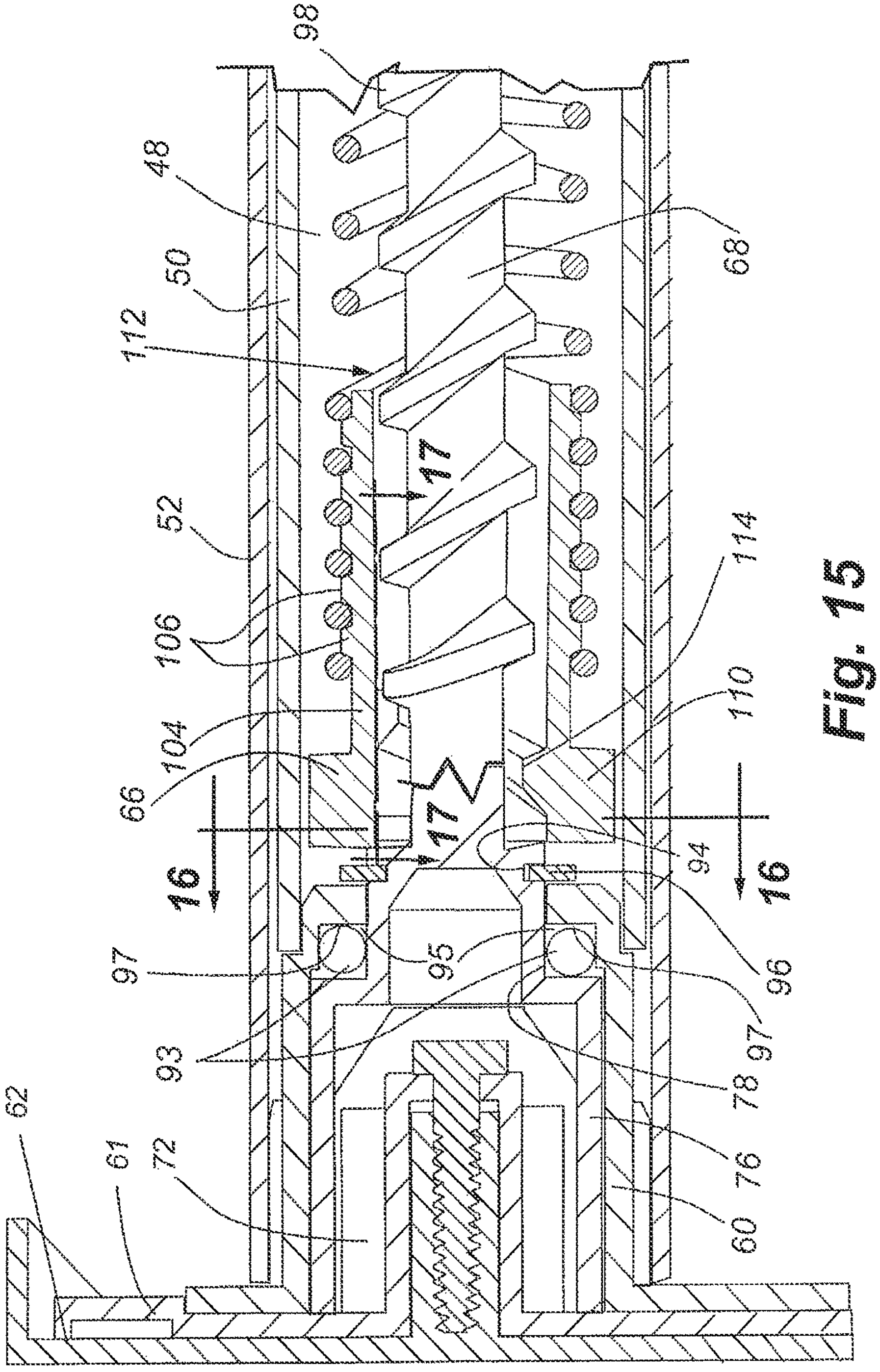
FIG. 15 is an enlarged fragmentary section taken along line 15-15 of FIG. 5.
Figure 16:
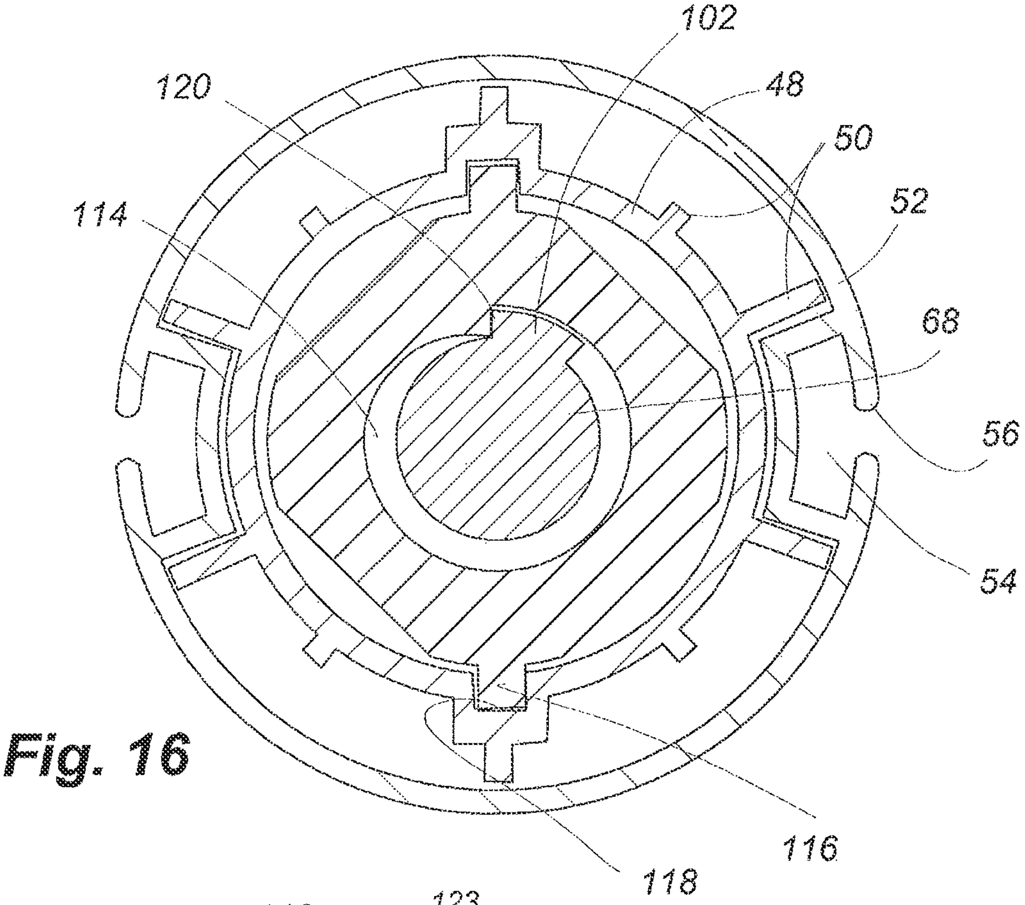
FIG. 16 is a further enlarged section taken along line 16-16 of FIG. 15.

With reference to FIGS. 10 and 15, the two-component roller 42 is shown with some parts removed to illustrate the inner cylindrical component 48 mounted within outer cylindrical component 52. The inner cylindrical component is abutted against a splined hub or bearing 60 mounted on a left bearing plate 61 of an end cap 62 of the head rail 32. The two-component roller 42 is rotatable relative to the left bearing plate 61 and head rail 32. The outer component 52 of the roller, in the completed assembly, may extend over the inner component, as well as the hub or bearing, so as to have its end generally contiguous with the inner surface of the left end wall of the head rail, albeit in sliding relationship therewith.

The outer cylindrical component 52 extends the full width of the shade fabric. However, the inner cylindrical component 48 need only be sufficiently long to contain the full length of the spring 38, as shown in more detail below.

One example of the operating system for the retractable shade of the present disclosure is shown in FIGS. 11-22. Referring first to FIG. 11, the spring motor or biasing component, in this example an elongated coil spring 38, used to variably counterbalance at least a portion of the weight of the shade material 36 is seen. It should be noted, that in other examples, a counter-balancing spring motor having one or more counter-balancing spring motors may be used to counterbalance the weight of the shade (see, for example, FIGS. 32 and 33).

Figures 11A, 11B:
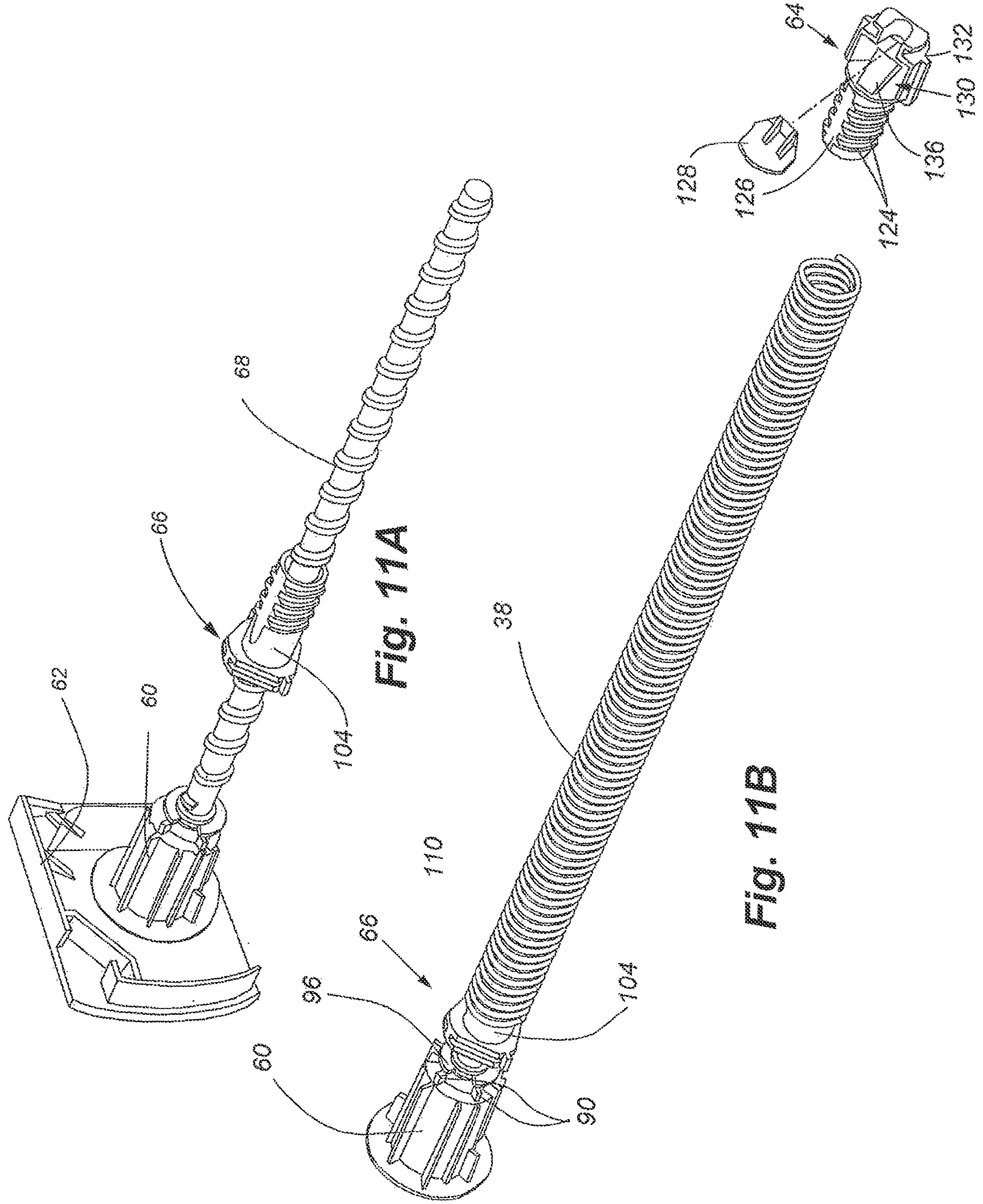
FIG. 11A is an isometric showing the threaded screw mounted on the left end cap.
FIG. 11B is an isometric of the coil spring and other components of the operating system of the present disclosure.
Figure 12:
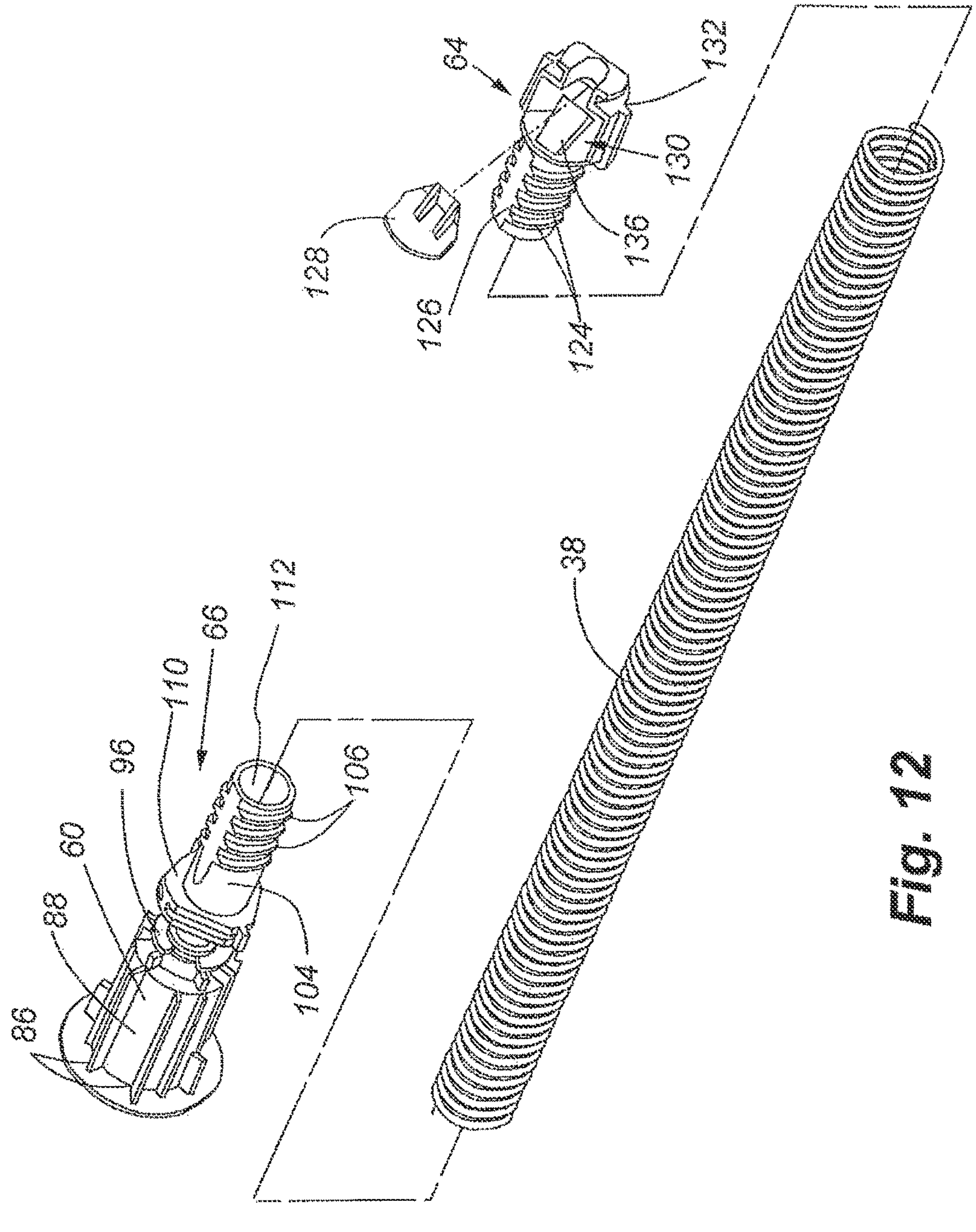
FIG. 12 is an exploded view of the operating system shown in FIG. 11 B.

In this example, the spring may extend along a portion of the length of the inner cylindrical component 48, and is disposed within the component 48. The effective length of the coil spring when the shade is extended is shown in FIG. 11 B, which is contrasted with its at-rest length shown in FIG. 11A (no spring is shown in FIG. 11A, however the end piece 104 represents the position of the end of the spring). Thus, the tension and effective roller bias force of the spring is varied with the length of the spring caused by the actuation of the operating system. For instance, referring to FIG. 11 B, when the shade is extended to its fullest extent, the left end of the spring 38 is moved to the left end of the roller (loading the spring) while the right end of the spring remains anchored. As can be seen in FIGS. 11 and 12, the spring has a fixed end connector 64 (also referred to as a non-rotatable element) at its right end, which fixed connector 64 is axially fixed in position by engagement with the inner wall of the inner component 48 of the roller 42, as described in more detail with respect to FIGS. 21-24. This non-rotatable element is thus fixed in position relative to the head rail and the roller. And as seen in FIG. 11, the spring has a movable end connector 66 (also referred to as the actuable end) at its left end that moves along the threaded shaft upon rotation of the roller, which extends the spring 68 upon extension of the shade, and shortens the length of the spring 68 upon retraction of the shade. It should be appreciated for purposes of the present disclosure that a left hand mount or end cap is illustrated, but as will be evident to those in the art and from the following description, a right hand mount would be the mirror image thereof. The non-rotatable element is an anchor against which the spring motor acts, in this example, to increase the bias force. The static position of the fixed connector is referenced herein as being relative to the head rail. It is contemplated that the fixed end of the spring motor may be attached to a structure outside the head rail, such as a wall or frame of an architectural opening as non-limiting examples, and result in the same effect of anchoring an end of the spring motor. Having the anchor position on or in the head rail allows the shade to be a self-contained unit not relying on attachment or affixation with anything outside the head rail.

The movable end connector 66 may be a nut with both the fixed 64 and movable 66 end connectors supporting a portion of the spring 38 in a connective manner. This connection configuration allows the spring to be extended or retracted without losing its grip on the fixed and movable end connectors. For example, in this configuration the grooves 106 on movable end connector 66 and the grooves 124 on the fixed end connector 64, as described in more detail below, are sized and oriented to receive the spiral winding of the spring 38 along at least a portion of the length of the grooves on the connector to secure the relative ends of the spring 68 to each of the fixed 64 and movable 66 end connectors.

Figures 13, 14:
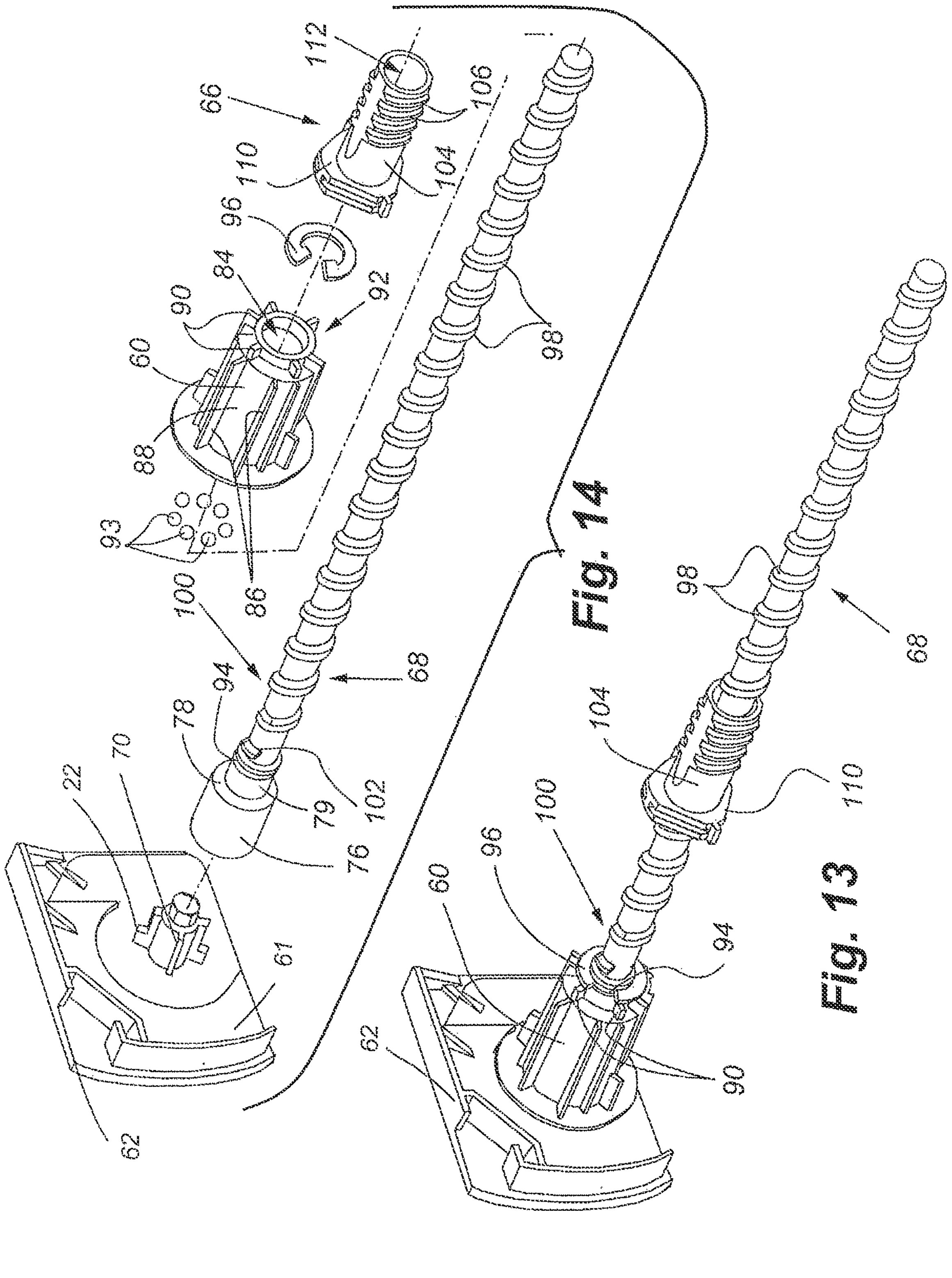
FIG. 13 is an isometric showing the drive mechanism for the operating system.
FIG. 14 is an exploded isometric of the mechanism shown in FIG. 13.

With reference to FIG. 13, which is exploded in FIG. 14, the movable end connector 66, as mentioned above, is a nut that is adapted to be reversibly translated, as the roller is rotated, along the fixed threaded shaft 68. The threaded shaft 68 is fixably mounted to the left end cap 62 of the head rail 32 on an inwardly directed hub 70 fixed with the bearing plate 61 on the left end cap. The hub 70 may be integral with the bearing plate 61 as shown, or may be a separate component piece attached to the bearing plate 61 by a fastener. The hub 70 defines a set of longitudinally extending radiating ribs 72 adapted to be received in corresponding grooves (not seen) in a cylindrical body 76 of the threaded shaft. The receiving grooves in the cylindrical body 76 cooperate with the ribs 72 on the hub 70 to act as a key between the cylindrical body 76 and the hub 70 to prevent the threaded shaft from rotating by fixing the shaft 68 relative to the hub 70 and the left end cap 62 of the head rail 32.

The outer hub or bearing sleeve 60 fits over the threaded shaft 68 and has a generally cylindrical passage 84 there through. The bearing walls forming the passage 84 define an end wall 85 at its innermost end (i.e. the end positioned away from the end cap 62) through which the passage 84 extends, but with a reduced diameter inner end 92. The end wall defines a plurality of ribs 90 that extend axially relative to the bearing 60 from the end wall 85, and also extend radially to just short of the outer wall of the bearing 60. The hub 60 defines a plurality of longitudinally-extending outwardly radiating ribs 86 around its cylindrical body 88 which are substantially alignable (see FIG. 10) with the external longitudinally extending radial ribs 50 on the inner component 48 of the roller 42. An open left end of the inner roller component 48 is received onto seated upon the plurality of ribs 90 on the reduced diameter inner end 92 of the bearing sleeve 60 with the radiating ribs 90 on the reduced diameter inner end supporting the inner surface of the inner roller component 48 in abutting axially aligned contiguous relationship with the bearing sleeve. The outer wall of the bearing 60 and the outer wall of the roller component 48 may be flush with one another. The bearing sleeve 60 is therefore rotatably seated on the outer surface of the cylindrical body 76 at one end of the threaded or screw shaft 68 so as to rotate with the roller and relative to the fixed screw shaft 68.

The cylindrical body 76 of the threaded shaft extends (inwardly) from the face 78 and has a reduced diameter cylindrical surface 79 (FIG. 14). An annular groove 94 is formed in the cylindrical surface a short distance from the face 78. The annular groove 94 is adapted to releasably receive a retaining C-clip 96 for retaining the components during the assembly process. A complement of spherical bearing (see FIGS. 14 and 15) elements 93 are positioned in an annular cavity 95 formed between lateral face 78 of the screw shaft 68 and lateral face 97 inside the bearing sleeve 60, and between horizontal lower face 79 (inner race) and horizontal upper face 81 (outer race) formed on the inside of the bearing sleeve 60. The spherical bearing elements 93 transfer axial thrust loads created by the spring tension, while providing minimal rotational friction between outer bearing 60 and screw shaft 68.

As best appreciated in FIGS. 13-20, the threaded shaft 68 continues to extend axially and inwardly away from the left end cap 62 from the innermost end of the cylindrical body

76 and has a large thread 98 formed thereon. The thread 98 has a relatively large thread pitch (also a low thread count) so that the movable connector 66 can rotate relatively easily and move axially the desired distance per rotation of the roller. The thread 98 on the shaft terminates in a particular manner at its outermost end adjacent to the bearing 60 as will be described hereafter. At a predetermined spacing from the outermost end 100 (the end adjacent the end cap 62) of the thread 98, a radial abutment stop 102 is formed on the outer surface of the cylindrical body of the shaft 68, which stop 102 engages the movable connector 66 to keep it from further rotating (which generally defines the limit of extension of the shade since the roller can no longer rotate). This is explained in more detail below.

Figure 17:
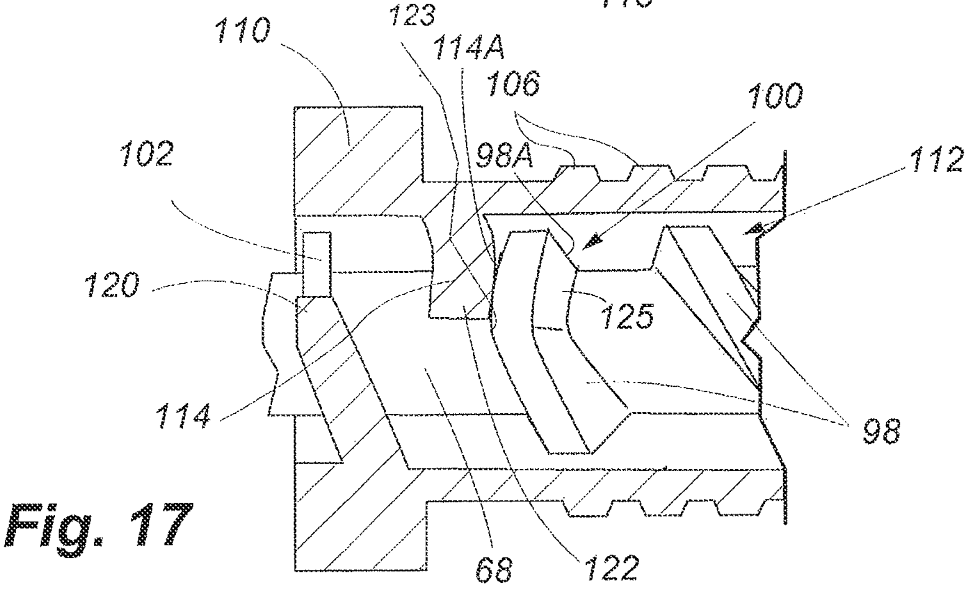
FIG. 17 is a further enlarged section taken along line 17-17 of FIG. 15.
Figure 18:
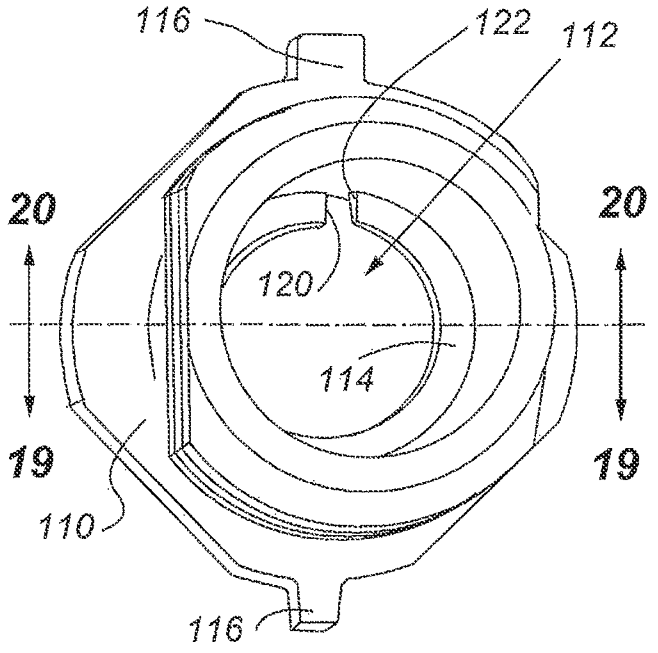
FIG. 18 is an isometric looking at the threaded end of the nut portion of the drive mechanism.
Figure 19:
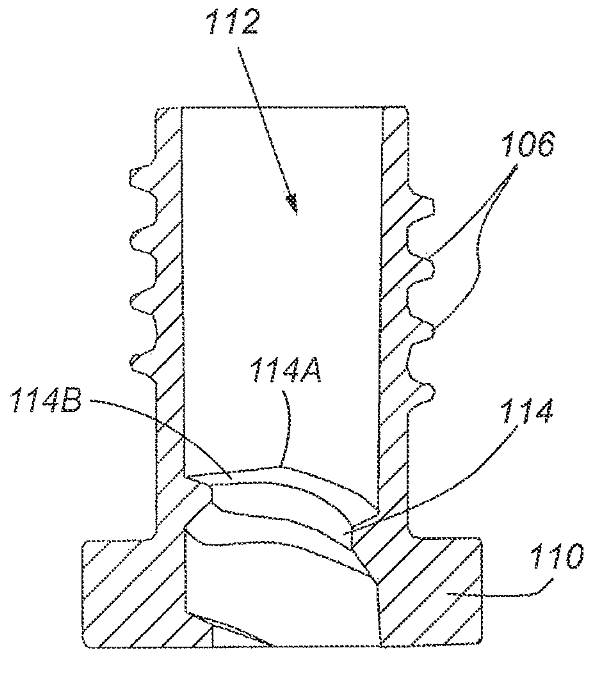
FIG. 19 is a section taken along line 19-19 of FIG. 18.
Figure 20:
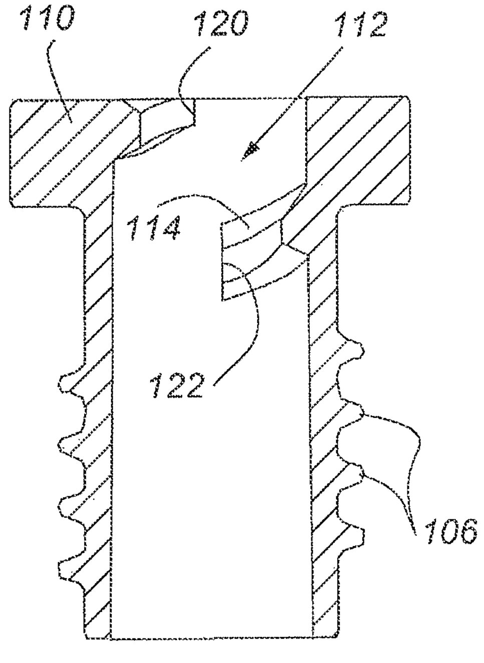
FIG. 20 is a section taken along line 20-20 of FIG. 18.
Figure 21:
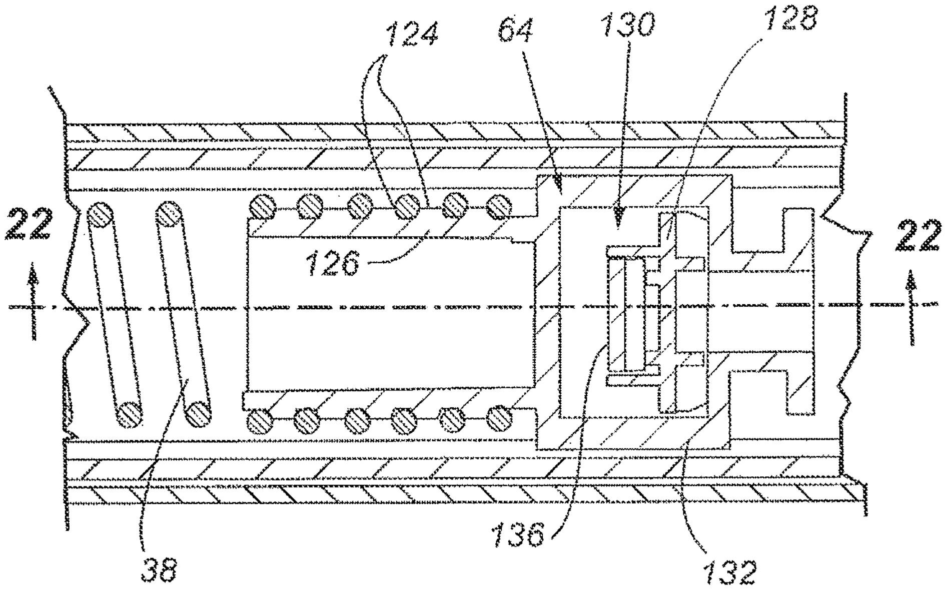
FIG. 21 is an enlarged fragmentary section taken along line 21-21 of FIG. 5.
Figure 22:
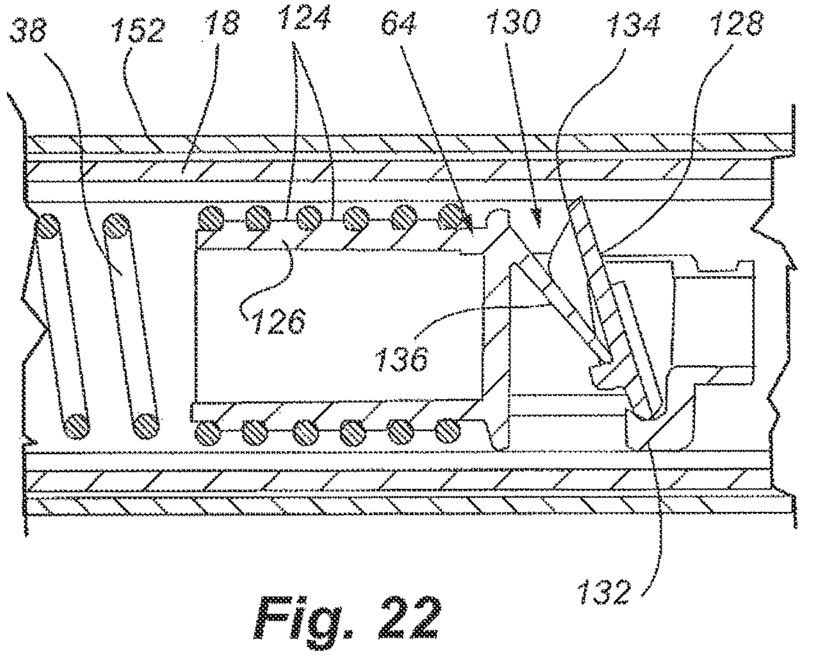
FIG. 22 is a fragmentary section taken along line 22-22 of FIG. 21.

With reference to FIGS. 12-20, the movable connector or nut 66 may have a relatively long cylindrical body 104 with external threads 106 extending along the length of the hollow cylindrical body 104 to a stopping location spaced from a generally circular enlarged head 110. FIGS. 18-20 show the movable stop 64 in perspective and cross-section views to show the features described herein. The generally circular head 110 has four circumferential flat surfaces to facilitate the use of wrench type tools during assembly of the nut 66 and spring 38. The external thread 106 is adapted to receive and be threaded into the spiral wound left end of the coil spring 38 so that the coil spring is mounted on and fixed to the movable connector 66. The left end of the spring and the movable connector 66 thereby become joined for unitary rotation and translation with each other. A cylindrical passage 112 through the movable connector 66 has a single thread 114 (FIG. 15) formed at its outermost end within, adjacent to, or aligned with the body or head 110. This thread 114 is adapted to mate with the external thread 98 on the threaded shaft 68 so that as the roller rotates about the shaft 68, the movable connector rotates with the roller and moves along the length of the shaft 68. Thus, the relative rotation between the movable connector 66 and the shaft 68 causes the movable connector 66 to translate along the length of the shaft in the direction dictated by the direction of rotation of the roller and the threads 98. The head 110 on the movable connector has diametrically opposed ribs 116 (see FIGS. 16 and 18) adapted to be received in diametrically opposed internal grooves 118 formed in the inner component 48 of the roller 42 as seen in FIGS. 7, 9, 16 and 18. The internal grooves extend along at least a portion of the length of the inner component roller 48, and are extend linearly. The length of extension of the internal grooves is sufficient to allow for the movable connector 66 to move with the end of the spring 38 from its length when the shade is retracted to its length when the shade is extended. This assures that the movable connector will rotate in unison with the roller during operation of the shade but can translate along the length of the roller (along the length of the internal grooves) as it is rotated about the threaded shaft.

As will be appreciated from the above, as the roller 42 rotates with its support bearing 60 at the left end thereof, it causes the movable connector 66 to rotate about the fixed threaded shaft 68 and also translate along the length of the shaft 68, which causes the coil spring 38 to be lengthened or shortened thereby affecting the axial bias of the spring. The threaded shaft 68 may be axially compressed in the direction towards, and against, the rotatable bearing 60 due to the thrust forces created by the spring tension, with the compression force of the spring being exerted at least in part along the fixed shaft between the movable nut 66 and the fixed nut 64. The spring thus biases the movable nut 66 (as the spring extends) towards the fixed nut 64. The threaded shaft is secured to the left end cap so as not to be rotatable relative to the head rail 32. Accordingly, rotation of the roller 42 around the fixed threaded shaft 68 will effect controlled translation of the movable connector 66 along the shaft and affect the axial bias of the coil spring. For instance, the axial bias of the spring 38 will relatively increase as the spring is extended (shade is extended), and relatively decrease when the spring is shortened (shade is retracted).

The counter balancing spring motor in this first example is the spring 38, which acts through the movable connector 66 to apply a biasing force to the roller 52 in the direction to urge the roller 52 to rotate in the direction of retracting the shade. From the fully extended position, the movable connector is urged by the tension in the sprint 38 toward the fixed connector 64. The tension force applied to the movable connector 66 urges it to rotate along the threads 98 of the shaft 68 toward the fixed connector. The movable connector 66 thus rotates around the shaft 68 as it translates along its length. Since the movable connector 66 is rotationally keyed to the roller, yet free to translate relative to the roller, the rotation of the movable connector 66 urges the roller to rotate in the direction to retract the shade. The force applied by the counter balancing spring motor may or may not be sufficient to cause the roller to rotate independently of a user lifting the bottom rail. The drive mechanism of the operating system of this first example may include the shaft 68, the spring 38, the fixed nut 64, and the movable nut 66, or any subcombination thereof. The shaft 68 is fixed to the head rail, and the end of the spring 38 attached to the movable nut 66 is slidingly attached to the roller. In this way, the driving mechanism biases or urges roller 52 and shade 44 in the retracting direction. The spring 38 of the operating system is indirectly connected to the roller 52, through the movable nut 66 rotating as it moves along the shaft 68, and thus indirectly applies a biasing or urging force to the roller 52.

As is best appreciated by reference to FIGS. 15-20, a shaft or screw limit stop mechanism is shown and described. When the roller 42 is rotating in a direction that causes the movable connector 66 to translate toward the left end cap 62 (the shade is extending), thereby tensioning and effectively lengthening the coil spring 38, the movement of the movable connector 66 it is limited by the abutment stop 102 protruding radially from the threaded shaft 68. The abutment stop 102 may be formed on the threaded shaft 68 spaced away from the terminal end of the thread 98 so as to be positioned at an outermost end 120 of the internal thread 114 of the movable connector (see FIG. 17) when the internal thread 114 and abutment stop 102 are engaged. When the portion of the thread 114 of the moveable connector 66 engages the abutment stop 102 and the movement of the connector 66 is halted, the other end 122 of the single thread 114, as best seen in FIG. 17, becomes aligned near or at the end 100 of the thread 98A on the threaded shaft 68. The shaft or screw limit stop includes the abutment stop 102 extending outwardly from the threaded shaft 68. This shaft or screw limit stop interferes with the rotation of the thread 114 formed on the inside surface of the movable connector 66. This position denotes the full extension of the shade.

A vane orientation stop mechanism is described with reference to FIGS. 17 and 19. A terminal thread 98A is formed at the end portion of thread 98. A knuckle 123 is formed in thread 98A, at or near the terminus of thread 98, that defines an apex or transition in the thread direction, and at which the thread 98A reverses direction or angle at least a slight amount. The portion of thread 98A that extends beyond the knuckle 123 and that is in the reverse direction from the balance of thread 98 before the knuckle is defined as the end tab. The end tab 125 of the thread 98A is angled back towards the previous extensions of thread 98. In this manner, the terminal thread 98A defines the knuckle 123 that defines an apex directed towards the end of the shaft 68.

The internal threads 114 defined on movable nut 66 have corresponding features defined thereon to aid in the operative engagement with the knuckle 123 and tab 125 on the thread 98 of the shaft 68. The thread 114 defines a knuckle 114A (FIG. 19), at which point a terminus portion of the thread 114 forms a tab 114B with an angle slightly reversed from the earlier extension of thread 114. The knuckle 114A and the tab 1148 are shaped and formed similarly to that described with respect to the knuckle 123 and tab 125 on thread 98.

When the knuckle 114A passes knuckle 123 (FIG. 17) as the movable connector rotates near the end of its travel, the end tab 125 on thread 98 will come into engagement with the tab 114B on thread 114, and the respective reverse angles at which each tab extends forms an over-center latch or position that anchors or resists the movement of the movable connector 66 back towards the fixed nut under the tension of the spring 38 (retraction of the shade). This is because beyond the respective knuckles 123, 114A, the end tab portions 125, 114B of the threads 98, 114 angle in a direction reverse to the direction of the rest of the thread 98 and 114. The position of the knuckle 114A and tab 1148 on the movable nut 66 in an orientation to connect with the end tab 125 thus interferes with the rotation of the roller in a direction to retract the shade from the fully extended position. So, as the movable connector 66 translates towards the left end cap 62, and the single thread 114 is aligned with the end 100 of the thread 98A, the knuckle 123 and tab 126 (which is reversed in a spiral direction from the rest of the thread) defines a seat. The seat defined by the knuckle 123 and tab 125 encourages the movable connector or nut 66, when knuckle 114A and tab 1148 are positioned at the seat to remain in the over-center position past the knuckle 123. In other words, the reversed direction of the spiral thread at the knuckle 123 near the end 100 of the shaft, as shown in FIG. 17, provides an over-center relationship between the movable connector and the thread on the shaft to selectively and releasably hold the movable connector in position under the tension of the spring 38. This also corresponds generally with the position of the maximum bias provided by the coil spring 38, which also generally corresponds with the limit of the extension of the shade. Also, when the thread 114 engages the end tab 125 and is held in that bottom-most position by the tension applied by the spring 38, the thread 114 may also be in contact with the abutment stop 102. At this bottom position, the bottom rail is oriented so as to cause the front and back sheets to move relative to one another and become spaced apart, which orients the vanes in a relatively horizontal (or open) position, such as the orientation shown, for instance, in FIG. 7B. The knuckle 123 formed on the thread 98 is included in the vane orientation stop mechanism, which causes the thread 114 to engage the end tab 125 and holds the vanes in an open position. Other examples of the vane orientation stop mechanism described above are provided below.

The movable connector 66 is selectively and releasably prevented from reversing direction due to the engagement of the end 122 of its thread 114 with the reversed end tab 125 on the main thread 98 of the shaft 68, which is positioned past the knuckle 123 (FIG. 17). Movement of the roller 42 in an opposite direction causes the internal thread 114 of the movable connector as viewed in FIG. 17 to move over the knuckle off its over-centered relationship with the end 100 of the thread 98A on the shaft 68 to allow the roller to rotate to retract the shade with the assistance of the spring tension. During the retraction of the roller, the movable connector 66 begins to rotate and follow the thread on the shaft back towards the fixed connector 65.

Rotation of the roller 42 in a forward or rearward direction is caused by creating downward tension on either the front 44 or back 45 vertical sheets of the shade material (FIG. 7), respectively. This may be accomplished by a user pressing down on the front or back edge of the bottom rail 34, which is attached respectively to the bottom edges of the front 44 and back 45 vertical sheets. In other words, the operator can place the shade in an extended position with the vanes open by pulling down on the back edge of the bottom rail, which rotates roller 42 to its limit and places the end tab 125 portion of the thread 98A into the over-centered and seated position (FIG. 17). In the over-centered and seated position, the thread 98 negates or resists the bias exerted by the spring that may otherwise rotate the roller tube in a direction to cause the orientation of the bottom rail to change and the vanes to close.

When the vanes are open in this bottom-most over-center position, the operator can push down on the front of the bottom rail, effectively tensioning panel 44 and causing the roller 42 to rotate in a direction which turns connector 66 and overcomes the rotational resistance created in the over-center seated position. This causes the vanes to close. The angle of the thread 98 before the knuckle 123 is relatively steep, and the reverse angle of the thread 98A forming the tab 125 after the knuckle 123 may be relatively steep or shallow. The apex of the knuckle itself may be rounded, to allow the movable connector 66 to disengage as selectively desired by the user by pulling down on the front edge of the bottom rail, as is described below. The angle of the thread 114 before the knuckle 114A is relatively steep, and the reverse angle of the thread forming the tab 114B after the knuckle 114A may be relatively steep or shallow. The apex of the knuckle 114A itself may be rounded. The over-centered position can thus be overcome relatively easily to allow retraction of the shade. Note that the thread angle before and after the knuckle on either of the threads 98 or 114 is not limited to that described or shown herein.

When the shade is lifted as by raising the bottom rail, the nut will rotate and translate toward the opposite or right end of the roller in the direction of the fixed connector 44. In other words, as the movable nut 66 is rotated on the threaded shaft 68 under the tension bias of the spring 38, it assists the roller to rotate with it, the movable nut 66 translates along the length of the roller (and shaft 68) to retract the coil spring and assist in the lifting of the shade into the partially or fully retracted position.

Figure 7C:
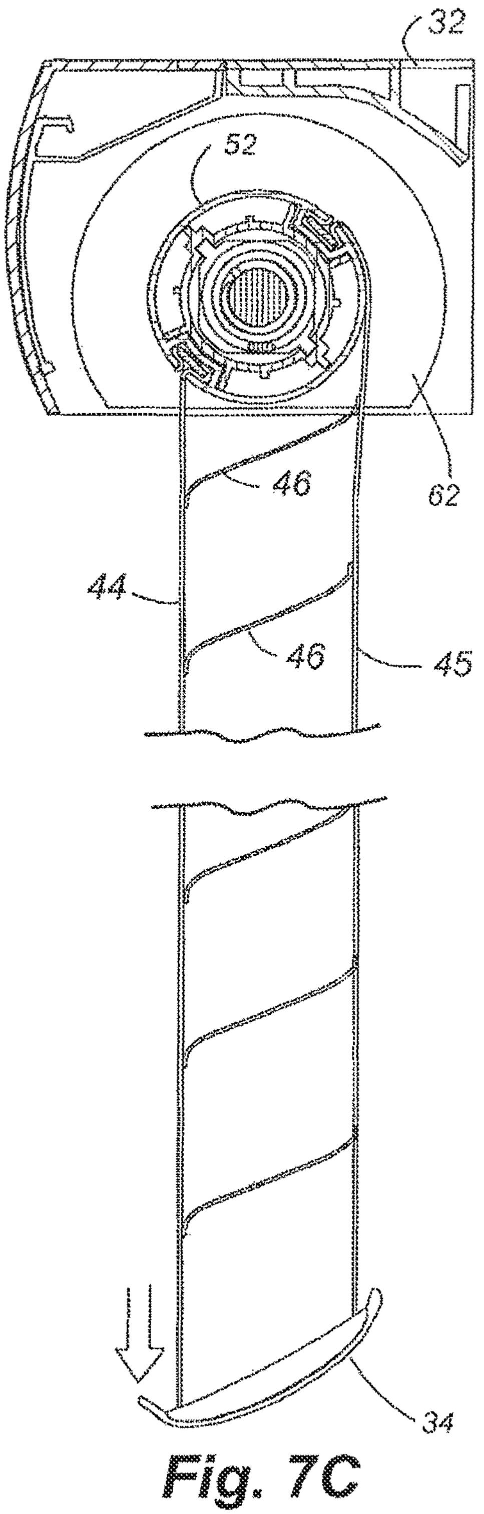
FIG. 7C is a section similar to FIG. 7B showing the bottom rail and vanes slightly tilted.

As can be appreciated from the above, when the end 122 of the thread 114 is in its over-centered and seated position past the knuckle 123, the shade is in the fully open and extended position of the FIG. 7A or 7B. It will be appreciated in the fully opened position that the vanes 46 are substantially horizontally disposed so that there is substantially full vision through the shade. By lowering the front edge of the bottom rail, as shown in FIG. 7C, the front sheet 44 of the fabric material is pulled downwardly relative to the rear sheet 45 so that the vanes 46 become slightly inclined thereby reducing the amount of the vision obtained through the shade. The position of the vanes illustrated in FIG. 7C occurs substantially at the time the end 122 of thread 114 is aligned with the knuckle 123. Once the end 122 of the thread 114 is moved past the knuckle 123 by lowering the front edge of the bottom rail as shown in FIG. 7C, the shade material will move to its fully closed position of FIG. 2. With the shade material closed, it can be raised by lifting the bottom rail toward the head rail of the covering, which allows the fabric material to wrap automatically around the roller 42 under the bias of the coil spring. Of course, the movement of the bottom rail toward the head rail can be stopped at any position and the shade will remain in that position until the bottom rail is raised or lowered.

With reference to FIGS. 5, 6, 8, 11, 12, 21 and 22, the right end of the coil spring is seen anchored to the fixed end connector 64. The fixed connector (see FIG. 12) has an external thread 124 formed on a cylindrical body 126 thereof adapted to receive the right end of the coil spring 38 by screwing the connector into the right end of the spring. The fixed end connector also has tabs 127 (see FIG. 8) that are received in the internal grooves 118 of the inner roller component 48 to assure unitary rotation of the connector 64 and the roller. The fixed connector 64 is adjustably located in any desired fixed location within the inner component 48 of the roller 42 by a pivotal plate 128 that is slid into and within an open cavity 130 in a larger diameter semi-cylindrical portion 132 of the fixed connector 64. The pivotal plate 128 is movable between a gripping position, as shown, for example in FIG. 22, where the outer edge 134 of the movable plate 128 is in contact with and wedged against the inner surface of the inner component 48 of the roller 42, and a release position, as shown, for example in FIG. 24, where the pivotal plate 128 has been pivoted in a counter-clockwise direction to release the engagement thereof with the inner wall of the inner component 48 of the roller 42. The pivotal plate 128 is biased into its gripping position of FIG. 22 by a spring plate 136 integrally formed on the fixed connector. In this example the spring plate is in the form of a cantilever member extending at an angle off an edge of the fixed connector 64.

As will be appreciated in FIGS. 5 and 6, in combination with the above description, the position of the fixed end 64 of the spring 38 relative to the left end of the roller 42 determines the amount of bias force the coil spring 38 can apply to the shade. Shifting the fixed end 64 of the spring 38 to the right away from the left end (i.e. bearing sleeve 60) will obviously provide a stronger or more powerful bias of the coil spring while shifting the fixed position of the fixed connector to the left will weaken the spring. In some examples, the spring bias is configured to be sufficient to raise the weight of the shade fabric, but is not sufficient to raise the fabric and the bottom rail. Therefore, the shade remains in a static position until a person manually lifts the bottom rail. As will be discussed in more detail below, in other examples, the bias force of the spring may be varied in other manners.

Figure 23:
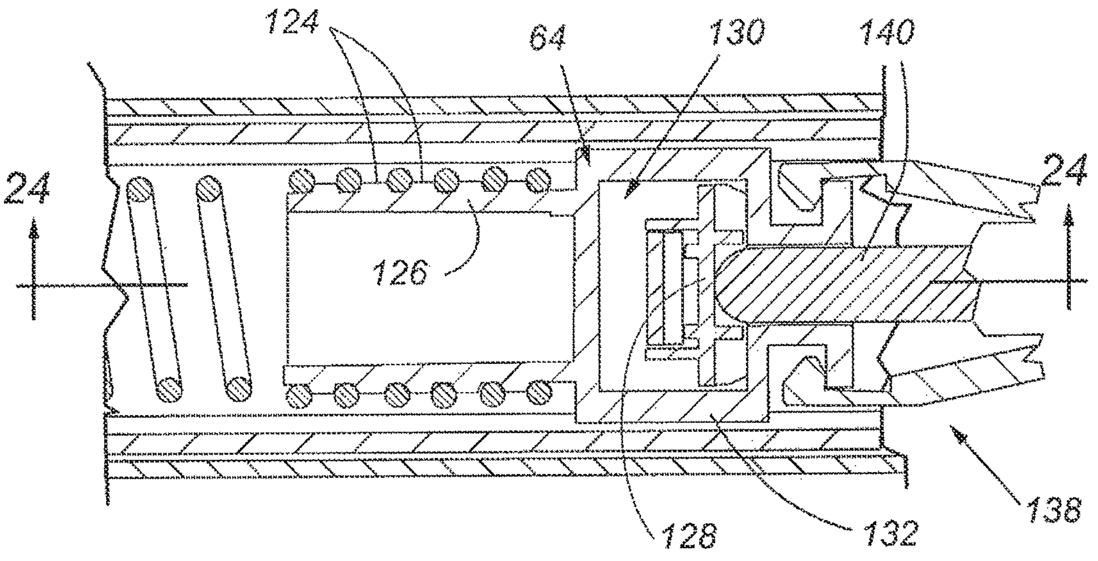
FIG. 23 is a section similar to FIG. 21 showing a system and a tool for adjusting the fixed end of the coil spring.
Figure 24:
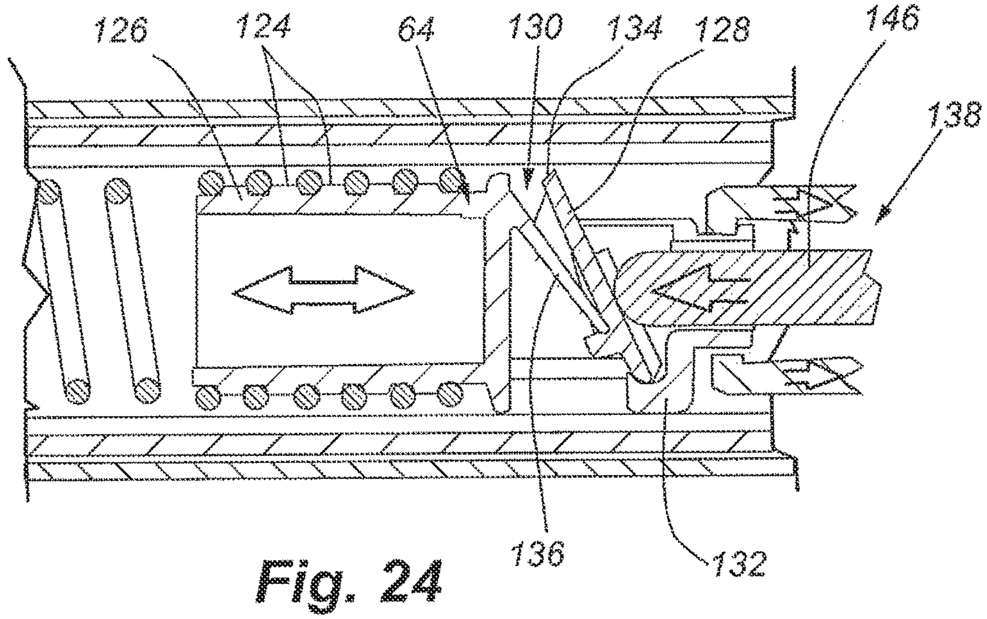
FIG. 24 is a section taken along line 24-24 of FIG. 23 with the tool having been inserted a further distance.
Figure 25:
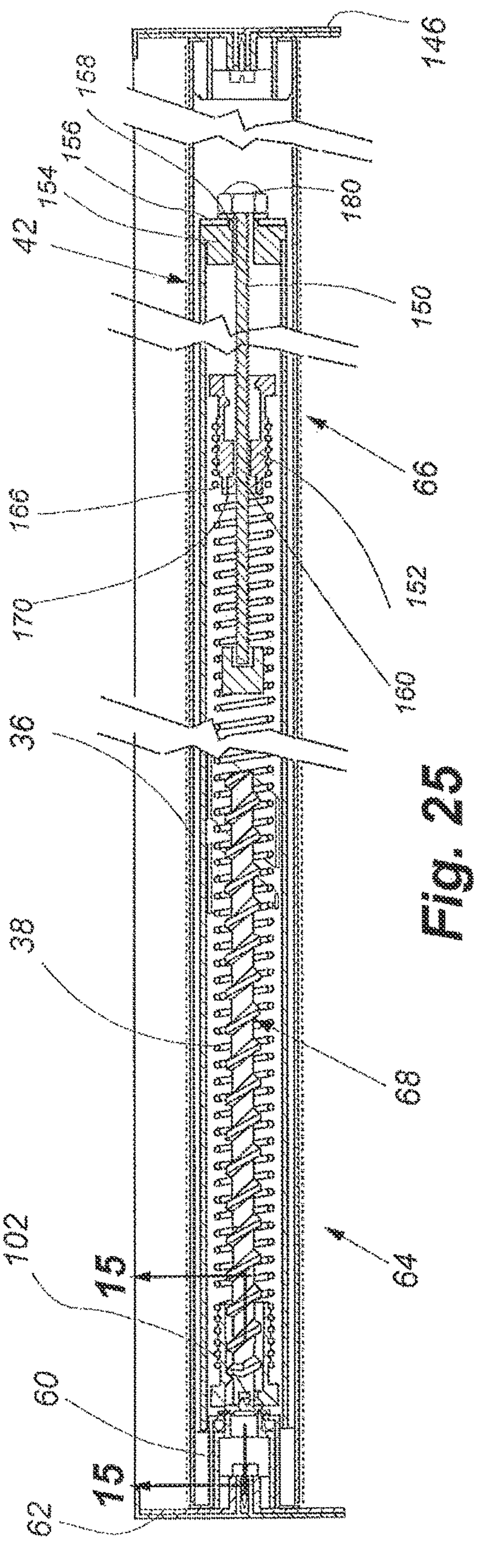
FIG. 25 is a section similar to FIG. 5 showing another example of the disclosure.
Figure 26:
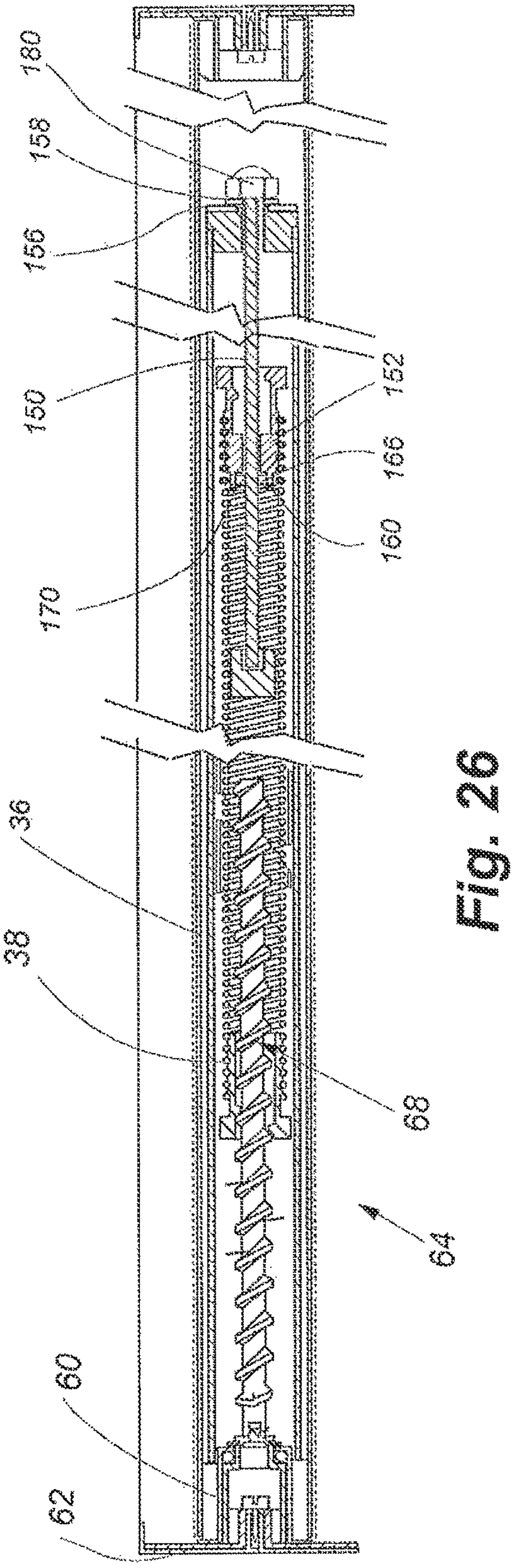
FIG. 26 is a section similar to FIG. 6 of the example of FIG. 25.

Referring to FIGS. 23 and 24, the position of the fixed end connector 64 is shown being moved with an auxiliary tool 138. The auxiliary tool 138 may include a plunger 140 adapted to be inserted through the outer open end of the fixed connector 64 and into engagement with the pivot plate 128. The plunger 140, once inserted, depresses the plate 128 as shown in FIG. 24 against the bias of the spring plate 136. By doing so, the fixed connector 64 is free to slide within the inner component 48 of the roller 42 either to the left or to the right, and grippers 138 are provided on the tool to grip a disk 140 on the outer end of the fixed connector so that it can be pulled to the right if desired. By releasing the grippers and pulling the plunger out of the fixed connector 64, the pivotal plate 128 will re-engage the inner wall of the inner component 48 of the roller so that the fixed connector 64 will remain in position.

Referring to FIGS. 5 and 6, it will be appreciated the right end of the roller 42 is rotatably mounted on a bearing 142 that sits on a cylindrical stub shaft 144 that projects inwardly from a right end plate 146 of the head rail 32. In this manner, the roller 52 may be rotatably supported by the bearing 142 at its right end and the bearing 60 at its left end and the outer component 52 of the roller can extend fully from one end plate to the other so that a shade material 36 extending substantially the full width of the head rail between the end plates 146 and 62 can be supported by the roller 42.

It will be evident from the above that there are relatively movable parts within the operating system of the present disclosure such as between the movable end connector 66 and the threaded shaft 68, and the left and right end bearings 60 and 142, respectively, supporting the roller 42 on the left and right end plates of the head rail 32. Pursuant to the present disclosure throughout, a level of predetermined level of friction may be built or designed into the moving parts of the operating system at these and maybe other locations, which friction would be within a range of coefficients of friction, the range being dependent upon the weight of the shade material combined with the weight of the bottom rail.

As mentioned previously, the combination of the friction between the relatively movable parts in the operating system and the upward bias force generated by the coil spring 38 and applied to the shade and bottom rail 34 support the shade against the action of gravity thereon. In other words, without the spring or the friction, the bottom rail would fall by gravity to the extended position of the covering, such as defined by the bottom of the architectural opening in which the shade is mounted. However, the combination of the bias of the spring and the friction built into the system cooperates to hold the bottom rail (and shade) against movement at any predetermined position of the bottom rail within the architectural opening. This occurrence helps mitigate the need to have an exact upward bias force needed by the spring to allow the positioning of the shade in between the fully extended and fully retracted positions. The friction in the system may help temper the effect of gravity where the spring force may be slightly lower than desired, and the friction in the system may also temper the effect of a spring having a slightly higher bias force than is desired.

The coil spring may generally provide the primary anti-gravity or counter-balancing support for the bottom rail and shade, while the friction may fine-tune that anti-gravity support. Since the bias in the coil spring can be adjusted by selecting a spring with the appropriate spring rate and adjusting the fixed location of the fixed end connector 64 along the length of the roller 42, the bias of the coil spring 38 may be made to by itself precisely counteract the weight of the shade fabric at any extension position and regardless of the effect of the friction in the system. It should be appreciated, as previously mentioned, the effective weight of the shade fabric increases as the shade is extended. It should also be appreciated the bias of the coil spring increases as the movable end connector 66 moves to the left increasing the bias of the spring. The combination of the variable bias of the spring and the built-in friction of the relatively movable parts has been found to offset gravity on the combined weight of the shade material and the bottom rail to prevent movement of the bottom rail by gravity at any selected position within the architectural opening in which the bottom rail is manually placed. It is contemplated that while the bias force varies, as described throughout, with the extension of the shade element, the operating system may be designed to include a transmission mechanism that would allow the bias force to be constant or decrease throughout the extension of the shade element if a level or decreasing bias force was desired.

As will be appreciated from the above, an operator can easily retract or extend the shade by simply lifting or lowering the bottom rail and can tilt the vanes to adjust the amount of vision and light permitted through the shade material by tilting the bottom rail when in the extended position. The effort of the operator in combination with the bias of the coil spring make the movement very simple and substantially effortless.

Referring to FIGS. 25-28, another example of the covering is illustrated. This embodiment may be substantially similar to the embodiment illustrated in FIGS. 1-24. However, in this example, the system utilized for anchoring the right end of the spring 38 may be varied. Accordingly, the below description of the embodiment of FIGS. 25-28, may refer to the system for mounting the fixed end of the spring even though reference numerals are included as they occurred in the description of the first embodiment.

Figure 27:
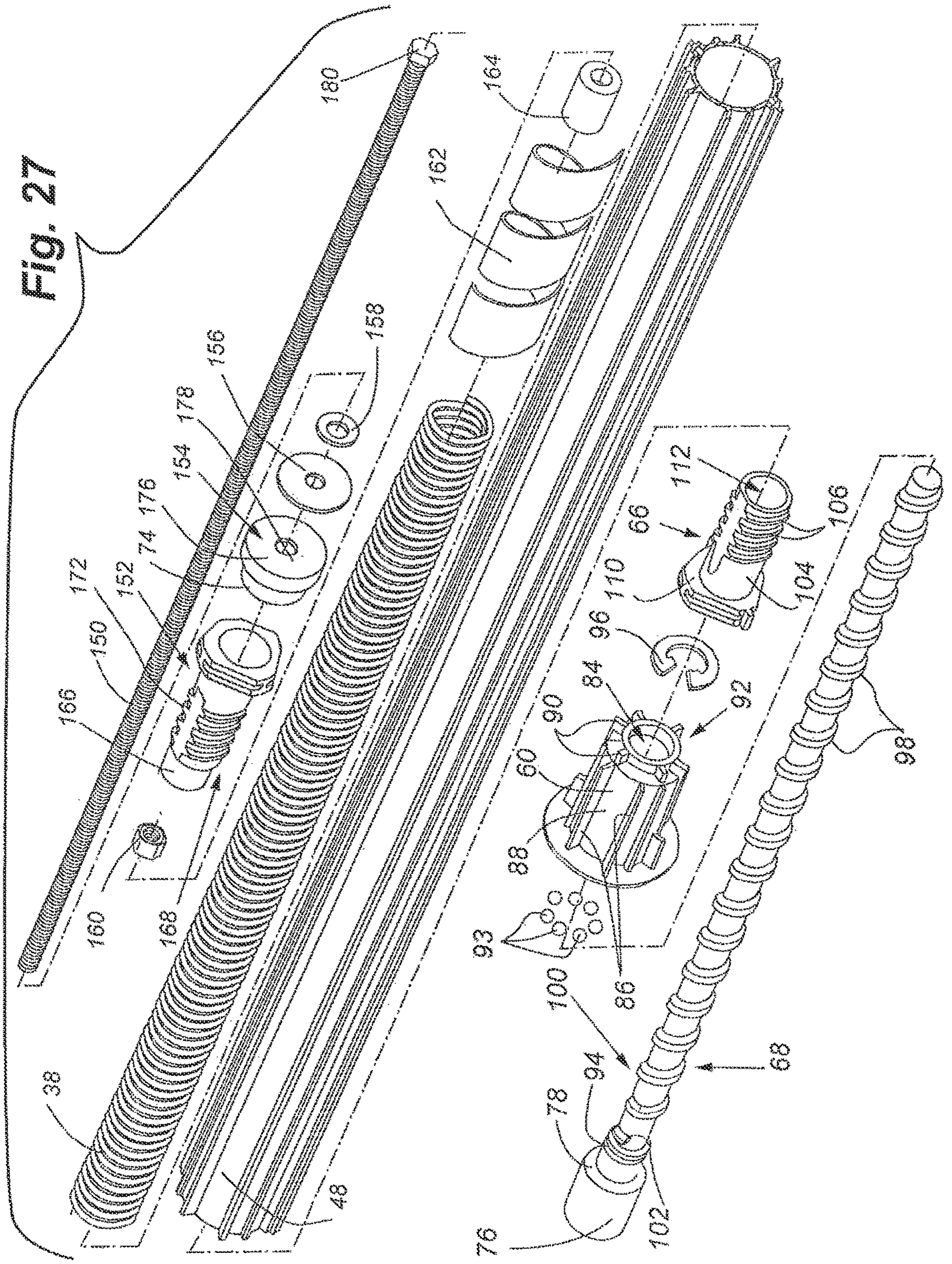
FIG. 27 is an exploded isometric of the example of FIGS. 25 and 26.
Figure 28:
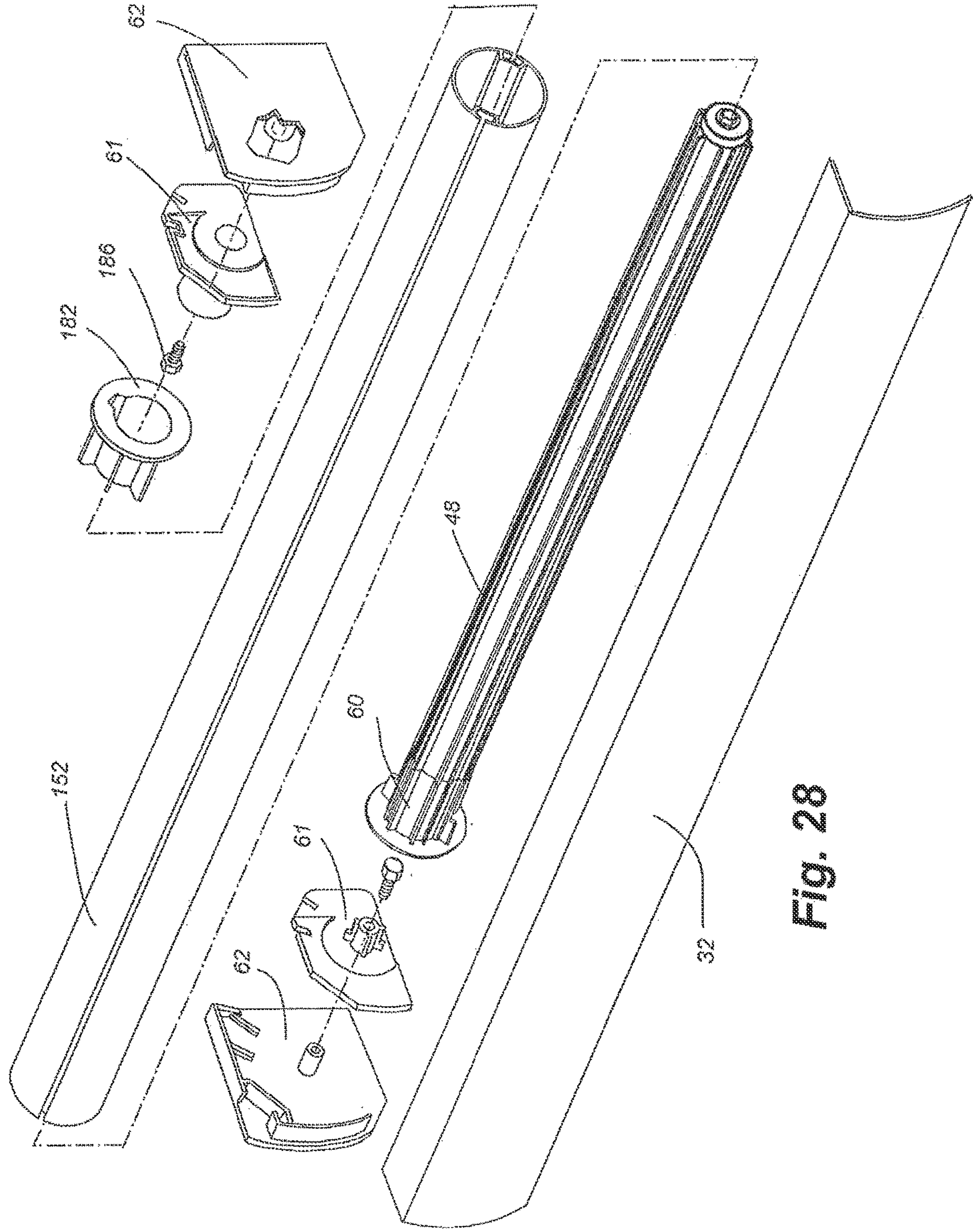
FIG. 28 is an exploded isometric of the example of FIGS. 25-27 showing the operating system connection to the end caps.

With reference to FIG. 27, the threaded shaft 68, bearings 93, the hub or bearing 60, the c-clip 96, the moveable end connector 66, the inner-cylindrical component 48 of the roller and the coil-biasing spring 38 may be identical to the first described embodiment. However, in this example, the system for anchoring the fixed end of the coil spring includes an elongated threaded bolt 150, a fixed end anchor 152, an end plug 154 for the inner-roller component 48, large 156 and small 158 bearing washers, and an adjustable nut 160 adapted to be threaded onto the bolt. The outer spiral wrap element 162 (which could also be used in the first described embodiment) may be used for dampening spring vibration and may prevent the spring from banging or running against the inner wall of the roller component 48. Looking first at the fixed end anchor 152, it may be substantially identical to the moveable end anchor 66, except that the fixed end anchor 152 has a short cylindrical extension 166 from its threaded end 168. The cylindrical extension 166 may include a hexagonal socket 170 formed in its axial end for receipt of the nut 160 to prevent the nut from rotating relative to the fixed end spring anchor. As with moveable end anchor 66, threads 172 are provided thereon so that the fixed end of the coil spring 38 can be screwed onto the fixed end anchor to fix the fixed end of the spring to the fixed end anchor. The end plug 154 for the roller component 48 is a cylindrical plug having a small diameter portion 174 adapted for insertion into the open right end of the roller component 48 and a larger cylindrical component 176 that abuts the adjacent end of the roller component 48. The plug has a centered passage 178 there through for slideable receipt of the threaded bolt. The large 156 and small 158 bearing washers also have passages there through for alignment with the passage through the plug 154 so that the bolt 150 can also pass through the bearing washers with a hexagonal head 180 of the bolt then being exposed at the right end of the roller tube 48.

The threaded rod is inserted through the washers and the end plug and subsequently through the fixed end anchor for the spring and then receives the threaded hexagonal nut 160 thereon, which is seated within the socket 170 at the free end of the cylindrical extension on the fixed end anchor.

In as much as generally the coil spring 38 may always have some bias, meaning for instance and similar to that of the first embodiment described above, at its length of extension when the shade is in a fully retracted position, the coil spring tends to bias the fixed end anchor to the left, thereby encouraging the hexagonal nut to remain within the socket at the left end of the fixed end anchor.

With this arrangement, by rotating the threaded bolt 150 with a socket-type tool (not shown) by engaging the hexagonal head 180 of the bolt it can be rotated causing the nut 160 to translate along the length of the bolt. As the nut 160 translates along the bolt length, it thereby moves the fixed end anchor along the length of the bolt to vary the tension or bias of the coil spring. Thus, the desired bias of the spring is easily manipulated by rotation of the bolt with an appropriate socket-type tool or other tool inserted through the open end of the roller 42 where it can engage the head of the bolt as possibly best appreciated by reference to FIG. 28.

The inner plug 164 supports and centers the free end of the bolt 150, which extends into the center hole in plug 164. The plug 164 also serves as a safety stop to contain the spring energy in the event that a component in the assembly should fail. The inner plug 164 is sized to fit within the inside of the coil spring.

The right end of the outer roller component 52 receives a splined bearing 182 such that they rotate together. The bearing 182 rotatably sits on a cylindrical hub 184 integral with bearing plate 61 which is in turn connected to the end cap 62 with a fastener 186.

The operating system may include different examples the operating system including the drive mechanism, screw limit stops, counterbalance mechanisms and/or orientation stops. In one example, the counter-balancing mechanisms may include one or more windable springs that may be operably connected to a non-rotatable shaft or rod at one end, and operably connected to the roller so as to move with the rotation of the roller. As the roller rotates, such as due to a user retracting or extending the shade upward or downward, the rotatable springs may wind around a fixed axle or rod at right angles to the rod's length to vary the biasing force or strength of the spring. For example, the rotatable springs may compress (increase bias force) or decompress (decrease bias force) as one end is wrapped and unwrapped around the non-rotatable shaft.

Figure 30:
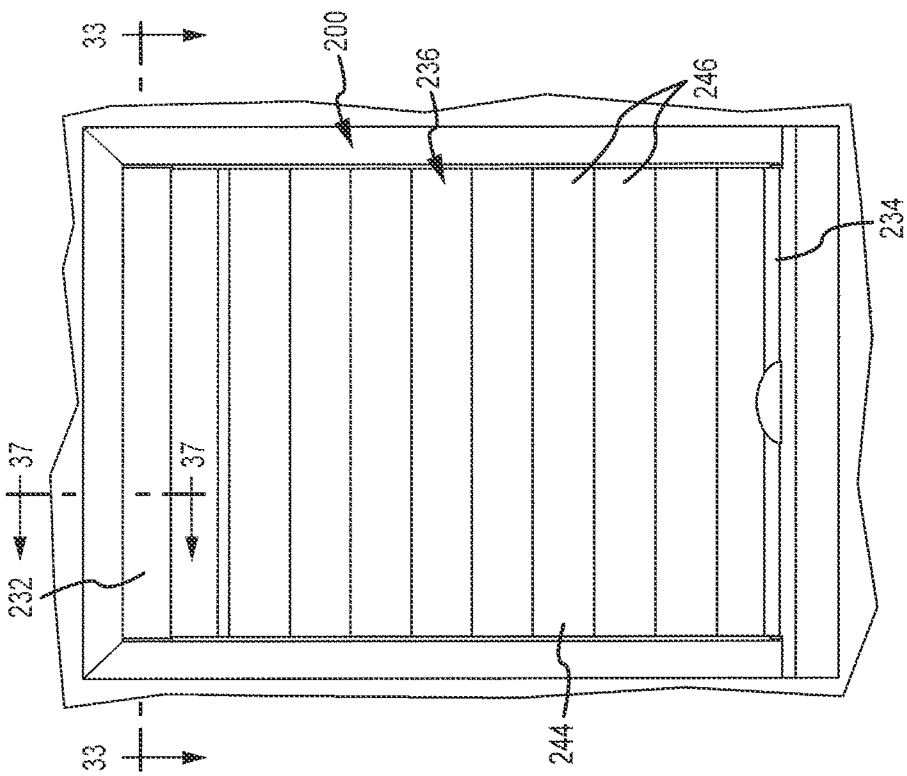
FIG. 30 is a plan view of an architectural opening having a shade mounted therewith in a fully extended configuration.
Figure 29:
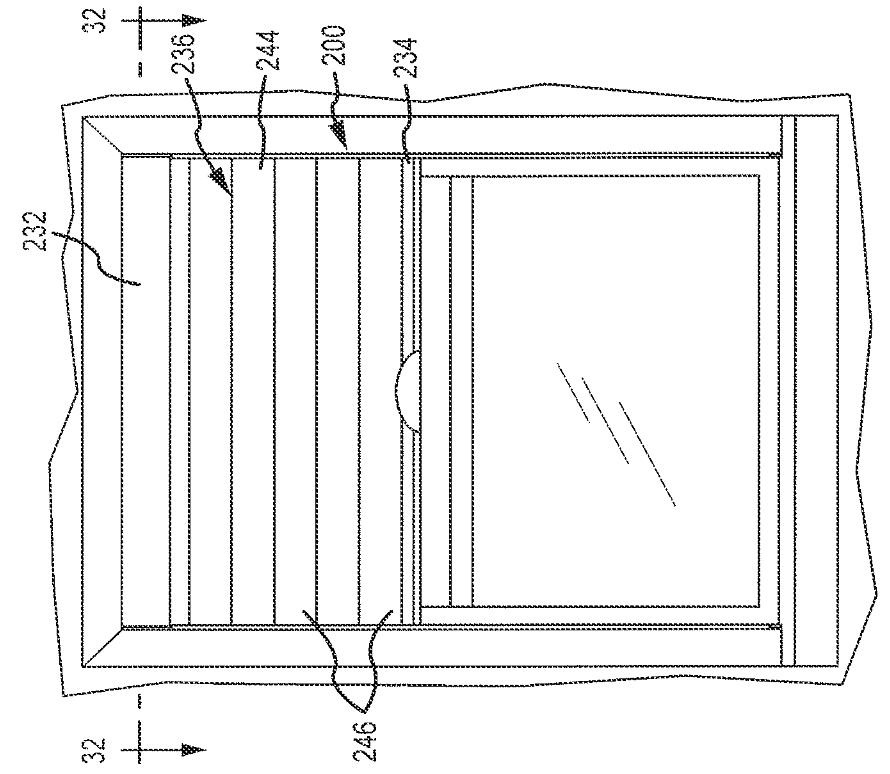
FIG. 29 is a plan view of an architectural opening having a shade mounted therewith in a partially extended configuration.
Figure 31:
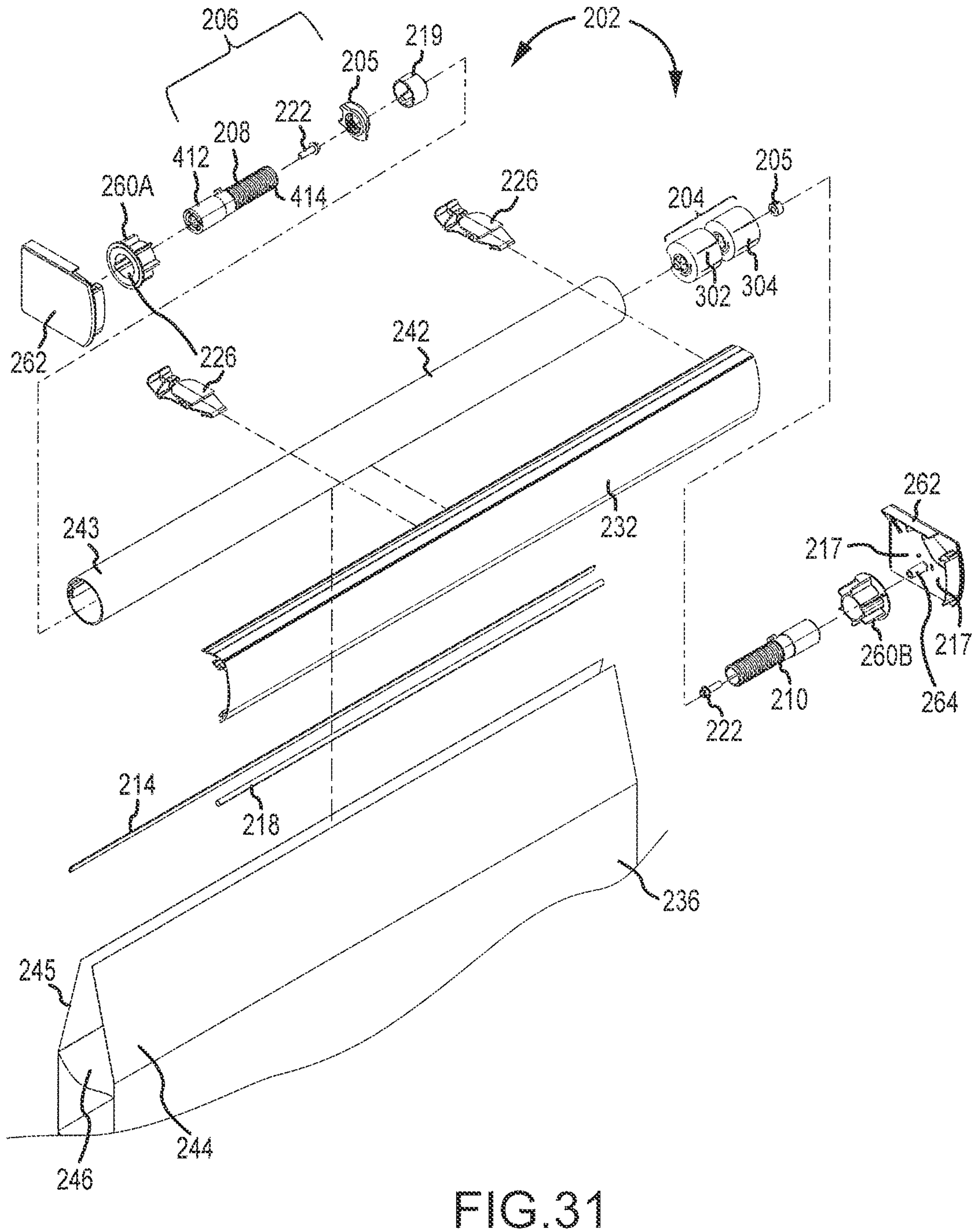
FIG. 31 is an exploded view of an example of the present invention utilizing a counter balancing spring motor in the form of a clock spring.
Figure 32:
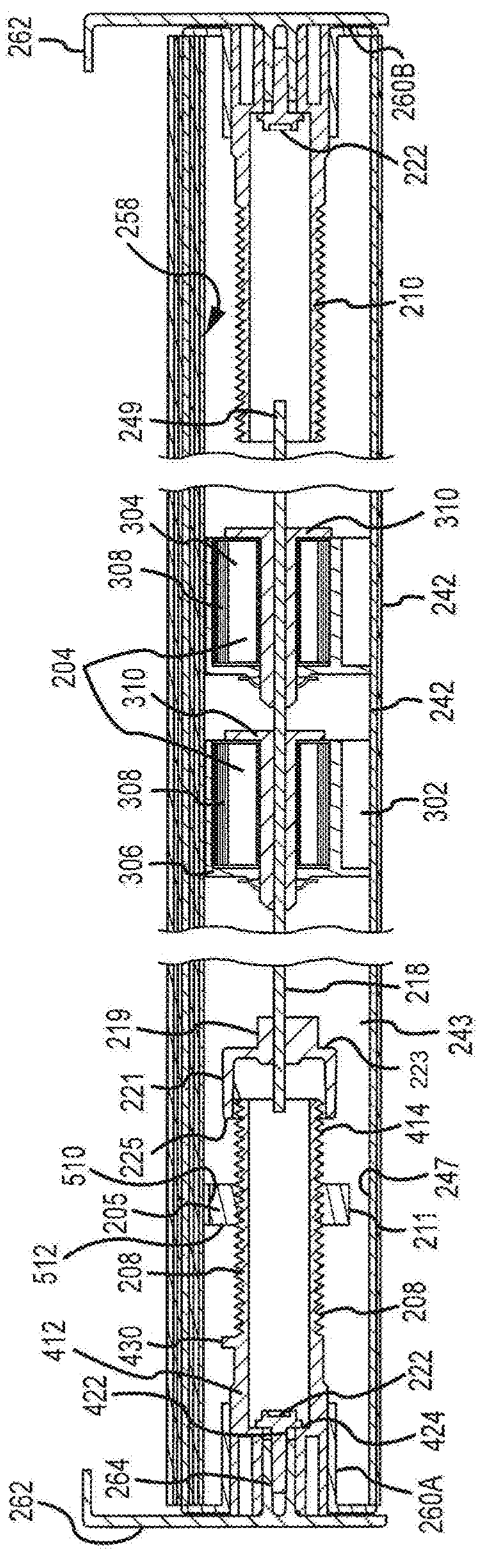
FIG. 32 is a section taken along line 32-32 of FIG. 29.
Figure 55:
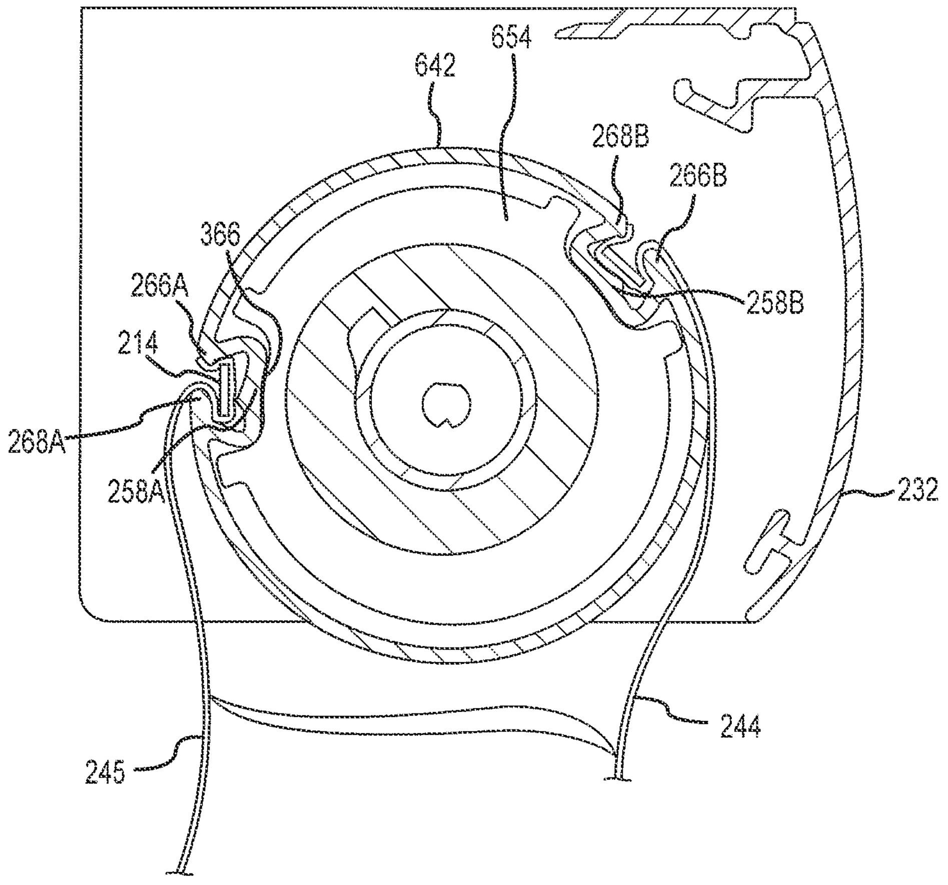
FIG. 55 is a section view similar to that of FIG. 37.
Figure 56:
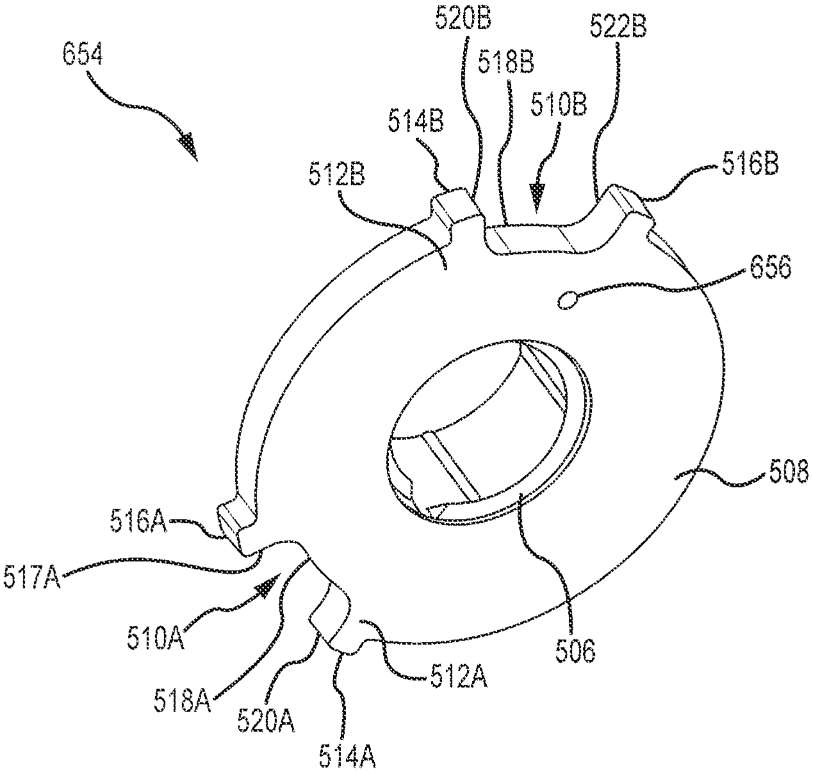
FIG. 56 is a perspective view of a nut structure.
Figure 57:
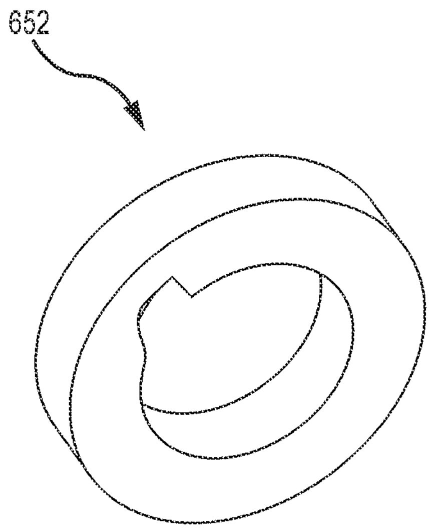
FIG. 57 is a perspective view of a collar.

A first example of an alternative counter-balancing system is described with reference to FIGS. 29 and 30. FIG. 29 is a front elevation view of an architectural covering incorporating an alternative example of the operating system with a shade partially retracted. FIG. 30 is a front elevation view of an architectural covering including another example of the operating system with a shade partially retracted. The covering 200 may include a head rail 232, a roller and drive mechanism (not shown), a shade 236, and an end rail 234. The head rail 232 may be operably connected to two end caps 262 (See FIG. 32) that may be secured to opposing ends of the head rail 232. As noted above and described in further detail below, the shade 236 is attached to the roller for retraction onto and extension there from. As shown in FIG. 31, the architectural covering may also include one or more top stops 226, which keep the bottom rail from wrapping over the top. The shade 236 may be substantially similar to the shade 36 illustrated in FIG. 1, and may include a front sheet 244, a rear sheet 245 (See FIG. 55), and one or more vanes 246. Referring now to FIGS. 31 and 32, the covering 200 may also include an operating system 202 to assist in extending and retracting the shade 236, as well as to open and close the vanes when the shade is in the extended position. FIG. 31 is an exploded view of an operating system 202 or drive mechanism including one or more counter balancing spring motors 204 and/or an orientation stop mechanism 206. As shown in FIG. 32, the counter-balancing spring motor 204 and the orientation stop mechanism 206 may be disposed in an interior of a roller 242, which operably connects to the shade 236, such as in the manner described above with respect to the first example. The orientation stop mechanism 206 will be discussed in more detail below, but generally may assist in retaining the shade 236 in an extended position with the vanes 246 in one or more than one open configuration.

The counter balancing spring motor 204 may apply a biasing force to the roller 242, directly or indirectly, to balance the weight of the shade 236 in order to allow the shade 236 to be positioned in a fixed location along any point along the length of extension of the shade 236. In other words, the shade 236 may be positioned at substantially any location between the fully extended and fully retracted positions. Since the counter-balancing spring motor 204 eliminates the need for operating cords and acts as a cordless shade position mechanism or lock, it may help reduce accidents or injuries resulting from people or animals interacting with operating cords.

The counter-balancing spring motor 204 may include one or more spring units 302, 304 that may vary a biasing force exerted on a roller operably connected to the shade 236. The biasing force is applied to the roller in the direction opposite the direction of rotation of the roller when the shade is extending. The biasing force is related to the extended position of the shade 236 relative to the roller. As the shade 236 transitions from the retracted position to the extended position, the biasing force exerted on the roller 242 by the one or more springs in the direction of retracting the shade may increase in order to counteract the increase of the effective weight of the shade 236 due to the shade extending away from the head rail 232. Because the biasing or urging force of the counter balancing spring motor 204 varies with the amount of extension and retraction of the shade, the biasing force exerted by the counter-balancing spring motor 204, in addition to inherent friction within the operating system of the covering 200, provides a sufficient counter-balancing force to allow the shade 236 to be held in position along any location between extended and retracted positions. It should be noted that in the fully retracted position, the counter balancing spring motor may apply a biasing or urging force to the roller to assist the shade in maintaining its retracted position, and to reduce any looseness or the like experienced by the user when first extending the shade from the fully retracted position.

Figure 33:
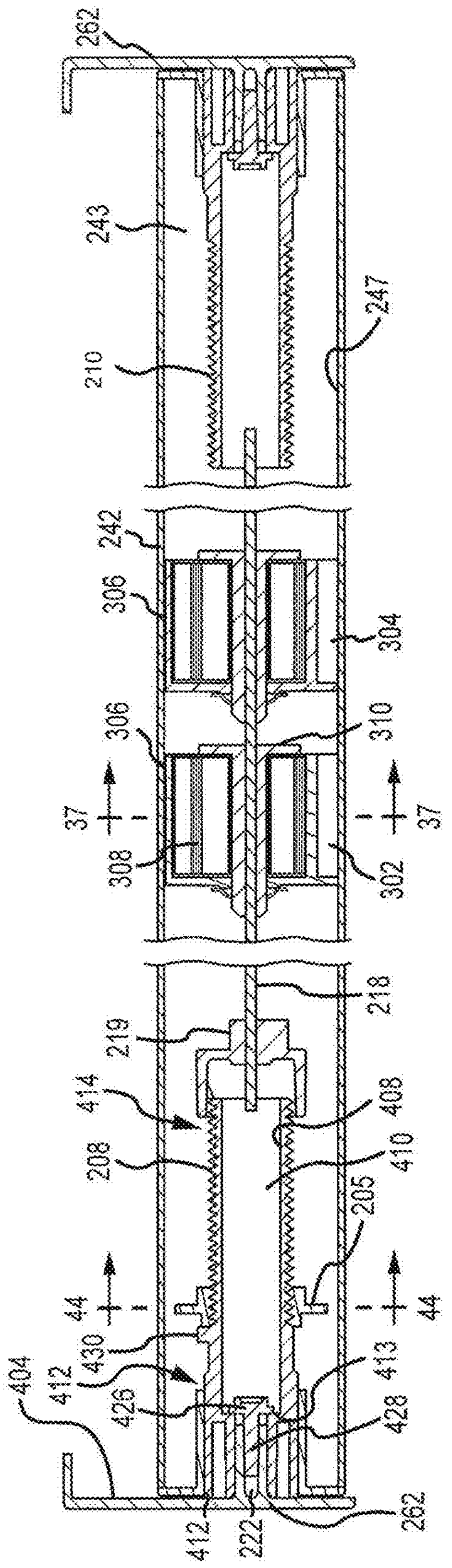
FIG. 33 is a section taken along line 33-33 of FIG. 30.

The counter balancing spring motor 204 may be disposed within an interior cavity 243 of the roller 242. In this location, the counter balancing spring motor 204 is operably connected to a support rod 218, which is fixed in position relative to the end cap 262, and thus does not rotate along with the roller 242. The support rod 218 provides a fixed point of connection for the motor 204. As shown in FIGS. 32 and 33, the support rod 218 may be fixedly mounted within the head rail 232 such that it does not rotate with the roller. The spring motor 204 defines a fixed end which anchors to the rod 218, against which the spring motor winds-up to increase the spring force biasing the roller towards retraction when the shade is being extended.

Figure 35:
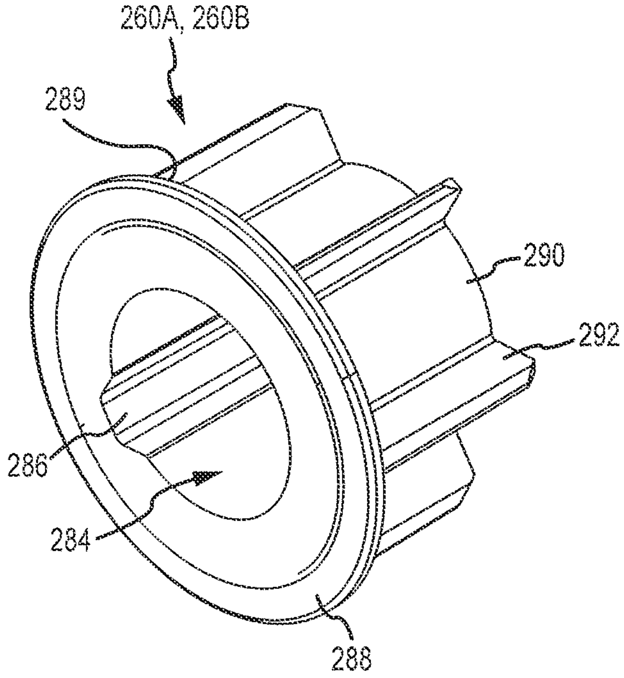
FIG. 35 is a hub that is received in an open end of the roller.

FIGS. 31, 32, and 33 show the general assembly of the covering 200, including the end plates 262, roller 242, and the operating system of this example. The operating system of this example includes the counter balancing spring motor 204, and rod 218. The roller 242 is rotatably mounted between the side plates 262 in a manner to allow rotation of the roller 242 relative to the side plates 262. The mounting of the roller 242 to each side plate 262 using hubs 260A and 260B is identical, so the structure associated with only one end of the roller 242 is described. A hub 260A is received in the open end 243 of the roller 242, and itself defines a central bore 284 (FIG. 35). The central bore 284 is rotatably received over an outer end 412 of an elongated tubular post 208, which outer end 412 is in turn is secured to the side plate 262 by a central boss 264 and fastener 222. The outer end 412 of the post 208 acts as a bearing, and the hub 260A rotates thereon as the roller 242 rotates during extension and retraction of the shade. The post 208 does not rotate relative to the side plate 262.

Still referring to FIGS. 31-33, the operating system is positioned within the roller, and engages the roller as well as the side plate at one end of the roller (the left end in FIGS. 32 and 33). The operating system includes a counter balancing spring motor 204, which has one actuable end (outer shell 306, FIG. 37) engaging the roller 242, and another fixed or anchor end 352 (inner tab) (FIG. 40) positioned inside the roller. As the roller rotates during the extension of the shade, the counter-balancing spring motor 204 also rotates, which increases the bias force between the actuable end and the fixed end, the bias force being in the direction against the direction of rotation of the roller during extension of the shade. The counter-balancing spring motor 204 is mounted on an elongated rod 218, with the fixed end of the counter balancing spring motor 204 anchored on the rod 218 to maintain its position during rotation of the roller 242. One end of the rod 218 is attached by a collar or cap 219 to the inner end 414 of the post 208, and held there in a fixed orientation so as to not rotate, thus providing a basis against which the counter-balancing spring motor 204 can increase its bias force during extension of the shade off of the roller 242. A screw limit nut 205 is threadedly engaged around an outer surface of the post 208, and engages at least a portion of its perimeter 211 the inner wall 247 of the roller 242 so that it rotates with the roller 242, but is allowed to move axially along at least a portion of the length of the roller. The screw limit nut 205 functions with the vane orientation stop to set the extension limit of the shade, as well as to allow the vanes of the shade to be held in an open position when at the extension limit. With reference to FIGS. 32 and 33, the roller 242 has an elongated cylindrical shape, and defines an internal cavity 243 having a generally elongated cylindrical shape defined by the inner surface 247 of the wall of the roller. The roller 242 may be made of metal, plastic, wood, or other suitable materials, and may include a single piece, or more than one piece permanently or temporarily secured together. The roller may be received within an elongated cavity defined by the head rail 232, and the shade 236 may extend from the roller 242. With the hubs 260A and 260B mounted in the ends of the roller 242, the rotatably engaging the side plates 262 of the head rail, the roller may rotate in the head rail as controlled by the user. The roller acts to retract or extend the shade, or hold the shade in a fixed position of extension as desired by the user.

Figure 34:
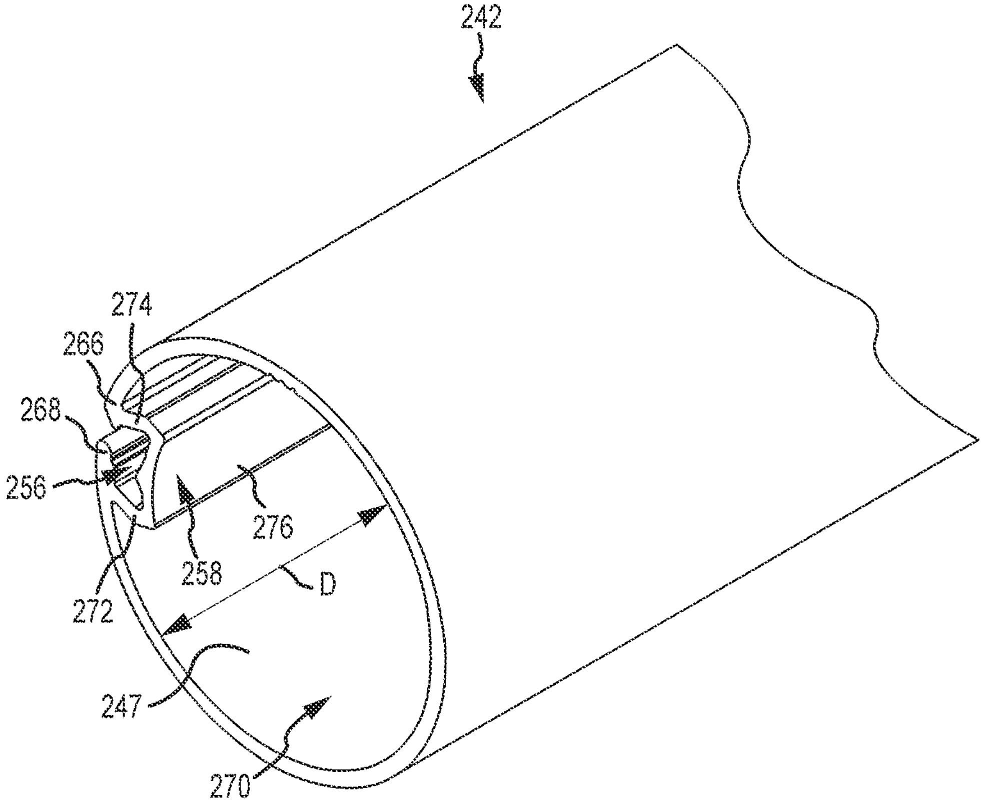
FIG. 34 is an enlarged perspective view of an open end of a roller.

As shown in FIG. 34, the internal cavity 243 of roller 242 may define a diameter D and may define a shade securing groove 256 extending longitudinally along the length of the roller 242. The groove 256 extends into the inner cavity 243 of the roller 242. The shade-securing groove 256 may operably receive the shade 236 by an anchor strip 214 positioned into and secured within the shade-securing groove 256. The anchor strip holds the fabric of the shade that extends over the roller between the front 244 and rear 245 sheets in the groove. The shade-securing groove 256 may define, in radial cross-section, a larger dimension at the bottom or radially inward end 278, and a narrower neck that opens through the outer surface of the roller 242. The groove 256 may extend the entirety of the length of the roller.

Figure 50:
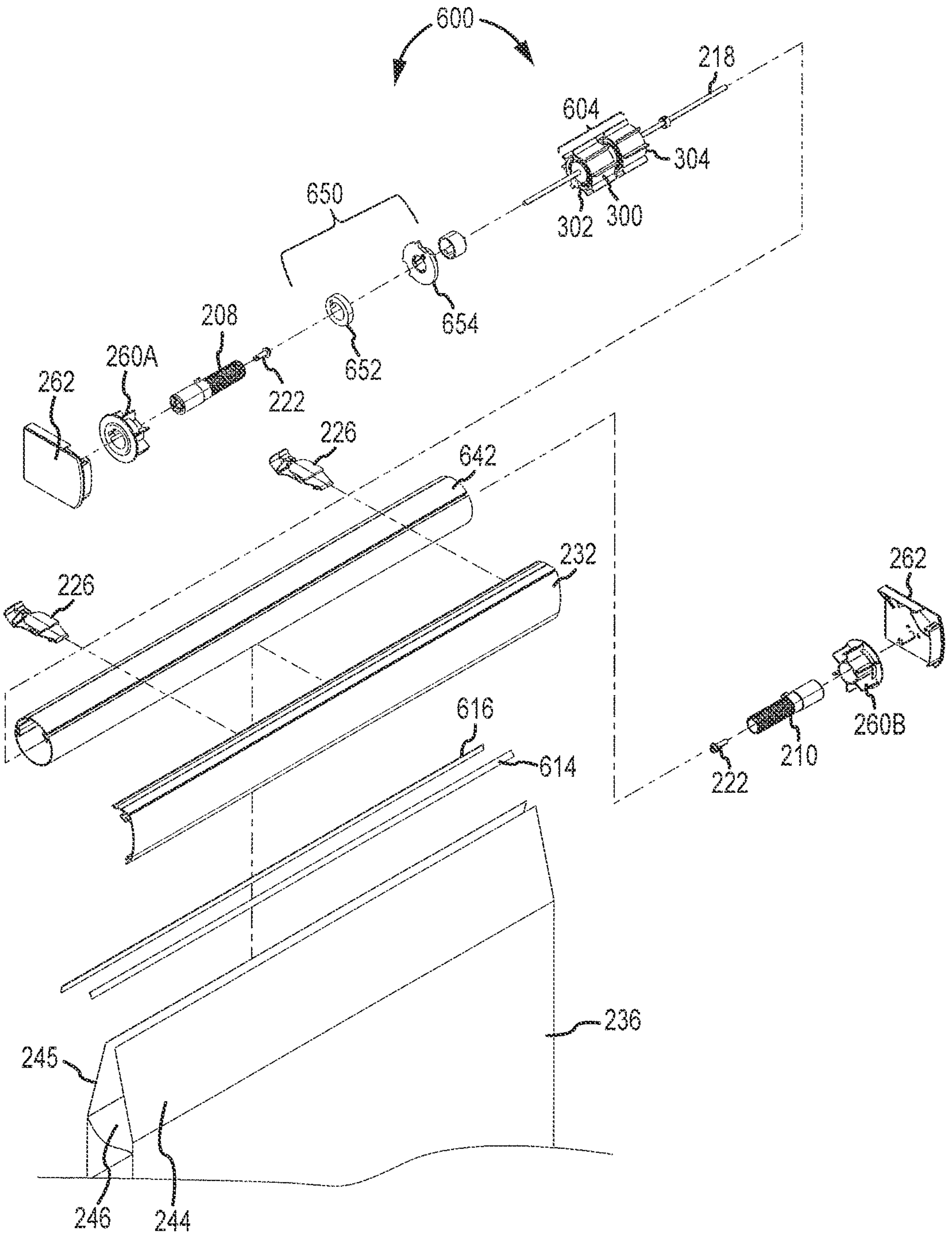
FIG. 50 is an exploded view of a shade including another example of the vane orientation stop.

The roller 242 may include retaining lips 266, 268 on opposite edges of the groove 256. The lips 266, 268 extend over an internal cavity portion of the groove 256 to define the narrow neck or mouth of the groove. The lips 266, 268 act as a retaining structure to help secure the anchor strip 214 and the shade 236 in position within the groove 256. After the shade material is positioned over the groove, the anchor strip is positioned in the groove by being slid in from an end of the roller or positioned through the neck of the groove. Once positioned in the groove, the anchor strip is held therein by the lips 266, 268, and secures the fabric in the groove, and the shade to the roller. The anchor strip 214 may be secured to the shade material 236, such as through adhesive, fasteners, or the like. In other examples, one or more ends of the shade 236 may be positioned within the shade-securing groove 256 and the anchor strip 214 may be positioned over the shade material, securing it to the roller 242. As another example, the anchor strip 214 may be received within a loop or pocket formed within one or more ends of the shade material and then positioned within the groove. It should be noted that in other examples, such as shown in FIG. 50, the roller 242 may include two separate grooves, each for receiving the top edge of each of the front and rear sheets. Alternatively, the shade 236 may be otherwise operably connected to the roller 242, such as by sewing, gluing, adhering, or otherwise.

The groove 256 extends into the inner cavity 243 and creates a key structure 258, which engages and receives a matching-shaped cut-out in the rim of the screw limit nut 205 (as described herein below) to both cause the limit nut 205 to rotate with the roller, as well as guide or translate the limit nut 205 along the length of the tube. The key structure 258 may also engage the actuating portion of the counter-balancing spring motor to cause it to rotate with the roller 242. The specific connections of the orientation stop mechanism and motor 204 are discussed in more detail below.

The key structure 258 has a general wedge-shape defined by sidewalls 272 and 274, with the narrower dimension adjacent the outer peripheral wall of the roller 242, and the wider dimension positioned toward the central axis of the roller. A bottom surface 276 may extend between terminating edges of each of the sidewalls 272, 274, and thus the sidewalls 272, 274 and the bottom surface 276 may define the pocket of the receiving groove 256.

It should be noted that the roller 242 might be otherwise configured. For example, the roller 242 may include multiple keying structures to operably connect to the motor 204 or other components. Additionally or alternatively, the roller 242 may include multiple grooves or other elements that may be used to operably connect the shade 236 thereto.

With reference to FIG. 35, the hub 260A includes a main body 290 defining a generally cylindrical passage 284 there through, a collar 288 extending radially outwardly from a first end of the main body 290, and a plurality of radially extending ribs 292 running longitudinally along the main body 290, abutting the underside of the collar 288 at a first end, and terminating generally at the other end of the main body 290. The ribs 292 extend radially to a dimension just less than the radial dimension of the collar 288, leaving an annular strip 289 around the periphery of the underside of the flange. The hub 260A may further include a radially extending groove 286 defined in the wall forming the cylindrical passage 284. The groove 286 extends in an axial direction along at least a portion of the length of the hub. The groove 286 allows for clearance of the protrusion 430 on the post 208. With the hub 260A positioned in the end of the roller 242, the roller 242 can be received over the post 208 during assembly by lining up the groove 286 with the protrusion 430 prior to positioning the roller 242 onto the post 208. Once the roller 242 is positioned over the post 208, the hub 260A is axially spaced away from the protrusion 430, and there is no interference between the two as the hub 260A and roller 242 rotate about the post 208. Hub 260B, for use in the other end of the roller 242, may be similar or identical to hub 260A. The open end 243 of the roller 242 receives hub 260A, with the ribs 292 engaging the inner surface of the sidewalls 247 of the roller 242, and the annular strip 289 engaging the axial end of the roller so that the periphery of the collar on the hub 260A is flush or near flush with the outer surface of the roller 242. With the hub 260A in place, the central passage 284 through the hub 260A defines a reduced dimensioned opening into the interior of the roller 242. The collar 288 may form an end cap for the roller 242 and may be positioned between an end of the roller 242 and the end cap 262 for the head rail.

Figure 36:
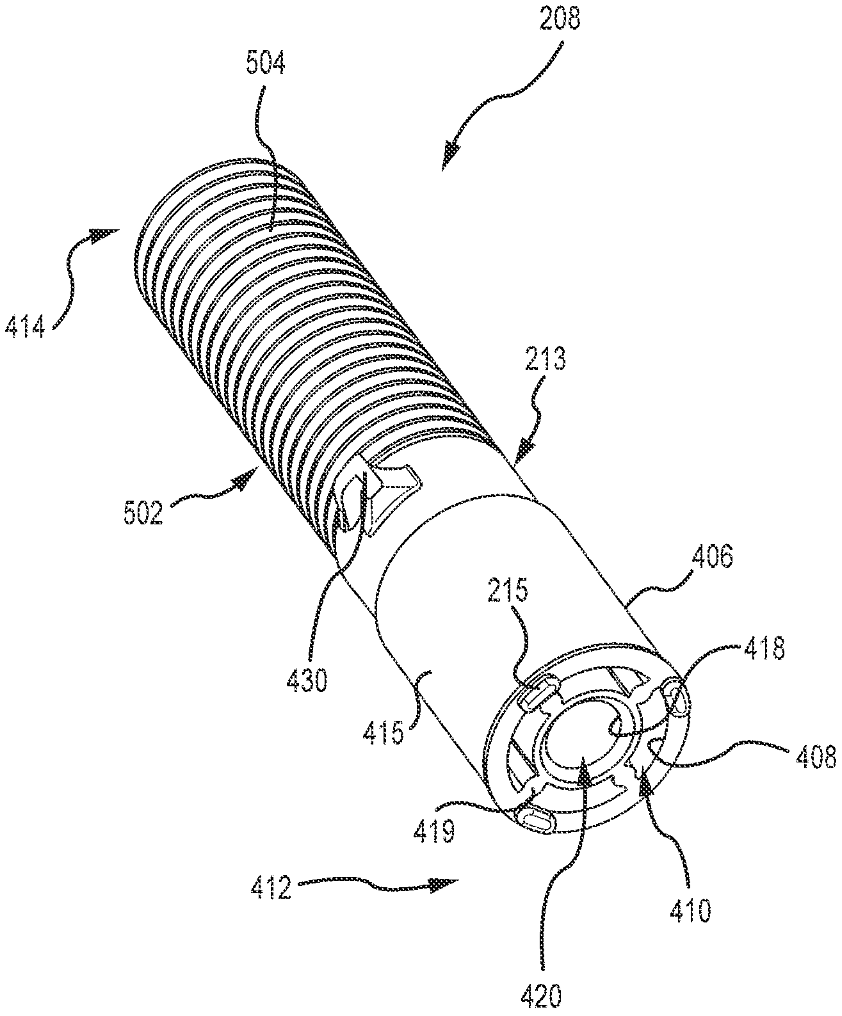
FIG. 36 is a threaded post forming part of one of the examples of the drive mechanism of the operating system.

The post 208 is best shown in FIGS. 32, 33 and 36. The post 208 has an elongated main body 213 having a generally cylindrical exterior surface 406 and a central passageway 410 defined by a generally cylindrical interior surface 408 (see FIG. 33). The central passageway 410 extends axially along a length of the post 208. A cylindrical inner wall 418 is positioned concentrically in the central passageway 410 and extends from the outermost end 412 of the post 208 a short distance through the central passage way 410. The inner wall 418 defines a central bore 420 is spaced away from the interior surface 406 of the central passageway 410 by struts 419 positioned around the periphery of the inner wall 418. The inner wall 418 may also be attached around the circumference of its innermost end to the interior surface 406 of the central passage way 410, forming an axially facing annular bearing shoulder 413 (FIG. 33).

The external surface 406 of the post 208 defines threads 504 from a midpoint along its length to the to the innermost end 414. The outermost end 412 of the post 208 defines a smooth outer bearing surface 415. A protrusion 430 extends outwardly from the surface 406 of the post 208, and is positioned near the outermost end of the threaded section 504 of the post. The protrusion 430 is a structure related to the vane orientation stop mechanism 206, which is described in greater detail below.

Continuing to refer to FIGS. 31, 32 and 36, the post 208 is affixed to the to the end plate 262 by a fastener 222. A cylindrical screw seat boss 264 having a threaded internal bore extends at right angles from a central region of the end plate 262. The boss 264 is sized to fit within the passageway defined by inner wall 418 of the post 208. The length of the screw seat boss 264 is slightly shorter than the length of the inner wall 418. To attach the post to the end plate 262, the post 208 is positioned over the screw seat boss 264 to receive the screw seat boss in the bore 420 defined by the inner wall 418. The interior dimension of the bore 420 is sized to closely receive the outer dimension of the screw seat boss 264, and provide a solid, aligned engagement between the post 208 and the end plate 262. The outermost end 412 of the post 412 abuts the end plate 262, and the axially extending alignment nubs 215 on the outermost end 412 of the post 208 are seated in corresponding alignment indentations 217 formed in the end plate 264 (see FIG. 31). A fastener, such as screw 222, is threadedly engaged with the threaded internal bore of the screw boss 264. When tightened, the flange head of the screw 222 engages the bearing shoulder 413 of the post and draws it tightly toward the end plate 264. The alignment nubs 215 engaged tightly against the alignment recesses 217 help keep the post 208 from rotating relative to the end plate 264, either from the roller rotating about the post or the counter-balancing spring motor 204 applying a torque load to the rod 218. A second post 210 is positioned to extend from the side plate 262 on the opposite end of the head rail, as shown in FIG. 32. The second post 210 is secured to the side plate in the same manner and by the same structure as post 208. There is no cap on the second post 210, but there may be if needed or desired.

The inner end 414 of the post 208, as best shown in FIGS. 32 and 33, receives a cap 219. The cap 219 is generally cup-shaped, and has rim walls 221 substantially closed at one end 223 and open at the opposite end 225. The open end 225 receives the inner end 414 of the post 208, and is secured in a rotationally-fixed manner so as not to rotate. The closed end 223 defines aperture for receiving an end of the rod 218, and the aperture is keyed to receive the rod 218 and inhibit the rod from rotating within the cap 219. The rod 218 extends into the post 208 a portion of its length through the keyed aperture in the cap 219. A length of the rod 218 extends outwardly away from the post 208 for engagement by the counter balancing spring motor 204, as is described in further detail below. Thus, the rod 218 is anchored in a non-rotatable manner to the head rail by affixing to the cap 219 in a non-rotatable manner, with the cap 219 engaging the post 208 in a non-rotatable manner, and the post 208 engaging the side plates 262 in a non-rotatable manner.

The rod 218, referring to FIG. 32, extends through the motors 302 and 304, and its distal end 249 extends into the interior cavity 251 of the second post 210. The distal end 249 of the rod 218 is not supported within the roller. The distal rod 218 is held in a non-rotational fixed position by the cap 219 on post 208, and is supported at a midpoint along its length by engagement with the motors 304 and 306. It should be noted that the distal end 249 of the rod 218 may be supported in the opposing post 210, using a cap similar to cap 219 received on post 208. Supporting the rod 218 at one end simplifies assembly and reduces the number of parts used for the product.

With reference to FIGS. 37-40, the operating system for supporting the bottom rail of a shade in a desired position may use different types of counter-balancing spring motors 204, such as the spring 38 described above positioned within the roller and extending along a portion of the length there of, or clock-type springs positioned inside the roller and oriented orthogonally to the length of the roller 242. The counter balancing spring motor 204 may urge the roller through an indirectly engagement, such as with the spring 38, or may urge the roller through a direct engagement with the roller, such as with the clock spring example described below. In one example, the counter-balancing spring motor 204 used herein may be a clock-spring model, which includes an actuable end, for example housing 306, which may be an outer end of a clock spring and operably associated with the roller 242, and an anchor end, such as inner tab 356, which may be an inner end of a piano spring and operably associated with a stationary anchor rod 218 positioned inside the roller 242. The actuable end is operably associated with the roller 242, such as by an attached engagement to cause the actuable end to rotate with the roller **24*s*. The anchored end is operably associated with the rod 218 to fix the anchored end from moving with the roller or the actuable end. As the actuable end moves with the rotation of the roller 242**, the bias force in the spring, acting in the opposite direction of the rotation of the roller, increase. This bias force then creates the counter-balancing force to help hold the shade at the users selected position of shade extension.

As can be seen in FIGS. 31 and 32, the counter-balancing spring motor 302 is positioned inside the roller, and is received on the rod 218. The motor 302 is positioned inside the roller at a location spaced generally mid-way between the ends of the roller. The motor 204 may be located at any point along the length dimension of the roller 242, and if more than one motor 204 is used, the motors may be located in any effective position relative to each other and in any effective position along the length of the roller. One or more than one motor 204 may be used in any particular shade, depending on the desired bias force required for the size and properties (width, length, depth, material density) of the shade. The motors are rated to indicate particular load limit based on the motor's design. Since each motor 204 used in the same shade applies its bias force directly on the roller, load capability of more than one motor 204 of this type used in an operating system is calculated by adding the load rating of each motor.

Figure 37:
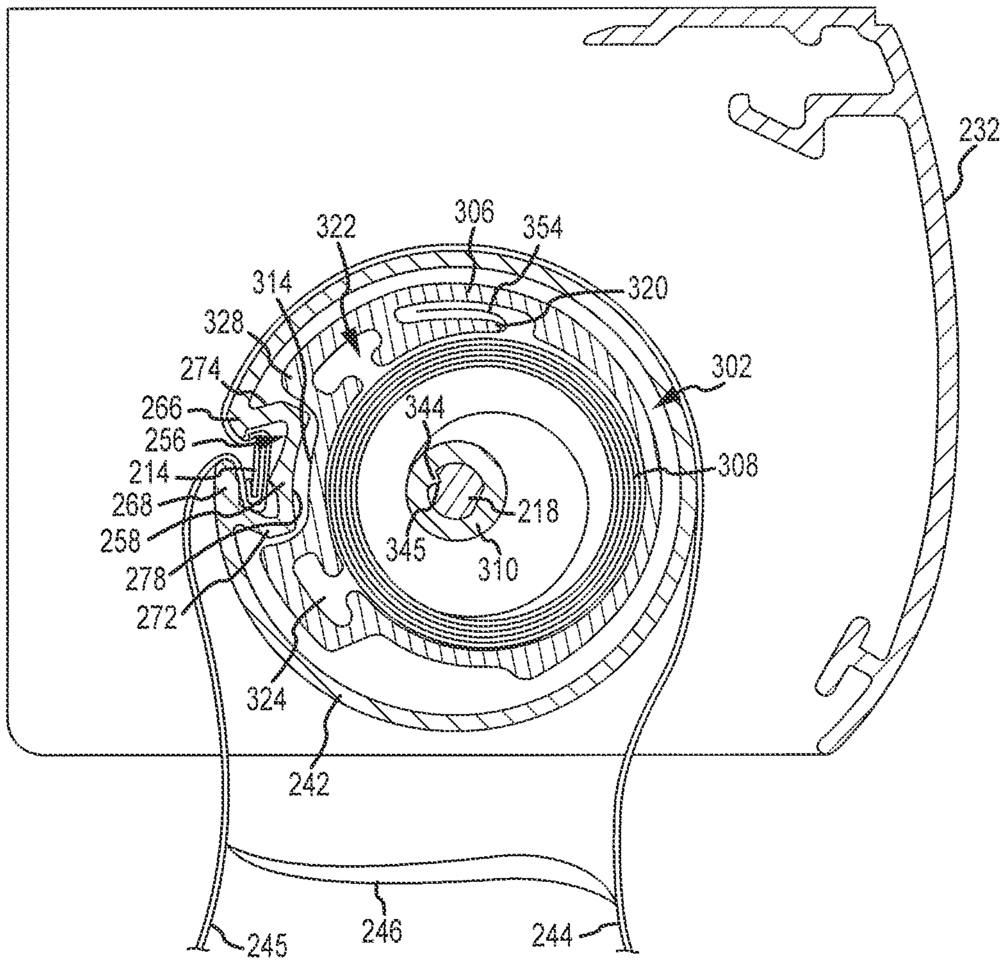
FIG. 37 is a section taken along the line 37-37 of FIG. 30.
Figure 38:
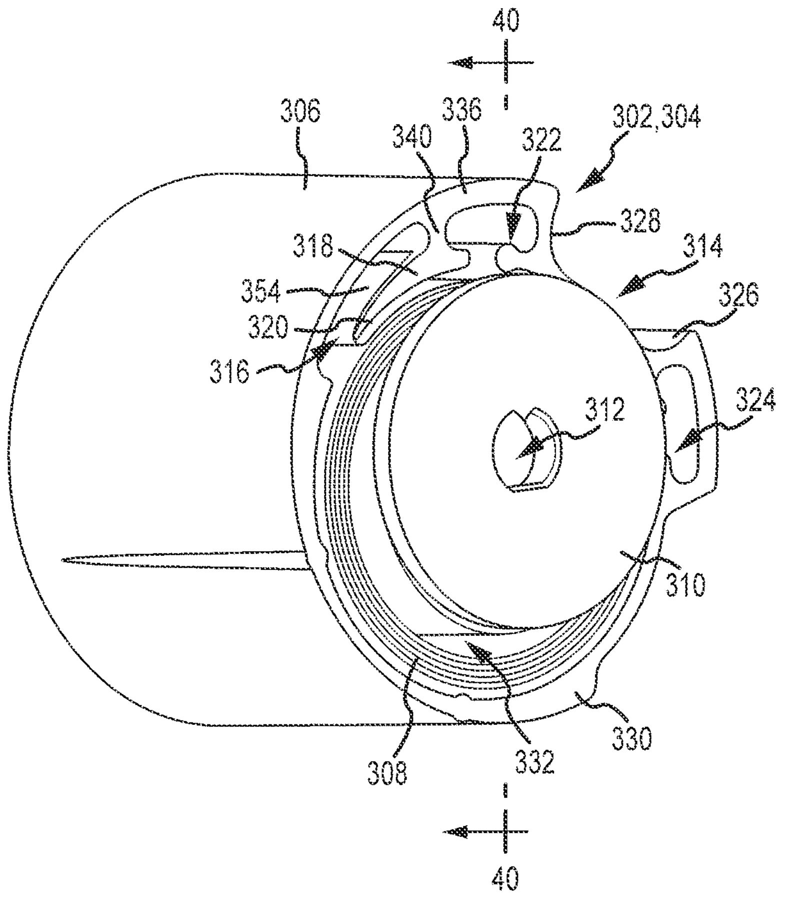
FIG. 38 is a perspective view of a counter balancing unit in the form of a piano spring.

With respect to FIG. 37 and FIG. 38, the counter balancing spring motor 302 will now be discussed in more detail. The counter balancing spring motor 204 is referenced above with respect to FIG. 31 and other figures to generally refer to a rotational bias source or motor, which could be made up of one or more motors 304 or other bias sources. Here, individual motors of the clock-spring configuration defined herein, are referred to individually as counter balancing spring motor 304. It should be noted that the second counter-balancing spring motor 304 shown in FIGS. 31, 32, and 33 may be substantially identical to the first counter-balancing spring motor 302, accordingly the discussion with respect to the first counter-balancing spring motor 302 may be applied to the second counter-balancing spring motor 304. However, it should be noted that in other embodiments, the counter-balancing spring motors might be configured differently from each other.

The counter-balancing spring motor 302 may include an outer housing or shell 306 having a generally cylindrical shape. A flat spring 308 is wound around an anchor 310 and together they are positioned inside the housing 306. The radially inner end 344 of the flat spring forms an inner tab 256, which engages the anchor 310, and together form the portion fixed to the stationary rod 218. The flat spring is wound around itself into a relatively tight spiral similar to a clock spring, and the radially outer end forms an outer tab 354 which engages the housing 306, the housing 306 and end 354 together form one example of the actuable portion. The housing 306 is operably connected to the roller 242 as described below, and configured to rotate with the roller 242. The anchor 310 is operably connected to the spring 308, and is operably connected to fixed support rod 218.

The operation of the counter-balancing spring motors 302, 304 will be discussed in more detail below, but generally because the spring 308 is operably connected to the housing 306 which rotates with the roller 242, and also connected to the anchor 310, which does not rotate, As the roller 242 rotates, the actuable end of the motor (housing 306 and outer tab 354) rotates also, which winds the spring more tightly around the fixed end (inner tab 356 and anchor 310). With every rotation of the roller the bias force urging the roller in the opposite direction increases.

Figure 39:
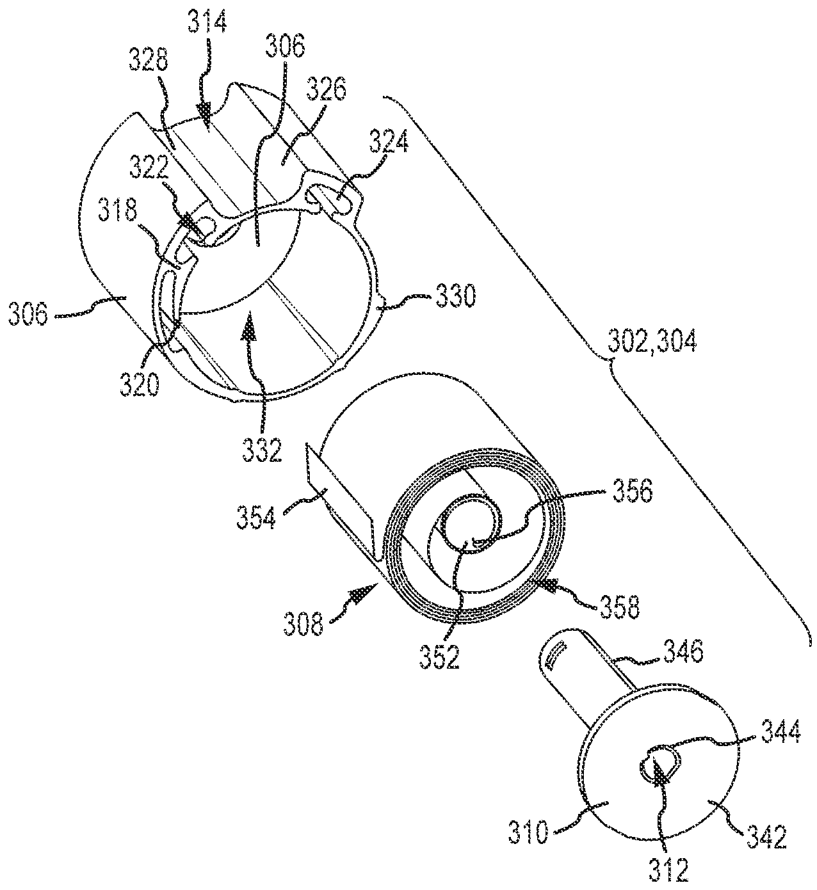
FIG. 39 is an exploded view of the counter balancing unit of FIG. 38.

With reference to FIG. 39, the housing 306 includes a generally cylindrical body having an open first end and a closed second end. The housing 306 define a spring cavity 332 that receives the spring 308 and a portion of the anchor 310. The second end of the housing 306 may include an aperture 334 for receiving a terminal end of the anchor 310, discussed in more detail below.

The housing 306, continuing with FIG. 39, may include a tab pocket 316 for receiving and securing the outer tab 354 of the spring 308. The tab pocket is defined between a sidewall 318 of the cavity 332 and an outer wall 336 of the housing 306. An entry aperture 338 into the pocket 316 is defined between a tip 320 of the sidewall 318 and the outer wall 336 of the housing 306. The tip 320 of the sidewall 318 is sharply "V" or triangular shaped. The tab pocket 316 receives a portion 354 of the spring 308, which bends sharply around the tip 320 to help secure the engagement of the spring with the housing. Other pockets 322 and 324 are defined in the outer wall 336. The pockets 322 and 324 are circumferentially spaced from one another, and may be used to operably connect a different example of the spring 308, or may be used to reduce the weight of the housing 306. A roller-engagement groove 314 may be defined in the outer surface of the housing 306. The engagement groove 314 may be a recessed portion of the housing 306 that may be bordered by two sidewalls 326, 328 on opposite sides. In one example, the groove 314 is positioned between the portions of the housing defining the recesses 322, 324.

The engagement groove 314 extends axially along the length of the housing 306 and may have a width that in general corresponds with the width of the keying surface 258 on the roller 242. In this embodiment, the keying surface 258 may be received into the groove 314 to operably couple the housing 306 to the roller 242 to cause the housing 306 to rotate together with the roller 242. With reference to FIG. 37, the two sidewalls 326, 328 may extend around the keying surface 258 to retain the keying surface 258 within the engagement groove 314 and keep the housing 306 from rotating independently of the roller 242. Other portions of the housing 306 may intentionally or incidentally engage the wall of the roller 242, or the housing 306 may be positioned in a spacer or adapter to allow it to fit inside a roller having a larger diameter, which is described in more detail below. This is described in more detail below.

Figure 40:
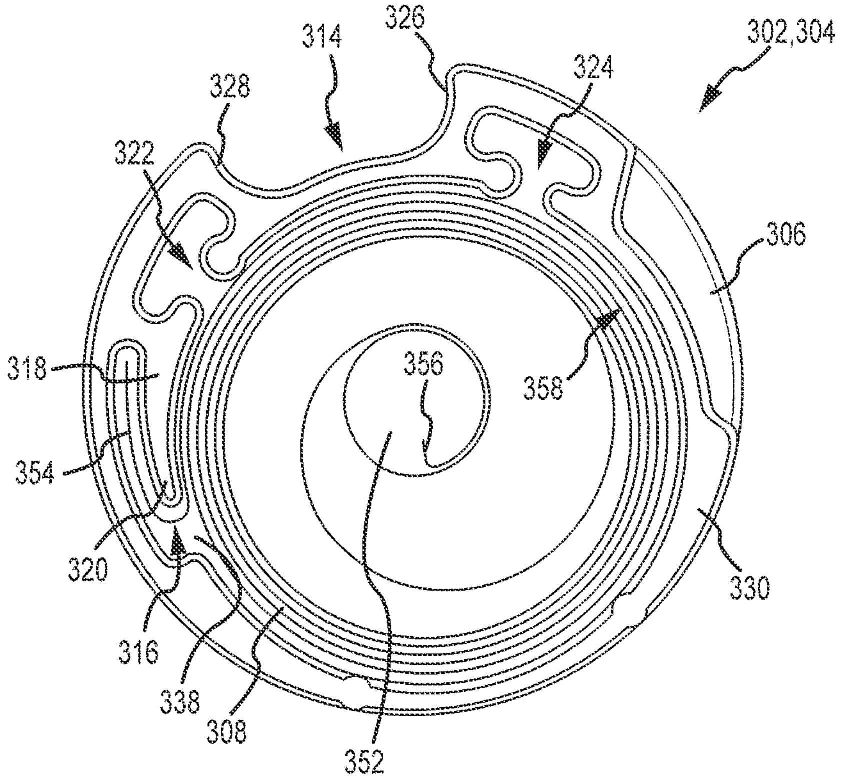
FIG. 40 is a section taken along the line 40-40 of FIG. 38.

With reference to FIGS. 39 and 40, the spring 308 for use in this example of the counter-balancing spring motor 302 is a flat strip of material, typically metal, that is wound around itself in a coil, such as a clock spring. The spring 308 stores mechanical energy when wound more tightly in the direction of the coil, and exerts a force or torque in a direction opposite to a direction of the winding. The exerted force may generally be proportional to the amount of winding. The spring 308 may include a core 352 having an inner tab 356 and an outer tab 354. In at least one example, the outer tab 354 is the actuable end (in combination with the housing 306), and the inner tab is the fixed or anchor tab (in combination with the arbor 310 as described below). The actuable tab 354 is operably associated with and rotates together with the roller during use, which winds or unwinds the spring coil 308. The anchor or fixed tab 356 is operably associated with and is fixed in position to not move with the roller. The relative motion between the two ends during the extension of the shade creates a spring force used to counterbalance the weight of the shade and bias the shade in the retracting direction.

Between the two tabs 354, 356, the spring 308 may have a plurality of coiled windings 358. The number of windings 358 may be varied, as well as the diameter of each of the windings 358. For example, as the outer tab 354 is moved (and the inner tab is held in a fixed position) in the direction to create more coils that are tighter and more tightly spaced, the biasing force of the spring increases. Where the outer tab 354 is moved in a direction to create fewer, less tightly spaced coils, the biasing force of the spring decreases.

The inner tab 356 is a bent-end of the spring 308, and the inner tab 356 represents the innermost winding of the spring which defines an central bore 352. The windings 358 may be wound around the inner tab 356 of the spring 308 all the way out to the terminal end at the outer tab 354. The outer tab 354 may be formed on a second end of the spring 308 and may be defined by a crease or sharp bend, and forms the outer portion of the spring 308. The outer tab is bent in a direction away from the coil windings in order to be secured in the housing as described herein.

The spring 308 has a rest position where the spring 308 is not under a load. At this rest position the spring 308 has a diameter, and there is a number of full coil windings that are generally present in this neutral rest position. From this position, if the outer tab 354 is rotated in a first direction, and the inner tab 356 is secured in a fixed position, the diameter of the windings 358 is reduced and the number of windings 358 is increased as the core wraps around itself. This increases the spring bias in the direction to unwind (which is the biasing force used to retract the shade elsewhere described herein). Alternatively, with reference to FIG. 40, if the outer tab 354 is rotated in a second direction and the inner tab 356 is secured in place, the number of windings 358 may be reduced as the spring may be un-wound, and as this occurs the diameter of the remaining windings 358 may be increased as the spring 308 expands to accommodate the rotation.

In some examples, the spring 308 may have 4 to 20 windings 358, and the number of windings 358 may depend on the desired biasing force for the counter-balancing spring motor. The biasing force may depend on the length or width of the shade and/or the weight of the shade material. In some instances, the spring 308 may have a thickness of 0.003" to 0.005" and may have a width ranging between 0.8" to 1.5," depending on the desired biasing force. Additionally, in some instances, the motor 302 may have a set number of "pre-windings," or windings that may be used to maintain a minimum biasing force, when mounted in the operating system in the roller 242. The pre-load helps keep the spring in a slightly tensioned configuration, which helps the operation of the shade. As an example, the spring 308 may include 4 pre-windings and may then be wound due to rotation of the roller to include an additional 14 winds. In this example, the spring 308 for each counter-balancing spring motor 302, 304 may generally be configured to balance the weight of a shade 236 having a drop length of approximately 96" and the total number of winds when the shade is fully extended may be 18. However, the number of windings, material, and dimension of the spring may be varied depending on a number of factors, such as but not limited to, material of the shade, drop length of the shade, width of the shade, weight of the end rail, and/or number of counter-balancing spring motors.

Figure 41:
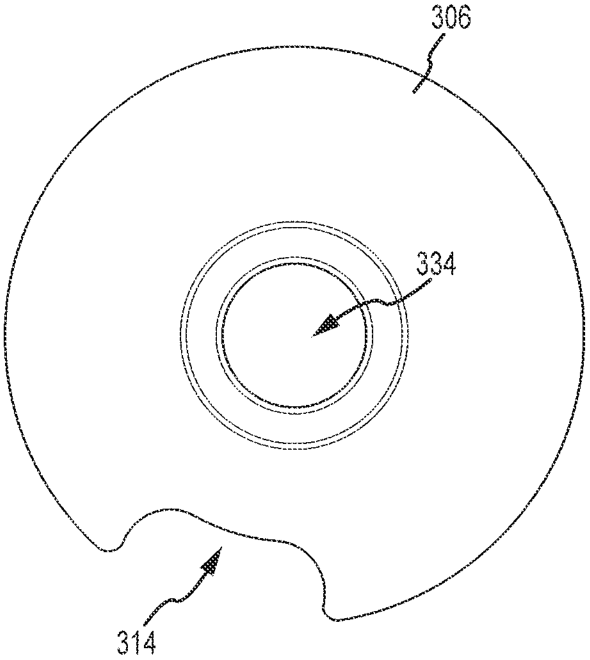
FIG. 41 is an end view of an anchor.
Figure 42:
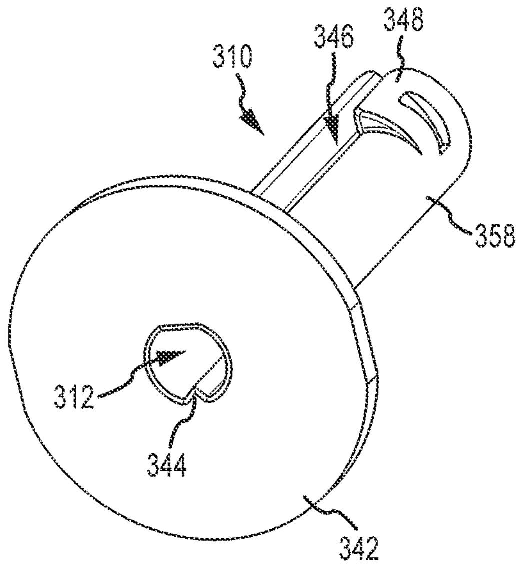
FIG. 42 is a perspective view of the anchor.
Figure 43:
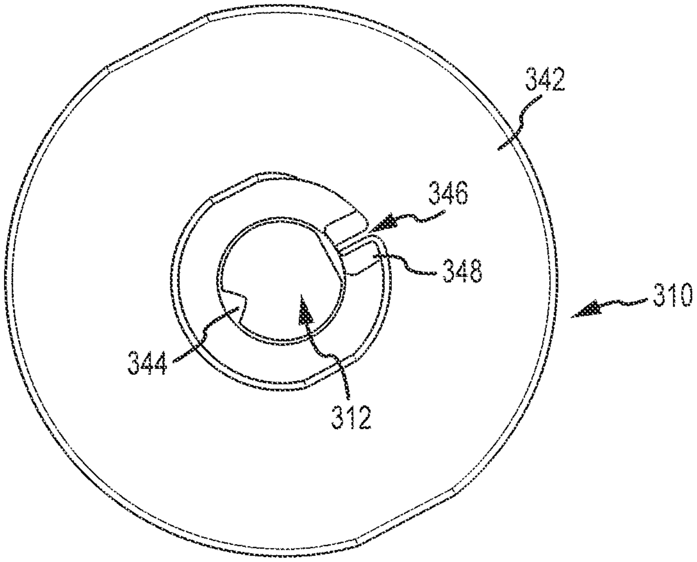
FIG. 43 is an end view of the anchor from the opposite end than FIG. 41.

The counter-balancing spring motors 302, 304 may each include the anchor or arbor 310 to rotationally secure the inner end 356 to the rod 218, and help retain the spring 308 into the spring cavity 332 of the housing 206 and keep the spring 308 from coming out of the housing 306. The anchor is positioned into the bore3 352 of the spring 308. See FIG. 39. With reference to FIGS. 41-43, the anchor 310 may include an anchor end plate 342 extending from a first end of an elongated anchor body 350. The anchor body 350 received and positioned in the spring cavity 332 and extend through the exit aperture 334 defined in the housing 306. The anchor end plate 342 may serve as an end cap for the spring cavity 332 to prevent the spring 308 from leaving the cavity 332.

The anchor body 350 may be a generally cylindrical body with a rod cavity 312 defined there through. The rod cavity 312 receives the support rod 218. Additionally, an internal wall surrounding the rod cavity 312 may include a securing key feature 344 extending into the cavity 312. The securing feature 344 may be a triangular shaped protrusion that may match to a corresponding securing channel 345 defined longitudinally along a length of the support rod 218 to rotationally secure the anchor 310 to the support rod 218. As the support rod 218 is fixed to or operably associated with at least one of the end caps 262, and is non-rotatable, the anchor 310 is prevented from rotating relative to the support rod 218. As will be discussed in more detail below, the non-rotatable connection of the anchor 310 to the support rod 218 allows for the spring 308 to wind/unwind around the anchor 310 as the roller is rotated.

An outer surface of the anchor body 350 defines an elongated spring recess 346 and a spring blocking protrusion 348. The spring recess 346 and blocking protrusion 348 help secure the spring 308 to the anchor 310. For example, the spring recess 346 may receive a bent inner end portion of the spring 308, and the blocking protrusion 348 may prevent the received portion of the spring 308 from sliding along the shaft 350 and out of the recess 346. Additionally, the blocking protrusion 348 may also help to retain the anchor 310 within the housing 306, such as by preventing the end of the anchor body 350 from sliding out of the exit aperture 334 defined in the housing 306.

The spring recess 346 may be defined longitudinally along the length of the anchor body 350, or a portion thereof. In some embodiments, the spring recess 346 may have a length generally corresponding to a width of the spring 308, and thus may be varied based on the width of the spring. However, in some embodiments it may be desirable for the spring recess 346 to have a longer length than a width of the spring 308. In these embodiments, the spring 308 may slide along the length of the spring recess 346, which may provide additional flexibility for torsion forces, and may cushion torsion forces that could otherwise disengage the spring 308 with the anchor 310. For example, in instances where the spring is back-wound while in an un-tensioned configuration, the diameter of the windings may increase, but due to the sliding and releasable engagement of the spring with the spring recess, the tab received into the recess may release, preventing the spring from bending backwards and deforming. If the bent inner end of the spring deforms, it may not re-engage with the spring recess 346 and the spring would need to be removed from the housing to repair the inner end of the spring.

The inner tab 356 may be releasably received within the spring recess 346 defined in the anchor 310, as is discussed below and with reference to FIG. 39. The inner tab 356 may disengage from the spring recess 346 in instances where the spring is rotated in the unwinding direction prior to spring tension being increased by rotating the spring the other way. As the spring 308 disengages, the spring 308 may be prevented from being damaged or deformed. Conventional clock springs may generally have both ends of the core secured in position, which may result in the spring being damaged or over-stressed if rotated in the back-wind direction. Accordingly, the connection of the spring 308 to the anchor 310 as illustrated in FIG. 43 may help reduce damage to the spring in instances where the spring may be rotated in a back-wind direction.

It should be noted that the spring recess 346 might allow some slippage in retaining the spring 308. Because the spring recess 346 may not tightly secure the spring 308 therein, the end of the spring received in the recess may be able to disengage from the spring recess 346. For example, in instances where the spring 308 may be back-wound or otherwise wound in an opposite direction than as configured to rotate, the end of the spring 308 may disengage from the recess 346. The blocking protrusion may prevent the spring 308 from bending or breaking when wound in the back direction. However, when the spring 308 is wound again in the forward direction, the end may slip back into the spring recess 346, re-engaging the spring with the anchor 310.

As briefly discussed above, the anchor end plate 342 may help to retain the spring 308 within the spring cavity 332. In some embodiments, the anchor end plate 342 may be a cylindrically shaped disk or collar that extends radially from the anchor body 350. The anchor end plate 342 may have the same diameter as the spring cavity 332 defined in the housing 306, or may have a different diameter. For example, the anchor end plate 342 may have a smaller diameter than the spring cavity 332 and may be partially received therein. However, in other embodiments, the anchor end plate 342 may have a larger diameter and may be configured to extend to the outer wall 336 of the housing 306.

The support rod 218 extends from the first non-rotatable shaft 208 and extends in the direction to the other non-rotatable shaft 210. Additionally, the counter-balancing spring motor 204, specifically, the counter-balancing spring motors 302, 304 may be operably connected to and received on the support rod 218 as it extends between the two shafts 208, 201. The housing 306 of each counter-balancing spring motors 302, 304 may be rotatably coupled to the support rod 218, whereas the anchor 310 of the counter-balancing spring motors 302, 204 may be non-rotatably coupled to the support rod 218. In this manner, as will be discussed in more detail below, the spring 308 may wind around itself to accommodate the rotation of the housing 306 in light of the non-rotatable anchor 310.

In some instances, the counter balancing spring motors 302, 304 may include an adapter to accommodate rollers having a larger diameter, such as the roller 642 shown in FIG. 50. For instance, depending on the shade 236 material or length, the roller diameter may be increased to provide additional strength, and accommodate additional fabric or the like. In these instances the housing 306 diameters for each counter-balancing spring motor 302, 304 may be increased and/or an adapter may be positioned over the housing 306 counter-balancing spring motors 302, 304 to effectively increase the diameter of the counter-balancing spring motors and provide adequate engagement between the motor 302 and the housing.

Figure 54:
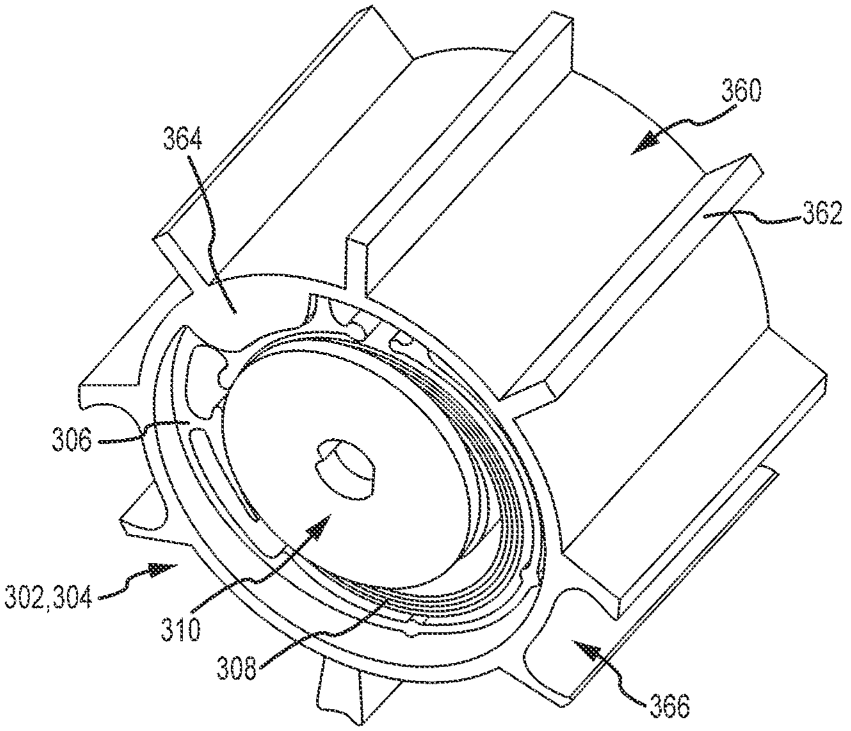
FIG. 54 is a perspective view of a counter balancing unit having a spacer positioned thereabout.

As shown in FIG. 54, the adapter 360 may be a generally cylindrical member and be configured to receive the housing 306 of the counter-balancing spring motor 302 in a manner than fixes the rotation of the housing and the adapter. The adapter 360 may include axially aligned and radially extending engaging fins 362 spaced apart from one another around an outer surface of the adapter 360. The engaging fins 362 engage an interior surface of the roller 242 to operably connect the adapter 360 and counter-balancing spring motor 302 to the roller 242. In some instances, two or more of the engaging fins 362 may together define a keying groove 366 to receive the keying structure 258 of the roller 242. The engagement between the keying groove 366 and the keying structure 258 of the roller 242 provides an a structural engagement that causes the adapter and roller to rotate together. The adapter 360 may also include an interfacing key extension 364 extending inwards from an interior surface of the adapter 360. The interfacing extension 364 may be a generally rectangular shaped protrusion that is sized and shaped to be received in the engagement groove 314 of the housing 306. With the extension 364 received in the engagement groove 314 of the housing 306, the housing 306 and the adapter rotate together. Generally, the engagement groove 314 of the counter-balancing spring motor 302 operably connects the counter-balancing spring motor 302 to the roller, and so in instances where the adapter 360 is used, the engagement groove 314 may be received around the interfacing extension 364 to operably connect the counter-balancing spring motor to the adapter 360. In other words, the interfacing extension 364 engages with the engagement groove 314 to key the two structures together.

The adapter 360 may be used with the larger diameter roller 642, shown in FIG. 50. FIG. 50 is an exploded view that includes another example of the operating system for a covering for architectural openings. The operating or control system 500 may be substantially similar the operating system 200 shown in FIG. 31; however, in this example, a roller 642 for supporting the shade 236 may have an increased diameter, as well as a second shade securing groove.

Figure 53:
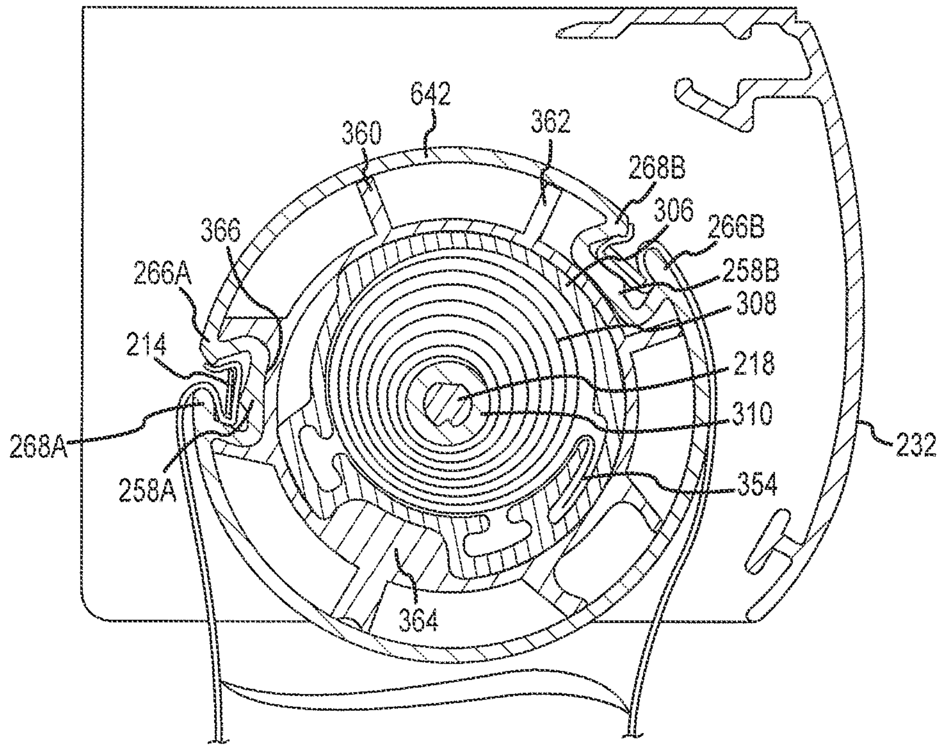
FIG. 53 is a section view similar to that of FIG. 37.

Specifically, referring to FIG. 53, the roller 642 may include a first shade securing groove 556A and a second shade securing groove 556B. The two shade securing grooves 556A, 556B may both be positioned on a top half of the roller 242 as viewed in FIG. 55. As with the roller 242, the shade securing grooves 556A, 556B may be used to operably connect the shade 236 to the roller 642. However, because the roller 642 includes two grooves 556A, 556B, and the top edge of the front sheet 244 may be operably connected to one groove and the top edge of the rear sheet 245 may be operably connected to the other groove. In this manner, the front sheet and the rear sheet may be spaced apart from each other by the roller 642.

Each shade securing groove 556A, 556B may include a keying structure 558A, 558B that operably connects the housing 306 of the counter-balancing spring motors 302, 304 to the roller 642. However, in some instances, the roller 642 may have a larger diameter than the housing 306 of the counter-balancing spring motors 302, 304, and in these embodiments, the adapter 360 as shown in FIG. 54, may be operably connected to the housing 306. Thus, the keying structures 558A, 558B may be configured to key to the exterior of the adapter 360 rather than the housing 306 of the counter-balancing spring motors 302, 304. For example, the cavity 570 in the roller 544 may have a sufficiently larger diameter to accommodate the adapter 360, as well as the counter-balancing spring motors 302, 304.

The keying structures 558A, 558B may each include a first sidewall 572A, 572B and a second sidewall 574A, 574B that may each be connected to a bottom surface 576A, 576B. As with the keying structure 258, the sidewalls 572A, 572B, 574A, 574B may help to retain the counter-balancing spring motor 302, 304 in engagement with the roller 642 as the roller 642 rotates.

Each shade securing groove 556A, 556B may include two retaining lips 566A, 566B, 568A, 568B positioned on opposing edges of the respective groove 556A, 556B. As with the roller 242, the retaining lips 566A, 566B, 568A, 568B may secure the anchor strips 514, 516 within the respective groove 556A, 556B, which may secure the front sheet and rear sheet of the shade 236 to the roller 642.

Operation of the counter-balancing spring motor 204 will now be discussed in more detail. With reference generally to FIGS. 29 to 44, in the retracted position, the spring 308 within each of the counter-balancing spring motors 302, 304 may be in a first biasing force position. In other words, the spring 308 may have a predetermined number of windings 358 that may, along with inherent friction within the system, counterbalance the shade 236 to hold the shade 236 in the retracted position. In some instances, the spring or biasing force exerted by the spring 308 in the retracted position may be the normal or un-tensioned spring value. This may be selected to be the minimum (plus some error value, if desired), to balance the weight of the shade 236.

The roller 242 rotates as the user extends the shade from the retracted position to an extended position, or somewhere in between the retracted and fully extended positions. For example, referring to FIG. 29, the user may pull a handle on the bottom rail 234 to exert a downward force on the shade 236, which may cause the roller 242 to rotate within the head rail 232. As the roller 242 rotates, the keying structure 258 may engage the engagement groove 314 defined within the housing 306, or in instances where the adapter 360 is used, may engage the adapter 360. With the engagement between the roller 242 and the housing 306 of the counter-balancing spring motors 302, 304 (either directly or indirectly through the adapter), the housing 306 rotate correspondingly with the roller 242.

As the outer tab 354 of the spring 308 is secured within the tab pocket 316, and the inner tab 352 is secured to the anchor 310 and prevented from rotating, the outer end of the spring 308 may be wrapped around the remaining portions of the spring 308. In other words, one end of the spring 308 rotates around the remaining portions of the spring, to increase the number of windings 358, and wrap the spring 308 more tightly around the anchor shaft or arbor 310. As the outer tab 354 rotates around the body of the spring 308, the biasing force exerted by the spring 308 may increase as the tension force may be building up within the spring 308.

If the user stops exerting a force downward on the shade 236, such as to stop the shade 236 at the extended position or a position between the retracted and extended positions, the increased tension on the spring 308 may be sufficient to counterbalance the shade 236, although the overall weight of the shade 236 may have been increased from the retracted position. That is, as the shade 236 extends from the roller 242, the effective weight of the shade may increase due to the additional material hanging from the roller 242.

Since the roller 242 is keyed to the counter-balancing spring motors 302, 304 though either the housing 306 of reach respective counter-balancing spring motors 302, 304 or through the adapter 360 operably connected to each, the number of windings 358 may be increased or decreased correspondingly with the number of rotations of the roller 242. In other words, the spring 308 may be rotated around itself as many times as the roller 242 completes a full rotation within the head rail 232. It should be noted that the rotation of the spring might not be a direct one to one relationship with the rotation of the roller 242. For example, the counter-balancing spring motors may be geared or otherwise movably connected to the roller 242, such as indirectly through a gear train, so that each roller rotation may result in a partial rotation of the spring 308 around itself. In this manner, the roller 242 may have to be rotated fewer or more times in order for the spring 308 to increase its windings by one.

Generally, as the roller 242 rotates in a particular direction, such as to either wrap or unwrap the shade 236, the weight of the shade 236 may correspondingly increase or decrease. In other words, the more the shade 236 is unwrapped from the roller 242, the heavier the effective weight of the shade 236. Because the spring 308 windings 358 also correspond to the rotation of the roller 242, the more the shade 236 is unwrapped from the roller 242, the more the biasing force in increased by the spring 308. The same effect is seen as the shade 236 is wrapped onto the roller 242. As the roller 242 rotates in a second direction to wrap the shade 236 around the roller 242, the spring 308 may be rotated with the roller 242 to decrease the number of windings 358, and thus reduce the biasing force. It should be noted that in some instances, as the roller rotates to wrap the shade around the outer surface, the spring 308 may exert a biasing force in the direction of rotation, to assist the roller in rotating.

As the effective weight of the shade 236 decreases as it is retracted, the biasing force of the spring 308 also decreases. Thus, the counter-balancing spring motor 204 may generally balance the load or force exerted by the shade 236 to hold the shade in a desired position, and as the load due to the shade varies, so does the biasing force exerted by the counter-balancing spring motor 204. Accordingly, at substantially any position of the shade 236, the shade may be balanced to remain in a desired position, without requiring an operating cord, or an operating cord lock.

As discussed above, the counter-balancing spring motor 204 may be modified based on the weight of the shade 236, which may depend on the weight of the fabric, as well as the dimensions of the shade 236 (a larger shade may weigh more than a smaller shade of similar fabric). In some instances, the counter-balancing spring motor 204 may include three or more counter-balancing spring motors, each counter-balancing spring motor including one or more springs. Conversely, in instances where the weight of the shade 236 may be lighter, the counter-balancing spring motor 204 may be a single counter-balancing spring motor.

When the shade is in its fully extended position, such as in FIG. 30 (and as explained above with respect to FIGS. 16-19 above, the vane orientation stop structure and mechanism allows the vanes to be oriented in a closed position, fully opened position, or some orientation in between. The vane orientation stop mechanism is actuated by moving the rear edge of the bottom rail in a downward direction to pull the rear sheet downwardly. This motion of the bottom rail actuates the vane orientation stop mechanism to resist the biasing force urging applied by the counter balance motor to the roller, and shifts the front and rear sheets relative to one another in a vertical direction, which in turn controls the orientation angle of the vanes. The vane orientation stop mechanism is deactuated by pulling the front edge of the bottom rail downwardly, which rotates the roller in a direction to disconnect the orientation mechanism and shift the front and rear sheets relative to one another in an opposite direction, which closes the vanes.

With reference to FIGS. 31, 32, and 33 the orientation stop mechanism 206 includes a screw limit nut 205 that is in operative engagement with the roller 242 such that the screw limit nut 205 is reversibly translated along a threaded portion of the post 208 as the roller 242 rotates. The extent to which the screw limit nut 205 may travel along the threaded portion of the post 208 is limited such that the screw limit nut 205 reaches a stop structure or other end point that substantially corresponds to the shade 236 being fully extended. The screw limit nut 205 may move into an over-travel region that is past the point where the screw limit nut 205 makes initial contact with the stop. In the over-travel region, friction or other mechanical forces between the screw limit nut 205 and the stop may inhibit movement of the screw limit nut in the inward direction. In this way, the screw limit nut 205, and thus the roller 242, may be selectively locked or otherwise held in place despite the bias force of the counter-balancing spring motor 204 which might otherwise rotate the roller 242 to retract the shade.

Figure 45:
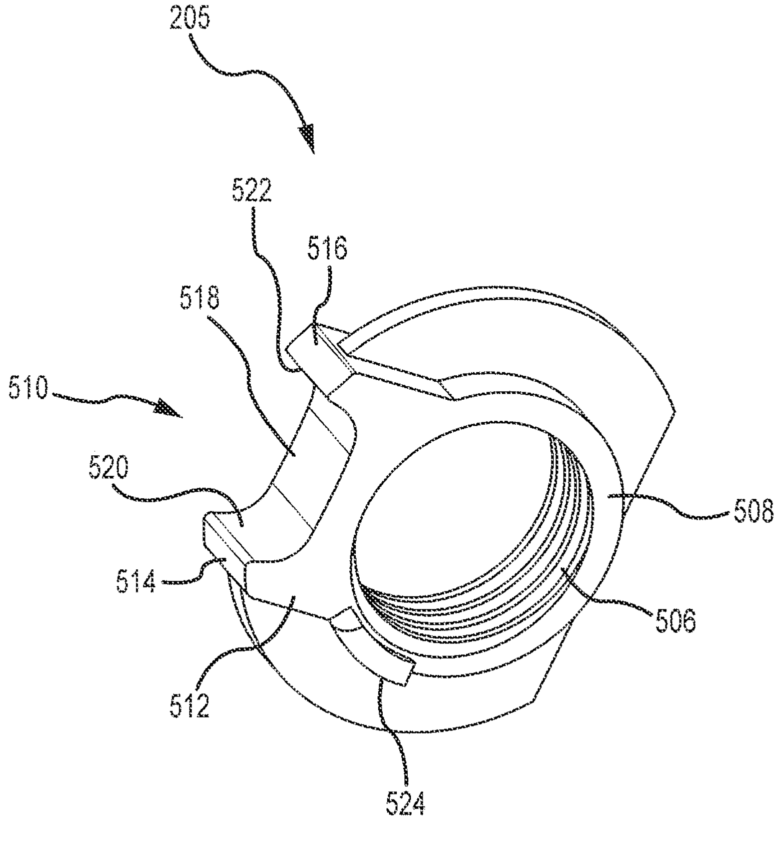
FIG. 45 is a perspective view of a screw limit nut.
Figure 46:
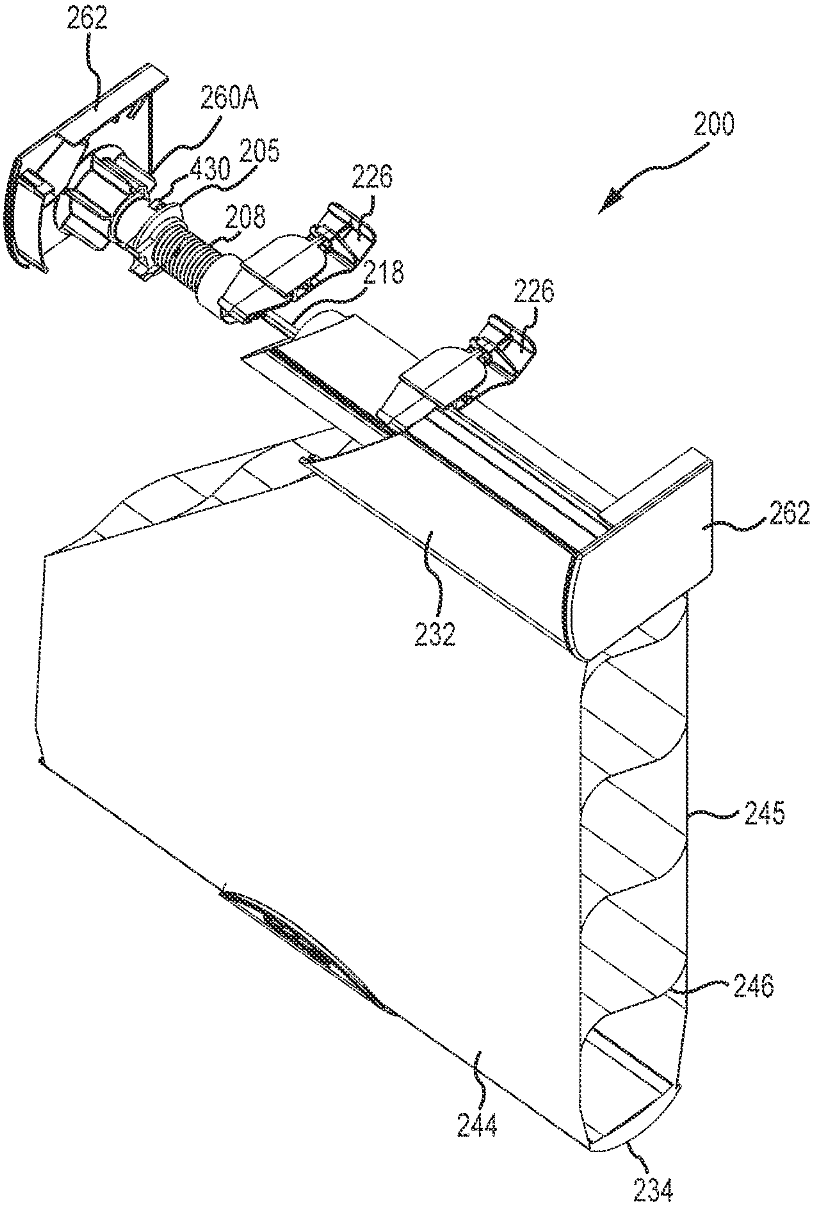
FIG. 46 is a perspective view of a shade having a vane orientation limit stop, and having part of the shade cut away.
Figure 47:
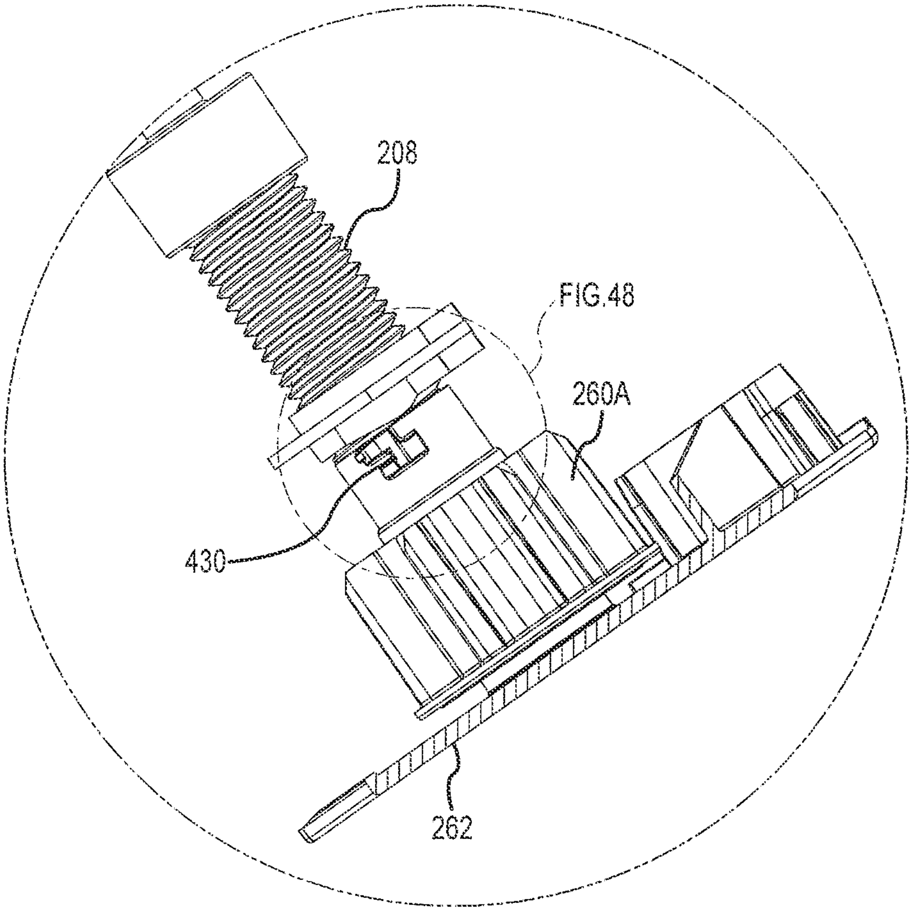
FIG. 47 is an enlarged partial view of a vane orientation stop mechanism such as that shown on FIG. 46.
Figure 48:
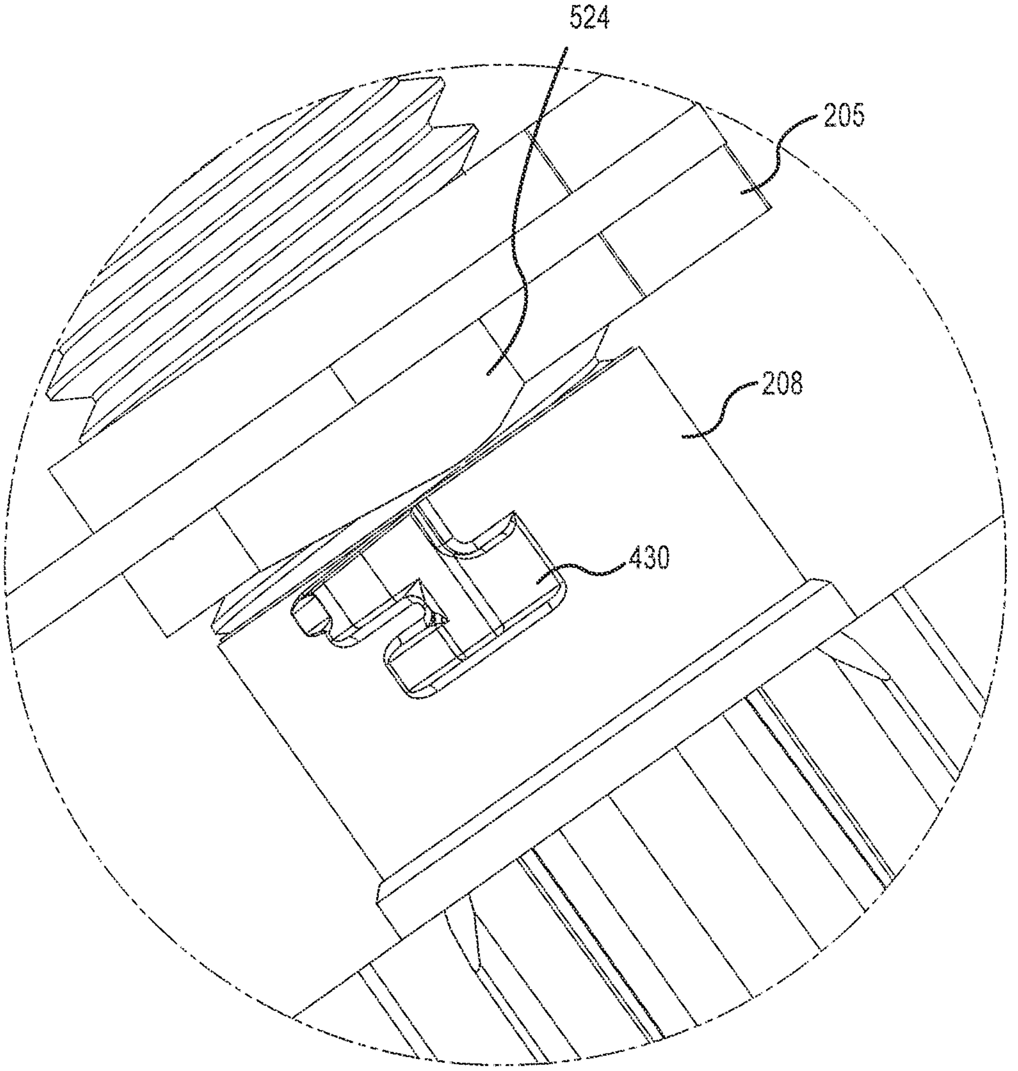
FIG. 48 is an enlarged partial view of a vane orientation stop, similar to that of FIG. 47.

In one embodiment, as shown in FIG. 34, the protrusion 430 disposed on the exterior surface 406 of the post 208 may provide a stopping location for the screw limit nut 205. The post 208 may have a threaded portion 502 that includes any number of external screw threads 504 on the exterior surface 406 of the post 208. The external screw threads 504 may extend form the innermost end 414 of the post 208 to the protrusion 430. The external screw threads 504 on the post 208 are adapted to mate with the internal screw threads 506 of the screw limit nut 205. The screw limit nut 205 can be seen in greater detail in the enlarged perspective view of FIG. 45. As shown in FIG. 45, the internal screw threads 506 are disposed on the interior of a ring 508 portion of the screw limit nut 205. The internal screw threads 506 are adapted to allow the screw limit nut 205 to be movably attached to the threaded portion 502 of the post 208. In FIG. 33, the screw limit nut 205 is in contact with the protrusion 430 and thus is disposed at its outermost point of travel along the threaded portion of the post 208.

Continuing with FIG. 45, the screw limit nut 205 is adapted to engage the roller 242 such that the screw limit nut 205 rotates around the post 208 as the roller 242 rotates to extend or retract the shade 236. In order for the screw limit nut 205 to rotate with the roller 242, the screw limit nut 205 may contain an engagement groove 510 that is adapted to engage the internal keying structure 258 of the roller 242. The engagement groove 510 may be formed as a recess in a tab 512 portion of the screw limit nut 205. The tab 512 may be integrally formed with the ring 508 and may extend radially outward therefrom. The engagement groove 510 may be formed in the tab 512 such that the tab 512 includes two fingers 514, 516 that extend away from an inner engagement surface 518 of the engagement groove 510. Each finger 514, 516 may contain an inner surface 520, 522, each of which connects on opposite ends to the inner engagement surface 518 to form a continuous U-shaped curved surface of the engagement groove 510.

Figure 44:
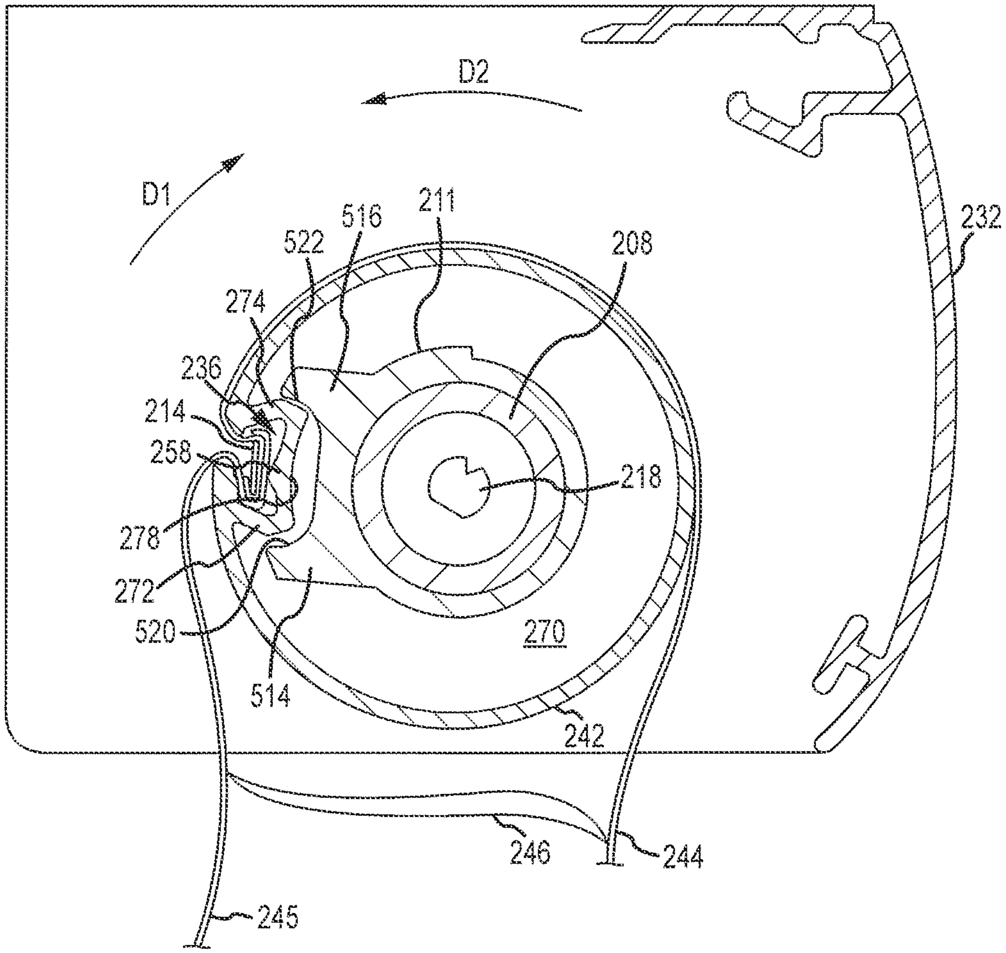
FIG. 44 is a section similar to that of FIG. 37.

The engagement groove 510 may engage the internal keying structure 258 of the roller 242, as shown in FIG. 44. FIG. 44 is a cross-sectional view taken along line 44 shown in the FIG. 33. In the assembled configuration shown in FIG. 44, the screw limit nut 205 is movably connected to the threaded portion 502 of the post 208. The post 208 and the screw limit nut 205 are received within the inner cavity 270 of the roller 242. The screw limit nut 205 is positioned within the inner cavity 270 of the roller 242 such that internal keying structure 258 of the roller 242 is received in the engagement groove 510 of the screw limit nut 205. In this position, the internal keying structure 258 may contact the tab 512 portion of the screw limit nut 205 to rotate the screw limit nut 205 with the roller 242. Specifically, when the roller 242 rotates in a first (clockwise from the perspective of FIG. 44) rotational direction D1, the sidewall 274 of the keying structure 258 may contact the inner surface 522 of the finger 516 to also rotate the screw limit nut 205 in the first rotational direction D1. Similarly, when the roller 242 rotates in a second (counter clockwise from the perspective of FIG. 44) rotational direction D2, the sidewall 272 of the keying structure 258 may contact the inner surface 520 of the finger 516 to also rotate the screw limit nut 205 in the second rotational direction D2.

As the roller 242 rotates the screw limit nut 205 around the threaded portion of the post 208, the external screw threads 504 on the post 208 acts on the internal screw threads 506 of the screw limit nut 205 to translate the nut 205 along the threaded portion 502 of the post 208. Specifically, when the roller 242 rotates in the first rotational direction D1 (retraction of shade), the external screw threads 504 move the screw limit nut 205 in an inward direction, away from the end cap 262. Similarly, when the roller 242 rotates in the second rotational direction D2 (extension of shade) the external screw threads 504 move the screw limit nut 205 in an outward direction, toward the end cap 262.

Movement of the roller 242 in the second direction occurs when a user pulls down on the end rail 234 to extend the shade. Here, the roller 242 rotates in the second direction, feeding out shade material from the roller 242 to thereby extend the shade 236. Movement of the roller 242 in the first direction occurs when the counter balancing spring motor 204 turns the roller 242 to retract the shade 236. Here, the user lifts end rail 234 to lighten the load on the counter balancing spring motor 204 such that the counter balancing spring motor 204 is able to rotate the roller 242 to thereby retract the shade 236 material back onto the roller 242.

Thus, when a user pulls down on the end rail 234 to extend the shade 236, the accompanying movement of the roller 242 in the second rotational direction D2 moves the screw limit nut 205 in an outward direction along the threaded portion 502 of the post 208 (extension of shade). If the user continues to pull the bottom rail downwardly to extend the shade, eventually after a number of rotations, the screw limit nut will engage the protrusion 430. Similarly, when the counter balancing spring motor 204 turns the roller 242 to retract the shade 236, the accompanying movement of the roller 242 in the first rotational direction D1 moves the screw limit nut 205 in an inward direction along the threaded portion 502 of the post 208 (retraction of shade). This movement of the screw limit nut 205 along the threaded portion 502 of the post 208 is illustrated in FIG. 32 and FIG. 33. In FIG. 32, which is a cross-sectional view taken along line 32 in FIG. 29, the shade 236 is partially extended and so a certain amount of shade 236 material is present on the roller 242. Here, the screw limit nut 205 is in an intermediate position between the innermost end 414 of the post 208 and the protrusion 430. In FIG. 33, which is a cross-sectional view taken along line 33 in FIG. 30, the shade 236 is fully extended and so the shade 236 material is fully fed out from the roller 242. Here, the screw limit nut 205 is at its outermost point of travel along the threaded portion 502 of the post 208, and the screw limit nut 205 is in contact with the protrusion 420.

Note that a shade such as that shown in FIGS. 9 and 44 extend off the back of the roller when being moved from a retracted to a fully extended position. Regarding the rotation of a roller to extend and retract a shade, in FIG. 9 the front of the head rail 32 is to the left, and to extend the shade the roller would be rotated clockwise, which would cause the shade to extend off the back-side of the roller. In contrast, FIG. 44 shows the front of the head rail 32 to the right, which means that to extend the shade from the roller, the roller must be rotated in a counter-clockwise direction (D2) to extend the shade off the back of the roller 242.

As shown in FIG. 45, the screw limit nut 205 contains a knuckle 524 (also referred to as an apex) that is disposed on an outward-facing surface 526 of the ring 508. The knuckle may be, for example, a bump, protrusion, extension, surface irregularity, surface portion with increased frictional properties, or the like. Functionally, the knuckle physically engages the protrusion 30 and holds (for instance under a compressive force if the knuckle is a bump, or frictional force if the knuckle is a surface portion with increased surface friction) the screw limit nut from rotating under the bias force of the counter-balancing unit(s) (i.e. motor(s)). As the screw limit nut 205 reaches its outermost point of travel along the threaded portion 502 of the post 208, the knuckle 524 on the screw limit nut 205 makes contact with the protrusion 430. Once the knuckle 524 and the protrusion 430 make contact, the screw limit nut 205 may move into an over-travel region where friction or other mechanical forces between the knuckle 524 and the protrusion 430 may inhibit the rotation of the screw limit nut in the inward direction (retraction of shade) without being physically urged by a user to disengage the knuckle 524 from the protrusion 430. Movement of the screw limit nut 205 into the over-travel region may correspond to the user rotating the end rail 234 in order to cause the vanes to move to a generally horizontal position, and thus open the shade 236. This engagement between the knuckle 524 and the protrusion 430 is illustrated in greater detail in FIGS. 46-49D, where the knuckle is in the form of a bump or protrusion.

Figure 49A:
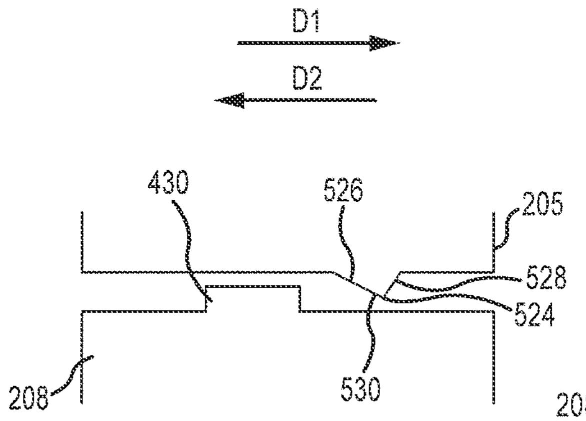
FIGS. 49A-49D are schematic representations of the engagement of a portion of the screw limit nut and a protrusion forming part of the vane orientation stop configuration of FIG. 46.

FIGS. 49A-49D are schematic illustrations of the engagement between the screw limit nut 205 and the protrusion 430 disposed on the surface of the post 208. FIGS. 49A through 49D illustrate the movement of the screw limit nut 205 as the screw limit nut 205 is rotated by the rotation of the roller in the second rotational direction D2 (extension of shade). The shade, with reference to FIG. 49A, at this point is in its fully extended position, and the vanes are closed, such as in FIG. 9. To actuate the vanes to open either partially or fully, the roller 242 must be further rotated to cause the front and rear sheets to separate and extend the vanes. To make this happen, the bottom rail may be rotated to pull the rear edge of the bottom rail 34 downwardly (in FIG. 9, the rear edge is oriented upwardly), which rotates the roller 242 further in the D2 direction (to extend the shade off the back of the roller). As the screw limit nut 205 is further rotated in the rotational direction D2 by pulling down on the rear edge of the bottom rail, the knuckle 524 comes into operative contact with the protrusion 430, which indicates that the shade is at or near the fully extended position. As can be seen in FIG. 49A, the knuckle 524 includes a sloped engagement surface 526 that is disposed in a location such that the engagement surface 526 makes initial contact with the protrusion 430. The engagement surface 526 slopes outwardly from a surface of the screw limit nut 205 to a point 530. The knuckle additionally includes a more steeply sloped rear surface 528. As can be seen in FIG. 49A, the rear surface 528 and the engagement surface 526 meet at the point 530, which is set off a distance from the surface of the screw limit nut 205.

Figure 49B:
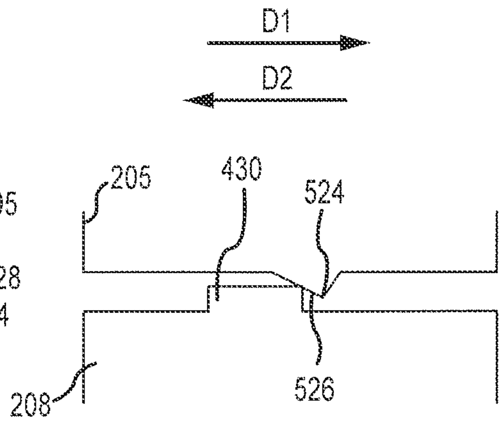

In FIG. 49B, the screw limit nut 205 is rotated along the rotational direction D2 such that the engagement surface 526 comes into an initial contact with the protrusion 430. The orientation of the knuckle 524 and the protrusion 430 shown in FIG. 49B may correspond to the shade being fully extended as shown in FIG. 30.

Figure 49C:
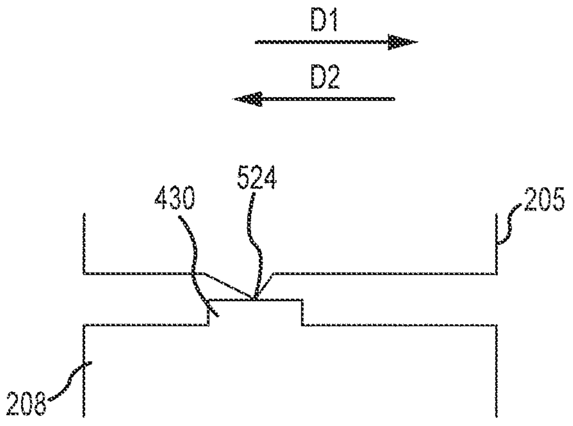

From the position shown in 49B, the user may rotate the end rail 324 such that the screw limit nut 205 moves into an over-travel region, which is shown in FIGS. 49C and D. In so doing, the user may open the veins 246 of the shade 236. As can be seen in FIG. 49C, when the user rotates the lower rail 234 the knuckle 524 moves over the top of the protrusion 430. In this position, the friction or other mechanical forces between the knuckle 524 and the protrusion 430 may inhibit the screw limit nut 205 from moving off of the protrusion 430 by a rotation in the first rotational direction D1 under the bias of the counter-balancing spring motor. Accordingly, the friction or other mechanical forces hold the screw limit nut 205 in place against the force exerted by the counter-balancing spring motor 204 which might otherwise move the roller 242 and thus screw limit nut 205. This position of the knuckle 524 relative to the protrusion 430, held in place by the friction or compression force or both between the two, may orient the vanes in a position where they are partially open, meaning the vanes are angled between generally vertical (closed) and generally horizontal (fully open), such as in FIG. 7C. In this position, the protrusion 430 may deflect, or the screw limit nut 205 may deflect, or the knuckle may compress, or a combination of one or more of these mechanisms may occur, to allow the knuckle to rest on top of the protrusion 430 and be under a compressive or frictional load.

Figure 49D:
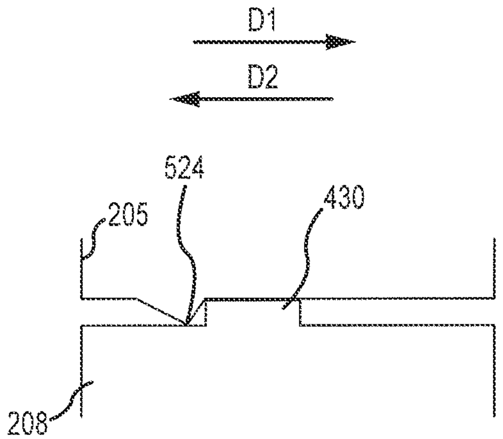

In FIG. 49D, the screw limit nut 205 is moved further along in the over-travel region such that the point 530 of the knuckle 524 passes over the protrusion 430 such that the rear surface 528 of the knuckle 524 comes to rest on the opposite side of the protrusion 430. Again, to allow the knuckle to pass over the protrusion 430, the protrusion 430 may deflect, or the screw limit nut 205 may deflect, or the knuckle may compress, or a combination of one or more of these mechanisms may occur, to allow the knuckle to pass over the protrusion 430. In this position, the vanes are more open they would be in FIGS. 49C, and may be open to a full extent where the vanes are approximately horizontal (such as in FIG. 7B).

Figure 51:
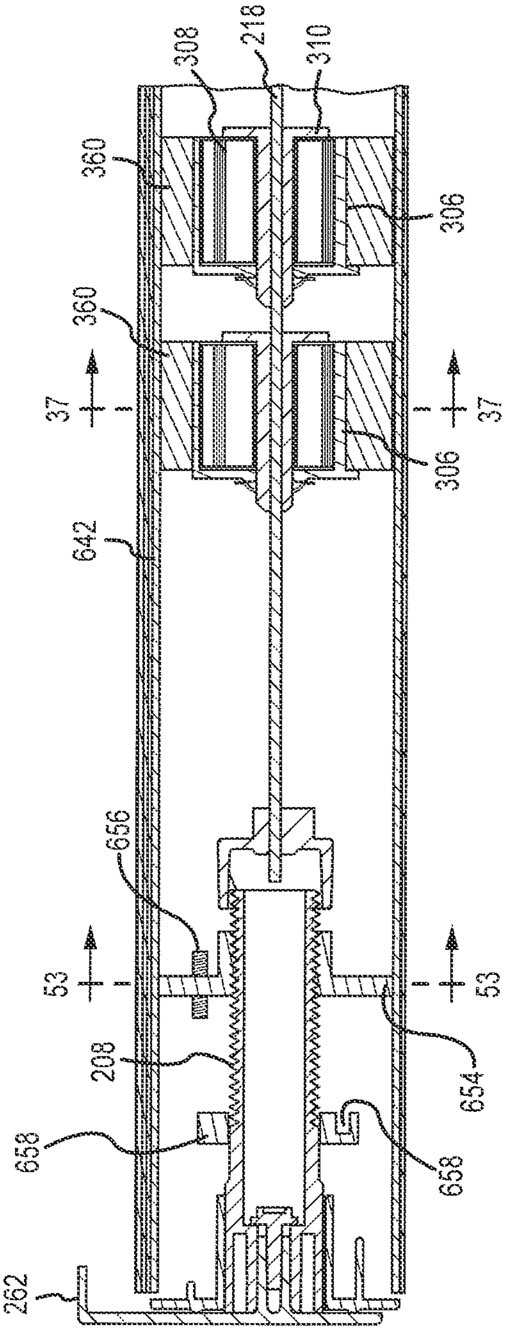
FIG. 51 is a representative section of the roller tube, the drive mechanism and counter balancing units shown in FIG. 50.
Figure 52:
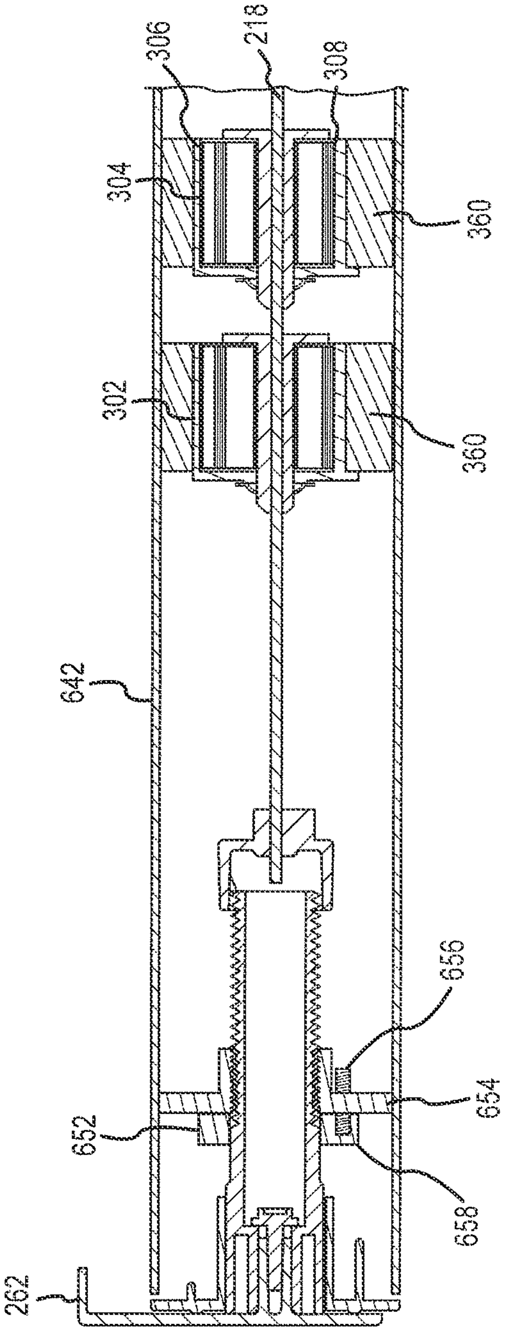
FIG. 52 is a representative section similar to that of FIG. 51, wherein the vane orientation limit stop is positioned to one end.

FIG. 50 illustrates an alternative example for the orientation stop mechanism 650. As can be seen in FIG. 50, an orientation stop mechanism 650 may include a screw limit nut 654 provided in association with a collar 652. Both the collar 652 and the screw limit nut 654 are adapted to be received on the threaded portion of the post 208 as shown in FIGS. 51 and 52. FIG. 51 is a cross-sectional view that substantially corresponds to a cross section taken along the line 32 shown in FIG. 29. FIG. 52 is a cross-sectional view that substantially corresponds to a cross section taken along the line 33 shown in FIG. 30. In accordance with embodiments discussed herein, the screw limit nut 654 and the collar 652 employ a detent structure that holds the screw limit nut 654 in place at or near its furthest most point of travel along the threaded portion of the post 208, which is generally where the shade is fully extended. In one embodiment, such as that shown in FIG. 51, the detent structure includes a pin 656 mounted on the screw limit nut 654. The pin 656 is adapted to be received in the groove 658, which is disposed on the inward facing surface of the collar 652. The collar 652 is positioned on the post 208 such that the pin 656 reaches the groove 658 when the screw limit nut is at a position corresponding to the shade 236 being fully extended. This position of the screw limit nut 654 can be seen in FIG. 52. In FIG. 52, the pin 656 is received within the groove 658 and the end of the pin 656 engages the bottom of the groove 658, such that a frictional force, or compressive force, or both, is created. In this position the screw limit nut 654 is inhibited by the friction or compressive force from rotating in the rotational direction D1 under the bias of the counter-balancing units, such that the screw limit nut 654 would move in the inward direction away from the end cap 262. Here, the screw limit nut 654 is held in place against the force of the spring motors 604 which might otherwise move the screw limit nut 654 by rotating the roller 642. To move the pin into the position shown in FIG. 52, the rear edge of the bottom rail is moved downwardly, as described above, to further rotate the roller in the extension direction, and cause the vanes to at least partially open (depending on how much further the roller is rotated by the actuation of the rear edge of the vane).

Figure 58:
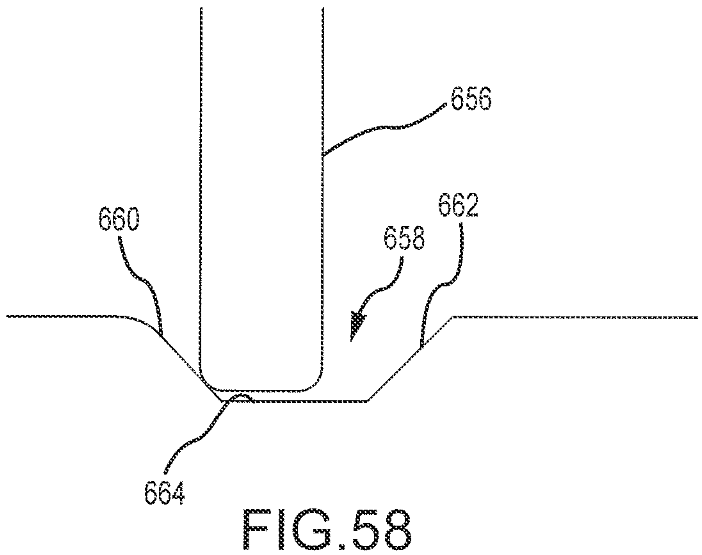
FIG. 58 is a schematic representation of a pin having engaging a detent recess formed on a portion of the collar of FIG. 57.
Figure 59:
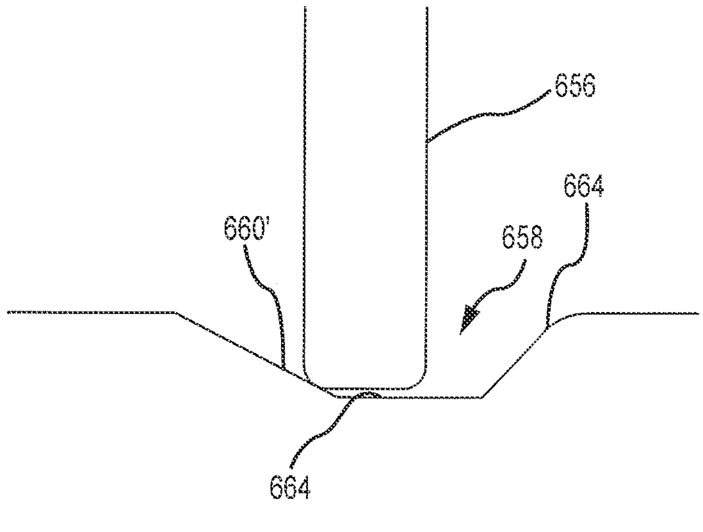
FIG. 59 is a schematic representation of another example of pin engaging a detent recess formed on a portion of the collar of FIG. 57.
Figure 60:
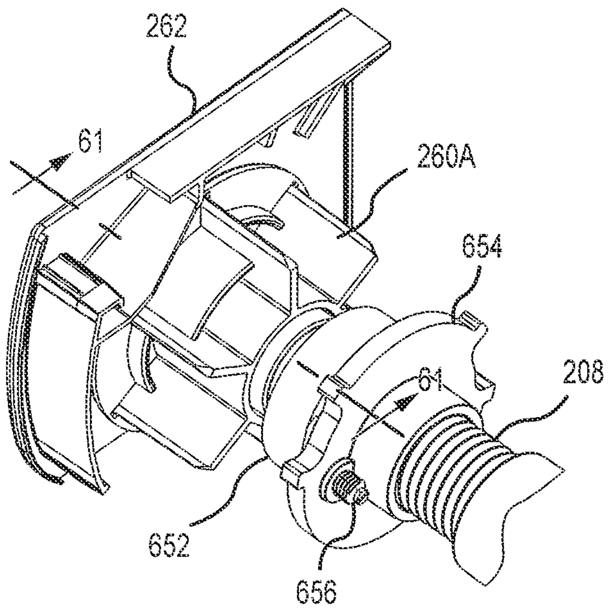
FIG. 60 is a perspective view of a shade having another example of a vane orientation limit stop, and having part of the shade cut away.
Figure 61:
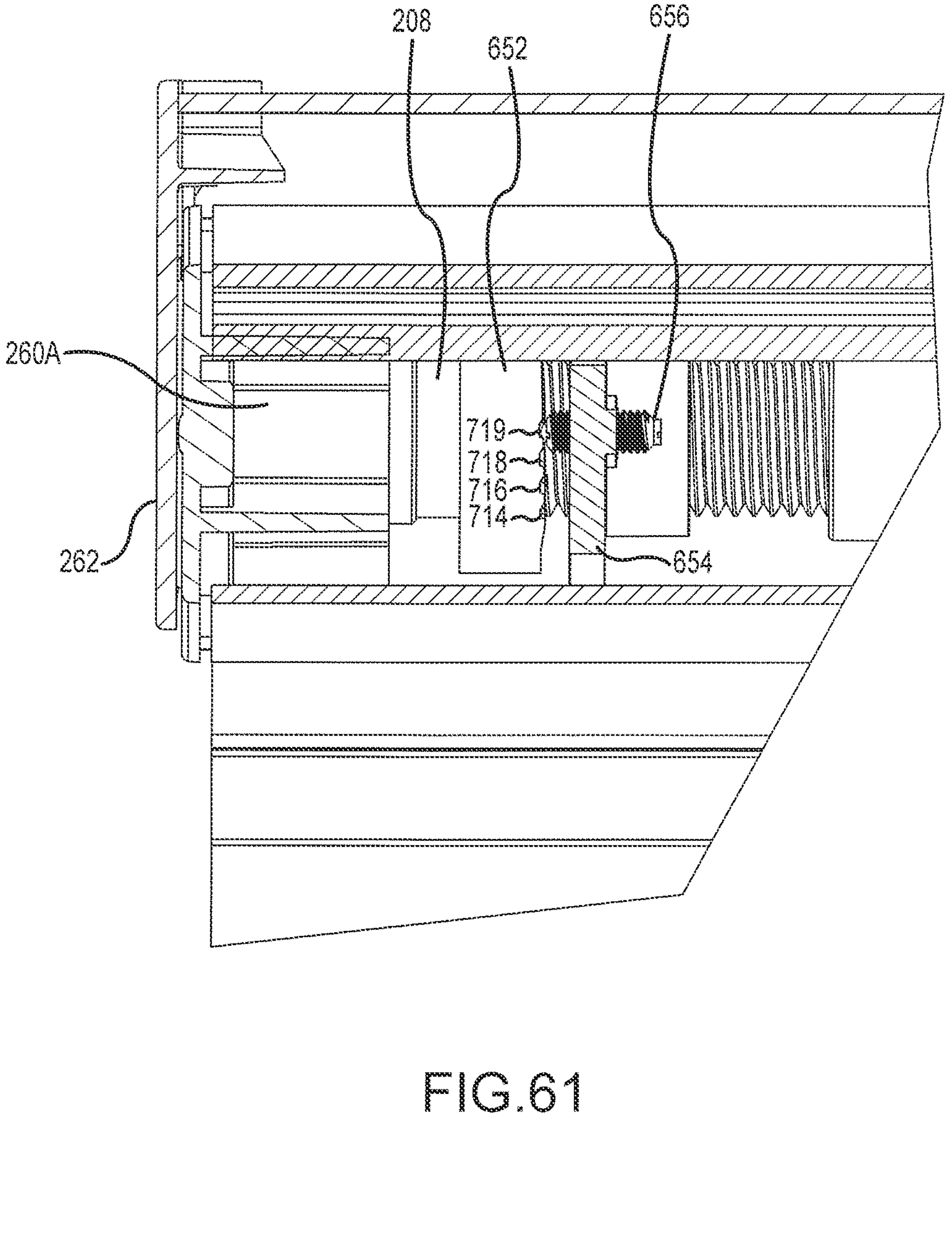
FIG. 61 is an enlarged section view taken along line 61-61 of FIG. 60.

Turning now to FIGS. 58 and 59, which are close ups of the pin 656 and groove 658, and schematically illustrate the entry and exit wall angles of the groove 658. The schematic sections 58 and 59 are representative of sections taken along a circumferential line passing through the groove 658 and extending orthogonally with the plane of FIG. 52. As shown in FIG. 58, the groove 658 includes a bottom surface 664, which is bounded on each side by sloped walls of the groove 658. As shown in FIG. 58, the groove 658 includes an entry wall 662 which the pin 656 passes and may contact when it first enters the groove 658. The groove 658 additionally includes an exit wall 660 opposite from the entry wall 662. The pin 656 passes along, and possibly engages, the exit wall 660 when the pin moves into the groove 658 as the screw limit nut 654 further rotates. In the embodiment shown in FIG. 58 the exit wall 660 and the entry wall 662 have substantially the same slope. In this embodiment, the groove 658 is configured to have a similar feel when the screw limit nut 654 is rotated such that the pin 656 either enters or exits the groove 658. As the screw limit nut 654 is rotated and moves both axially closer to the collar 652 and rotates relative to the collar, the pin 656 moves further towards the collar 652 and engages the collar on the leading side of the groove, or may be received in the groove to contact its side or bottom walls to inhibit the rotation of the nut 654 under the force of the counter-balance units.

In an alternative embodiment show in FIG. 59, the groove 658 includes an exit wall 660 having a differing slope from the entry wall 664. In this configuration the groove 658 produces a different tactile feel when the pin 656 enters the groove 658 in comparison to when the pin 656 exits the groove 658.

Figure 62:
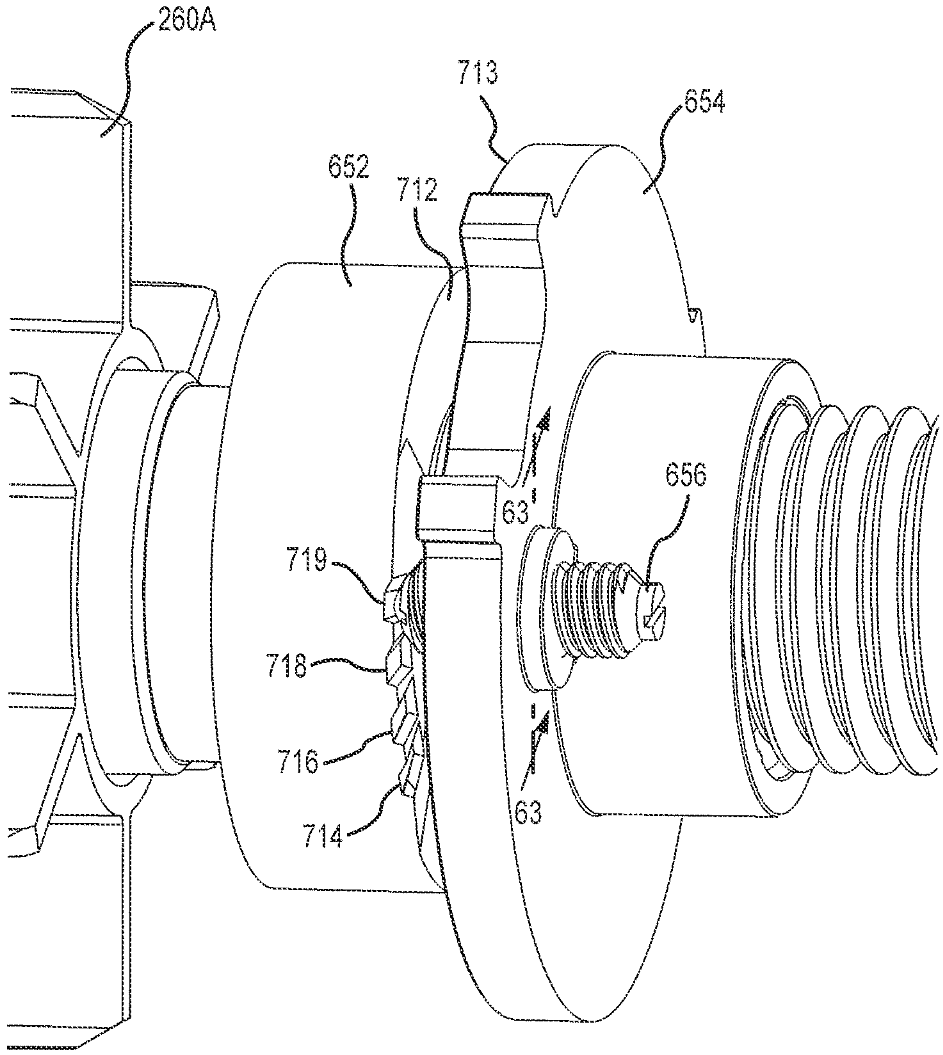
FIG. 62 is an enlarged partial view of the vane orientation stop structure of 61 with the pin engaging a recess.
Figure 63:
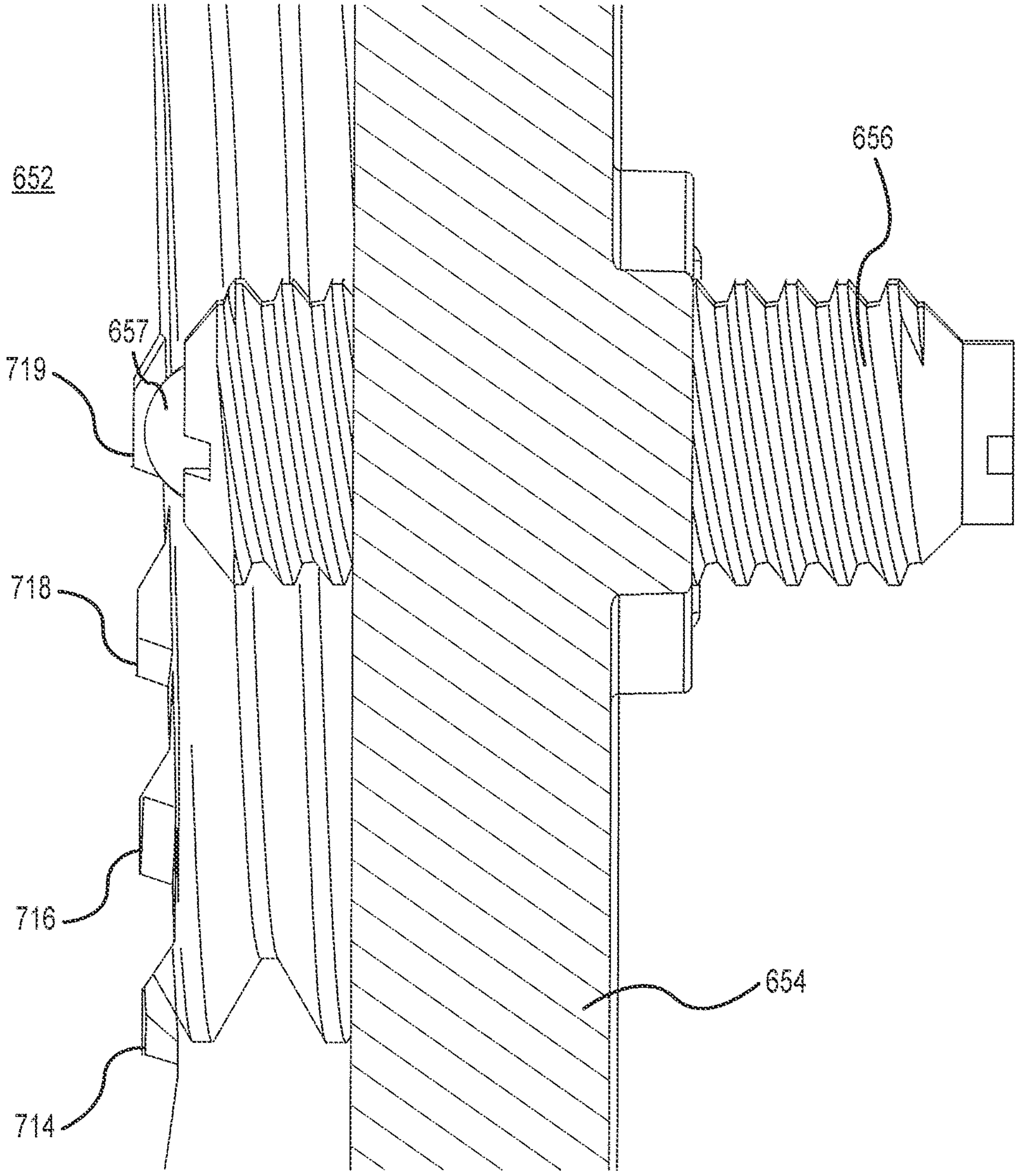
FIG. 63 is a section view taken along line 63-63 of FIG. 62.
Figure 64:
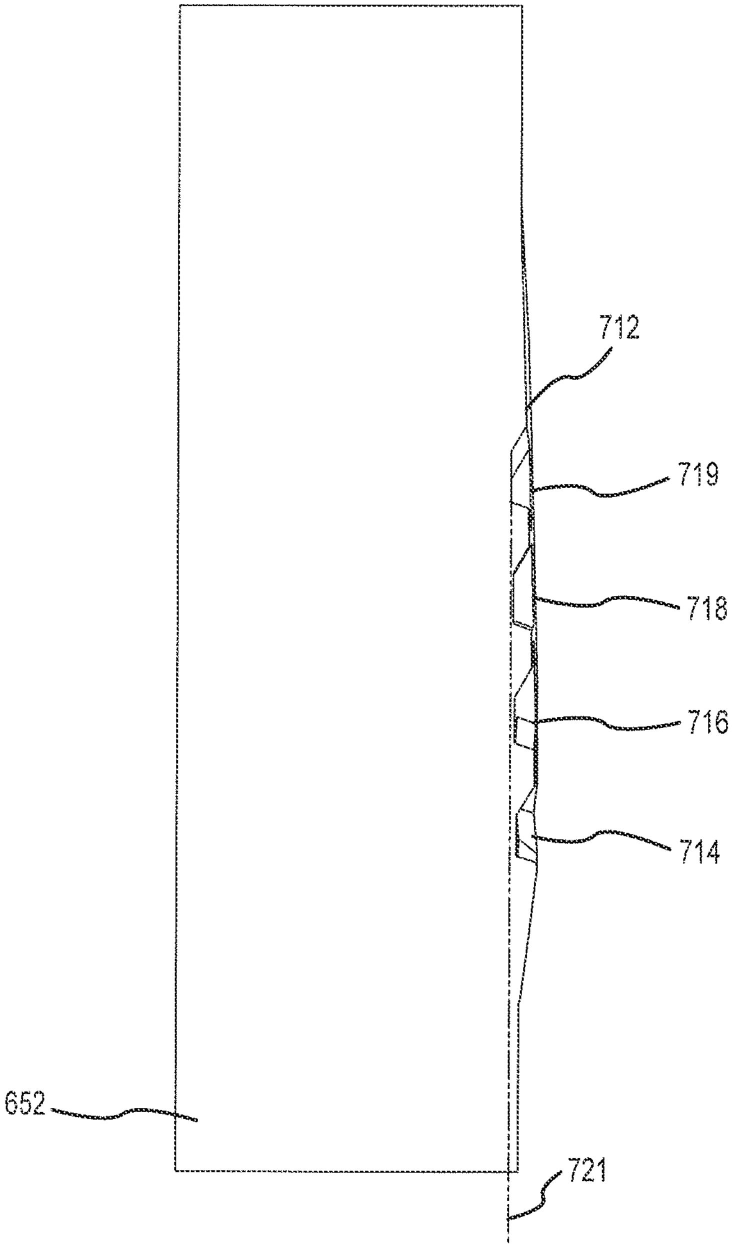
FIG. 64 is a plan view of a collar having recess structures for the detent engagement of a vane orientation limit stop, and showing the angle on the face of the collar.

In accordance with additional examples shown in FIGS. 60-64, the detent structure may include a number of grooves disposed on a sloped surface such that the pin 656 may engage one or a number of grooves as it rotates and moves along the threaded portion of the post 208 closer to the collar 652 while rotating relative to the collar 652. As can be seen in FIG. 62, the collar 652 may include a sloped surface 712 having a first groove 714, second groove 716, third groove 718 and a fourth groove 719. The surface 712 circumferentially slopes gradually away from the nut 654 in the clockwise direction, as represented in FIG. 64. Note the diminishing distance between the dashed line 721 and the base of each successive groove 714, 716, 718, and 719. This results in the actuator pin 656 entering and exiting each successive groove 714, 716, 718, 719 with the same force and tactile feel compared to a face 712 that was perpendicular to the threaded post 208. This is because as the nut 654 turns around the threaded post 208, it moves close to the nut 654, and the engagement with each successive groove and related entry and exit walls would be more forceful. Alternatively, with a little less modulation of the tactile feel, if each successive groove was deeper than the previous one, or the localized area around each successive groove was removed to move it slightly away from the nut 654 as the nut moved axially toward the collar, a similar effect can be created to modulate or even-out the tactile feel of the pin entering and exiting the successive grooves.

Continuing with FIG. 62, as the screw limit nut 654 is rotated in the second rotational direction D2 (to extend the shade) and reaches the point of fullest extension, the pin 656 disposed on the screw limit nut 654 engages the grooves

714, 716, 718, 719 successively as the screw limit nut rotates relative to the collar 652 (such as by moving the rear edge of the bottom rail downwardly). The different grooves provide individual stopping points for the screw limit nut 654 such that the vanes of the shade 236 are held in various degrees of openness and the veins 246 let through variable amounts of light. For instance, if the pin were positioned in groove 714, the vanes would be slightly opened (i.e. between the positions shown in FIG. 9 and FIG. 7*c*, more vertical than horizontal). If the pin was positioned in groove 716, the vanes would be opened more than if the pin was in groove 714 (such as in FIG. 7*c*). If the pin were positioned in groove 718, the vanes would be more opened (closer to horizontal, such as between FIGS. 7*c* and 7*b*) than if the pin were in groove 716. If the pin were positioned in groove 719, the vanes would be more opened than if the pin were positioned in groove 718 (substantially horizontal, such as in FIG. 7*b*). Note that the pin in this example may be spring loaded to resiliently move axially into or toward the nut 654, which resilient axial motion would make the movement of the pin into and out of the groove less vigorous feeling than if the pin was solid and not axially movable. Additionally, the pin in FIGS. 60-64 may include a spherical tip 657 which is spring loaded relative to the pin 656. The spherical outer shape of the ball 657 would smooth out the tactile feel of the pin entering and exiting each groove 714, 716, 718, and 719. The spring-loaded ball 657 would even further reduce and control the abruptness of the tactile feel. The spring-loaded engagement of the ball 657 within any of the grooves would still, however, resist the rotation of the nut relative to the collar under the bias force of the counter-balance unit. The spring loaded tip is not required to be spherical, but instead may be square, cylindrical, oval, or some other shape that would ride into and out of a groove as described herein and maintain sufficient engagement to resist the retraction force created by the counter-balance units.

Figure 65:
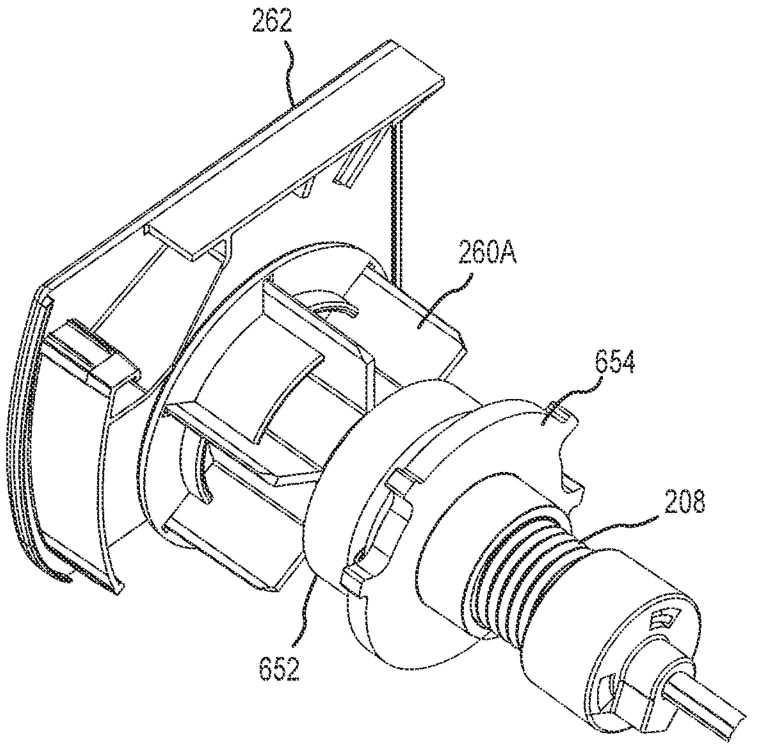
FIG. 65 is a perspective view of a shade having another example of a vane orientation limit stop, and having part of the shade cut away.
Figure 66:
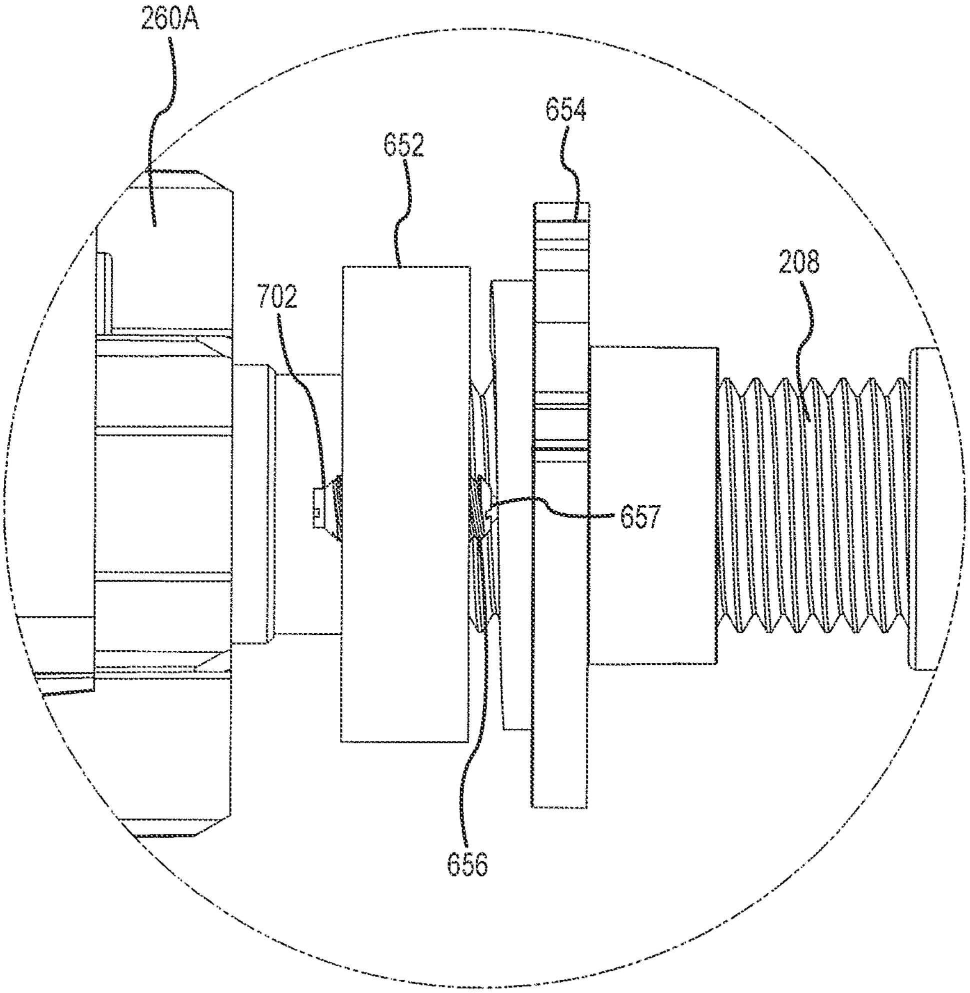
FIG. 66 is an enlarged view of the vane orientation stop mechanism of FIG. 65.
Figure 67:
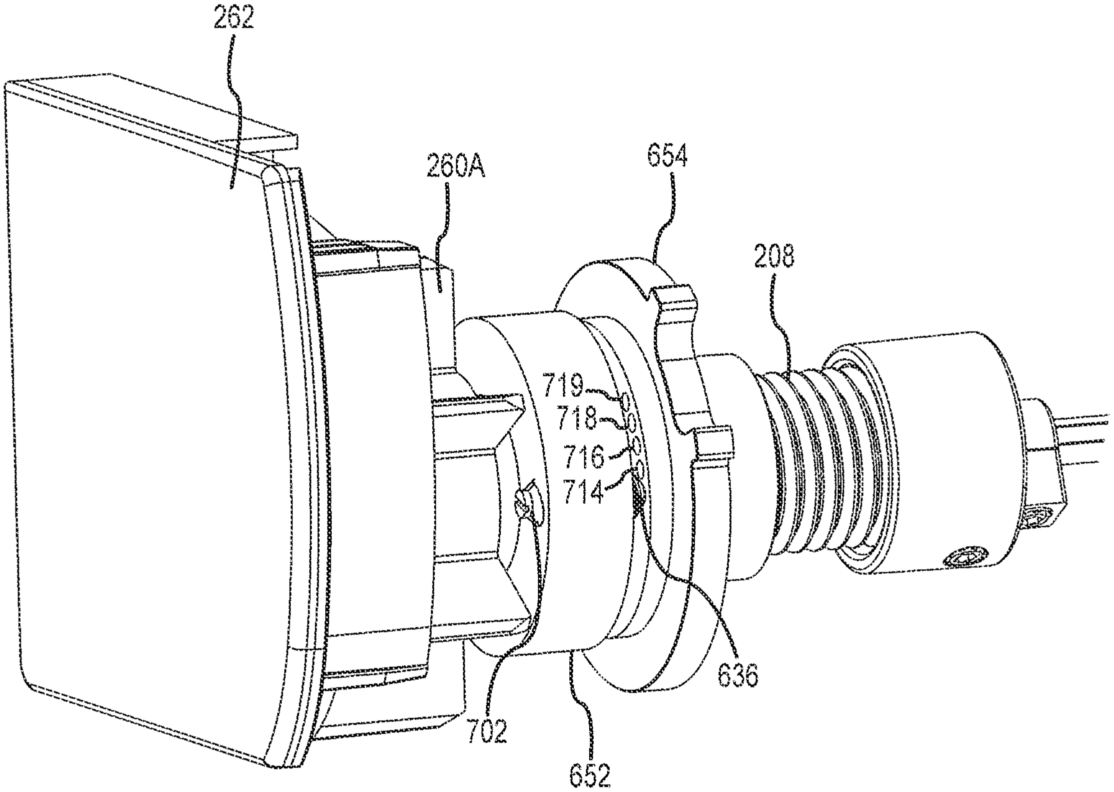
FIG. 67 is a reverse angle perspective of the vane orientation limit stop mechanism of FIG. 66.

As shown in FIGS. 60-64, the detent structure includes a pin 656 disposed on the screw limit nut 654 and grooves 714, 716, 718, and 719 disposed on the collar 652. FIGS. 65¬67 illustrate an alternative embodiment for the detent structure that includes a pin 656, which is mounted on the collar 652. Specifically, the pin 656 is disposed through a pinhole, which extends from the outward facing side of the collar to the inward facing side of the collar 652. The pin 656 is secured in place with a nut 702, which is fastened to the first side of the collar 652. The pin 656 disposed on the collar 652 is provided in association with grooves 714, 716, 718, and 719, which are disposed on the screw limit nut 654. The pin 656 in this example may include a spring-loaded ball 657 as noted above. As shown in FIGS. 65-67, the collar 652 and the screw limit nut 654 are attached to the post 208. The collar 652 is fixed to the post 208 such that the collar 652 does not move along the length of the post 208. The screw limit nut 654, however, is movable along the threaded portion of the post 208 through engagement between the internal keying structures of the roller 242 and the engagement grooves or threads of the screw limit nut 654.

Figure 68:
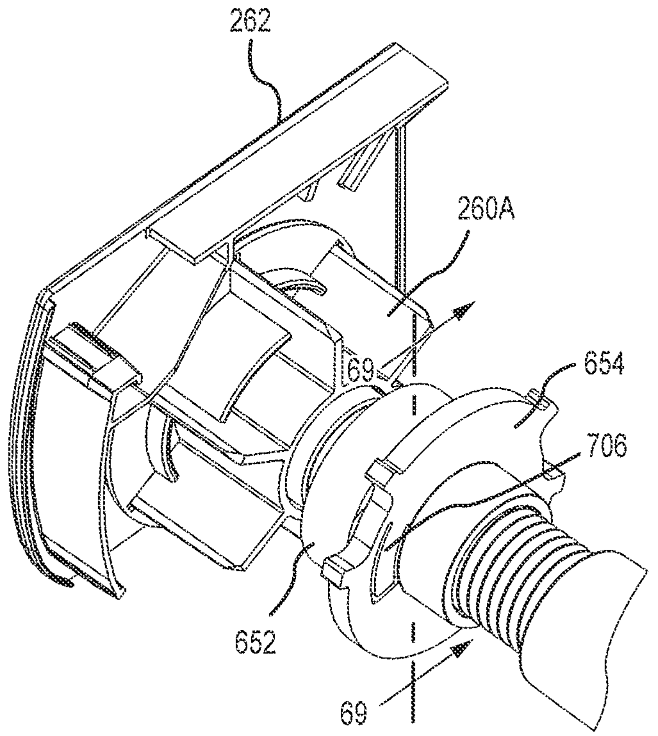
FIG. 68 is a perspective view of a shade having another example of a vane orientation limit stop, and having part of the shade cut away.
Figure 69:
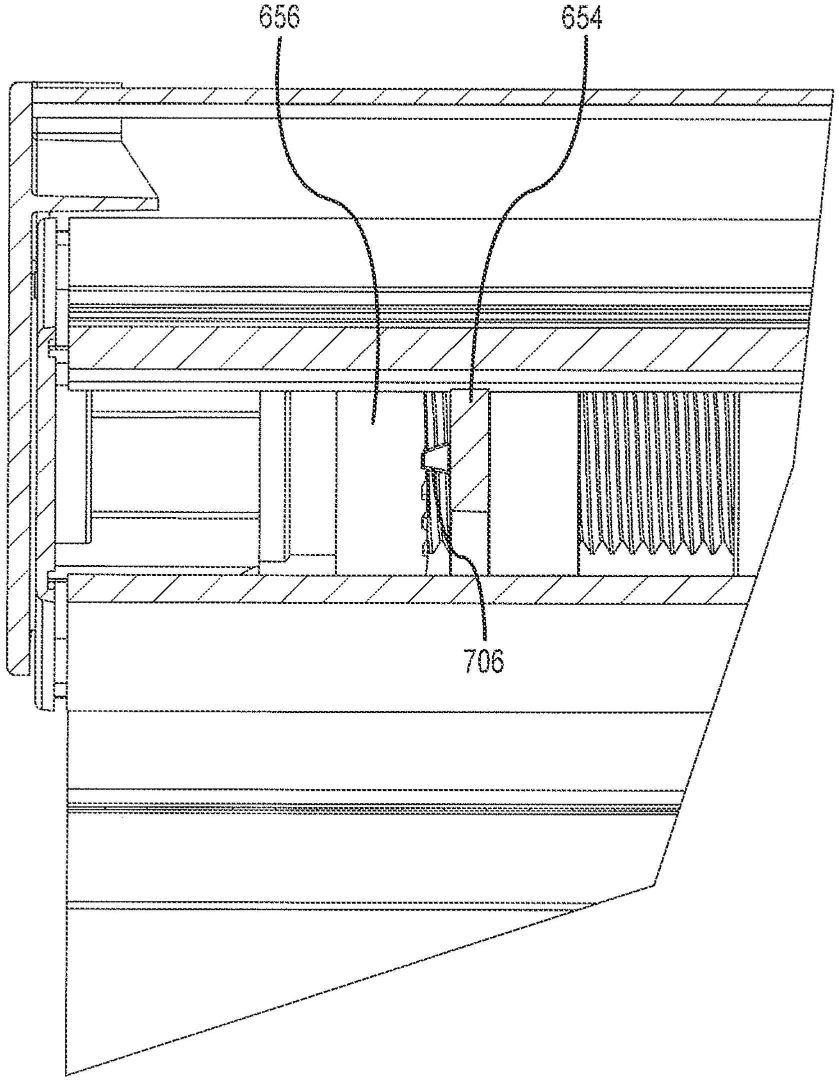
FIG. 69 is a section taken along line 69-69 of FIG. 68.

FIGS. 68-69 are an alternative embodiment for the detent structure. As can be seen in FIGS. 68-69 the detent may include a molded spring 706 which is disposed on, integrally formed with, or mounted on the second surface of the screw limit nut 654. The molded spring may be plastic, or may be made of another material such as metal (in which case it would likely be mounted on the nut 654). The molded spring 706 includes a cantilever arm positioned in a recess formed in the screw limit nut. The arm of the molded spring 706 is in the plane of the facial surface of the screw limit nut nearest the collar. The arm terminates in a protruding peak or other engaging shape (which may be rounded) that extends above the plane of the screw limit nut. As the screw limit nut and the collar come into proximity with one another, the peak engages the facial surface of the collar and the arm flexes to bias the peak against the collar. The peak or other rounded structure is adapted to move into and out of the grooves 714, 716, 718, and 719 under the urging of the flexed arm as the screw limit nut and the collar move relative to one another.

Figure 70:
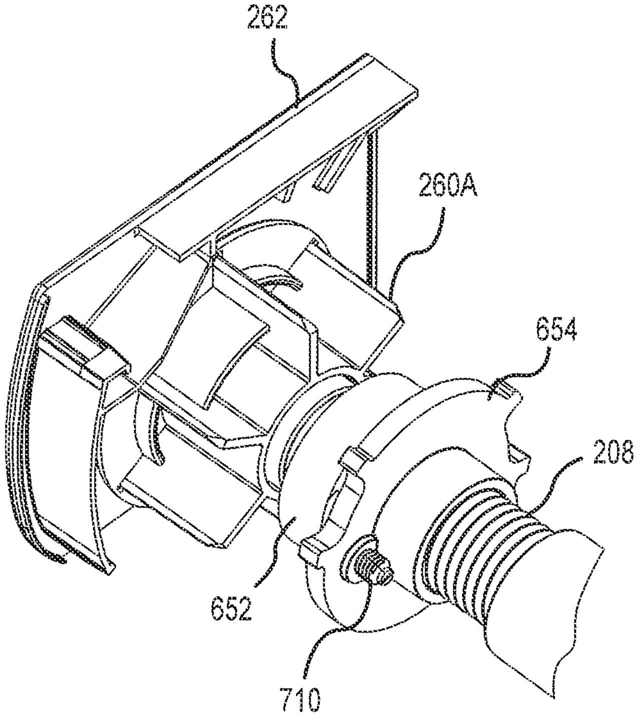
FIG. 70 is a perspective view of a shade having another example of a vane orientation limit stop, and having part of the shade cut away.
Figure 71:
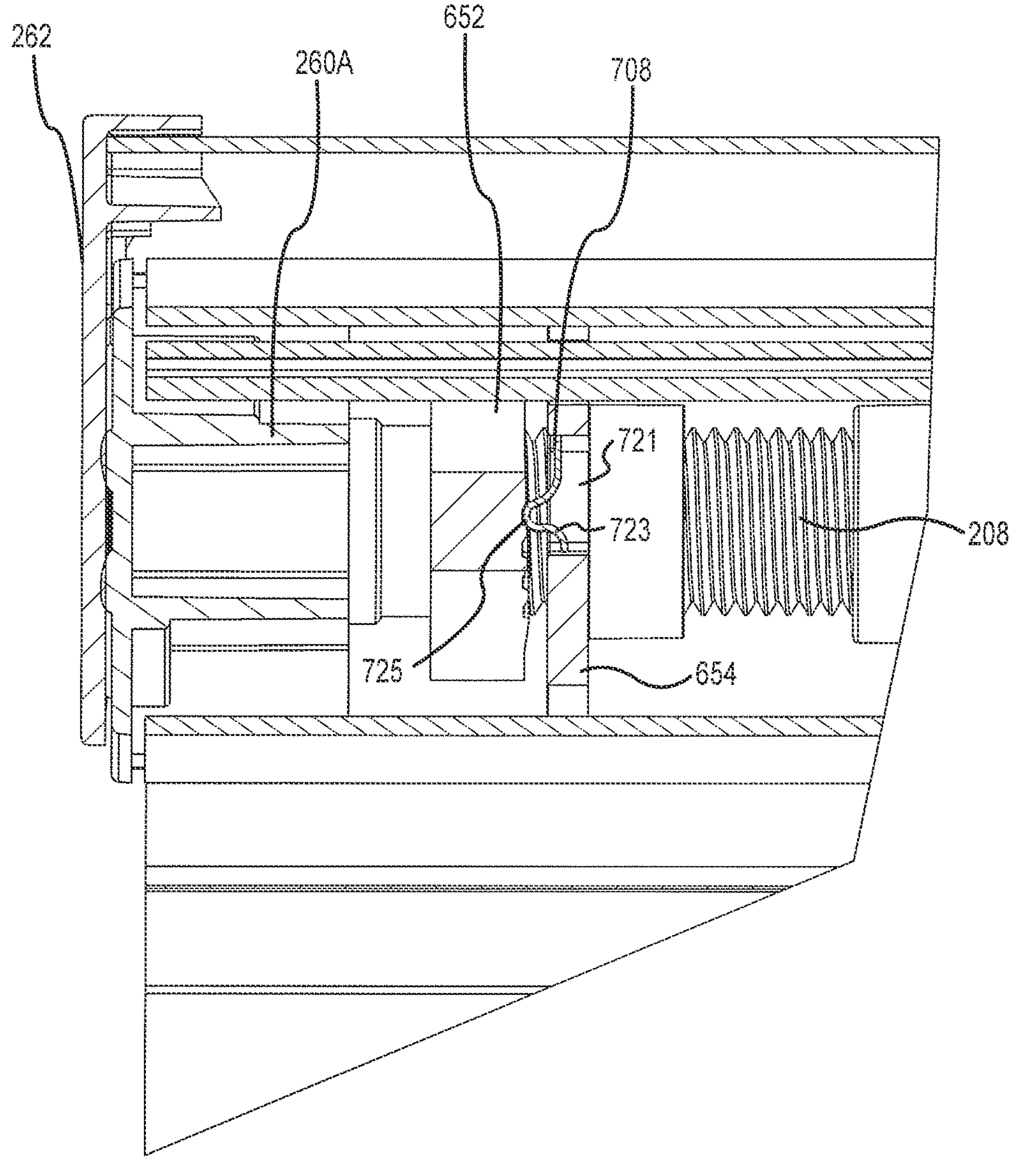
FIG. 71 is a section taken along line 71-71 of FIG. 70.

In accordance with an alternative embodiment, the detent structure may include a leaf spring 708 mounted to the screw limit nut 654, as shown in FIG. 70-71. As can be seen in FIGS. 70-71, the leaf spring 708 is connected at one end, such as in a cantilever fashion, to the screw limit nut 654 so as to flex and resiliently return to its position. The leaf spring is attached to the to the screw limit nut 654 by a screw 710, or by welding, adhesive, epoxy, adhesive, or otherwise attached to the screw limit nut. A recess is formed in the nut 654 below the free end of the leaf spring, and is of sufficient depth to allow the leaf spring to deflect into the recess without having interfering contact with the nut 652. The leaf spring 708 terminates in an end having a pimple 725 or other rounded structure adapted to resiliently engage the grooves 714, 716, 718, and 719 disposed on the collar 652 and resist the bias to retract caused by the counter balancing unit.

A method of using the operating system aspect of the disclosure includes a method for counterbalancing the load of a shade element extending from a roller shade structure comprising the steps of unrolling the shade element to a desired extended position by rotating the roller in a first direction, creating an amount of biasing force in an operating system by rotation of the roller in a first direction, applying the amount of biasing force to the roller in a second direction opposite the first direction, wherein the amount biasing force sufficient to counterbalance the load of the shade element.

The amount of biasing force may be sufficient to maintain the shade in the selected extended position, or it may be less or more than the amount needed to maintain the shade in the selected extended position. Additionally, a predetermined level of friction may be created between components of the operating system, wherein the amount of biasing force in addition to the friction is sufficient to maintain the shade in the selected extended position. The biasing force may be a spring motor, which in turn may be a coil spring or a clock spring.

Further, the shade element may include a shade element extending from a roller shade structure, where the shade element includes a front sheet, a rear sheet, and at least one vane connected along a front edge to the front sheet and along a back edge to a back sheet, where the relative motion of the front and rear sheets move the at least one vane between open and closed orientations. In this case, the method comprises the steps of unrolling the shade element to a fully extended position, with at least one vane in a closed orientation; further rotating the roller in a first direction to cause the front sheet and back sheet to move relatively to orient the at least one vane in an open position; and engaging a vane orientation stop mechanism to overcome the biasing force and hold the roller in position to maintain the open orientation of the at least one vane.

Although the present disclosure has been described with a certain degree of particularity, it is understood the disclosure has been made by way of example, and changes in detail or structure may be made without departing from the spirit of the disclosure as defined in the appended claims.

The foregoing description has broad application. For example, while examples disclosed herein may focus on the particular operating elements and particular spring types and arrangements, vane orientation stop mechanism structures, etc. it should be appreciated that the concepts disclosed herein may equally apply to other structures that have the same or similar capability to perform the same or similar functions as described herein. Similarly, the discussion of any embodiment or example is meant only to be explanatory and is not intended to suggest that the scope of the disclosure, including the claims, is limited to these examples.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The drawings are for purposes of illustration only and the dimensions, positions, order and relative sizes reflected in the drawings attached hereto may vary.

The invention claimed is:

1. A retractable shade comprising:

a rotatable roller having an internal cavity;

a longitudinal member having a longitudinal length that extends at least partially within the internal cavity of the rotatable roller;

a moveable member extending at least partially within the internal cavity of the rotatable roller, the moveable member translatable and non-rotatable with respect to the rotatable roller, and the moveable member further rotatable about and translatable along the longitudinal length of the longitudinal member with a first frictional resistance; and a holding mechanism associated with the moveable member and the longitudinal member wherein an engagement portion of the moveable member is configured to engage a holding portion of the longitudinal member to further increase frictional resistance to; resist while permitting rotation and translation of the moveable member with respect to the longitudinal member with a second frictional resistance greater than the first frictional resistance, and resist rotation of the rotatable roller.

2. The retractable shade of claim 1, wherein the longitudinal member comprises a first thread extending at a first angle along and with respect to the longitudinal length of the longitudinal member, the first thread of the longitudinal member having first and second terminal ends and engageable with a second thread on the moveable member such that the moveable member in response to rotation of said roller rotates with the roller and translates along the longitudinal length of the longitudinal member, the second thread on the moveable member extending at a first angle and having first and second terminal ends.

3. The retractable shade of claim 2, wherein the first thread of the longitudinal member has at or near one of its terminal ends a first knuckle that defines a transition that decreases the first angle of the first thread.

4. The retractable shade of claim 3, wherein the second thread of the moveable member has at or near one of its terminus ends a second knuckle that defines a transition that decreases the first angle of the second thread.

5. The retractable shade of claim 3, wherein the first angle forms a steep angle with respect to the longitudinal length of the longitudinal member.

6. The retractable shade of claim 3, wherein the longitudinal member has at or near one of its terminal ends an end tab wherein the first thread of the longitudinal member extends at a second angle that is less than the first angle of the first thread of the longitudinal member, and the second knuckle has an end tab wherein the second thread of the moveable member extends at a second angle that is less than the first angle of the second thread of the moveable member.

7. The retractable shade of claim 3, wherein the first knuckle of the longitudinal member is shaped the same as the second knuckle of the moveable member.

8. The retractable shade of claim 3, wherein the first knuckle of the longitudinal member and the second knuckle of the moveable member form an over-center-latch that resists movement of the moveable member.

9. The retractable shade of claim 1, wherein said moveable member is keyed to the rotatable roller to rotate with the rotatable roller.

10. The retractable shade of claim 1, further comprising a biasing component operably connected to the rotatable roller and configured to exert a biasing force on the rotatable roller to rotate the rotatable roller in a retraction direction and wherein the holding mechanism is configured to resist rotation of the rotatable roller in the retraction direction.

11. The retractable shade of claim 1, further comprising a shade material operably connected to the rotatable roller, wherein the shade material is wrappable about and unwrappable about the rotatable roller for retraction and extension of the shade material respectively, wherein at an extended position of said shade material from said rotatable roller, the frictional resistance of the holding mechanism between the moveable member and the longitudinal member increases to the second frictional resistance to restrict movement of the rotatable roller in a retraction direction to restrict retraction of said shade material; and rotation of the rotatable roller to retract said shade material disengages the engagement portion of the moveable member from the holding portion of the longitudinal member to permit retraction of the shade material.

12. The retractable shade of claim 1, wherein the holding portion comprises a protrusion and the engagement portion comprises a knuckle wherein forces between the protrusion and the knuckle inhibit the moveable member from disengaging the protrusion.

13. The retractable shade of claim 12, wherein the moveable member is in the form of a collar that rotates about the longitudinal member.

14. The retractable shade of claim 12, wherein the knuckle has a sloped front engagement surface that operatively engages the protrusion.

15. The retractable shade of claim 12, wherein the knuckle has a sloped rear surface, the sloped rear surface being more steeply sloped than the sloped front engagement surface.

16. The retractable shade of claim 1, wherein the holding portion is located at or near an end of the longitudinal member to increase frictional resistance with the moveable member at or near the end of the longitudinal member to resist rotation of the rotatable roller while permitting movement of the moveable member with respect to the longitudinal member.

17. The retractable shade of claim 1, wherein engagement of the holding portion with the engagement portion increases frictional resistance to rotation of the rotatable member while permitting further rotational movement of the rotatable roller in either a retraction or an extension direction.

18. A retractable shade comprising:
- a rotatable roller having an internal cavity;
- a shade material attached to the rotatable roller, wherein rotation of the rotatable roller in a first direction extends the shade material from the rotatable roller, and rotation of said rotatable roller in a second opposite direction retracts the shade material onto the rotatable roller;
- a biasing assembly associated with the rotatable roller to apply a biasing force to said roller in the second opposite direction to retract the shade material onto the rotatable roller;
- a longitudinal member having a longitudinal length that extends at least partially within the internal cavity of the rotatable roller;
- a moveable member extending at least partially within the internal cavity of the rotatable roller, the moveable member moveable along the longitudinal length of the longitudinal member and moveable within the internal cavity of the rotatable roller with a first frictional resistance; and
- a holding mechanism associated with the moveable member and the longitudinal member wherein an engagement portion of the moveable member is configured to engage a holding portion of the longitudinal member to further increase frictional resistance to; resist while permitting rotation and translation of the moveable member with respect to the longitudinal member with a second resistance greater than the first frictional force, and resist rotation of the rotatable roller.

19. The retractable shade of claim 18, wherein the longitudinal member has a first knuckle that defines a transition in a direction of a first thread and the moveable member has a second knuckle that defines a transition in a direction of a second thread, wherein the first knuckle forms the holding portion of the longitudinal member and the second knuckle forms the engagement portion of the moveable member wherein the first knuckle is configured to engage the second knuckle to resist rotation of the rotatable roller.

20. The retractable shade of claim 19, wherein the first knuckle and the second knuckle are configured to form an over-center-latch that resists movement of the rotatable roller.

21. The retractable shade of claim 18, wherein the holding portion comprises a protrusion and the engagement portion comprises an engagement knuckle wherein the protrusion and the engagement knuckle are configured to engage to generate forces between the protrusion and the engagement knuckle to inhibit the moveable member from disengaging the protrusion.

22. The retractable shade of claim 21, wherein the moveable member is in the form of a collar having an internal thread that corresponds with an external thread on the longitudinal member, and the engagement knuckle protrudes from the collar and has a sloped front engagement surface that is configured to operatively engage the protrusion and resist rotatable roller from rotating.

23. The retractable shade of claim 18 wherein the biasing assembly is configured to exert a variable biasing force on the roller in the retraction direction to at least in part counterbalance a weight of that portion of the shade material that is unwrapped from the rotatable roller.

24. The retractable shade of claim 18, wherein the shade material is wrappable about and unwrappable about the rotatable roller for retraction and extension of the shade material respectively, wherein at an extended position of said shade material from said rotatable roller, the frictional resistance of the holding mechanism between the moveable member and the longitudinal member increases to the second frictional resistance to restrict movement of the rotatable roller in a retraction direction to restrict retraction of said shade material; and rotation of the rotatable roller to retract said shade material disengages the engagement portion of the moveable member from the holding portion of the longitudinal member to permit retraction of the shade material.

25. The retractable shade of claim 18, wherein the longitudinal member comprises a first thread extending at a first angle along and with respect to the longitudinal length of the longitudinal member, the first thread of the longitudinal member having first and second terminal ends and engageable with a second thread on the moveable member such that the moveable member in response to rotation of said roller rotates with the roller and translates along the longitudinal length of the longitudinal member, the second thread on the moveable member extending at a first angle and having first and second terminal ends.

26. The retractable shade of claim 25, wherein the first thread of the longitudinal member has at or near one of its terminal ends a first knuckle that defines a transition that decreases the first angle of the first thread.

27. The retractable shade of claim 26, wherein the second thread of the moveable member has at or near one of its terminus ends a second knuckle that defines a transition that decreases the first angle of the second thread.

28. The retractable shade of claim 26, wherein the first angle forms a steep angle with respect to the longitudinal length of the longitudinal member.

29. The retractable shade of claim 18, wherein the holding portion is located at or near an end of the longitudinal member to increase frictional resistance with the moveable member at or near the end of the longitudinal member to the second frictional resistance, wherein the increased frictional resistance to the second frictional resistance increases resistance to rotation of the rotatable roller while permitting movement of the moveable member with respect to the longitudinal member.

30. The retractable shade of claim 18, wherein engagement of the holding portion with the engagement portion increases frictional resistance to the second frictional resistance resists rotation of the rotatable member while permitting further rotational movement of the rotatable roller in either a retraction or an extension direction.

31. A retractable shade comprising:
- a rotatable roller having an internal cavity;
- a shade material attached to said roller, wherein rotation of said rotatable roller in a first direction extends the shade material from the rotatable roller, and rotation of the rotatable roller in a second opposite direction retracts the shade material onto the rotatable roller, the shade material comprising at least one vane configured to transition from a closed position to an open position when substantially the entire shade is extended from the rotatable roller;
- a longitudinal member having external threads extending at least partially within the internal cavity of the rotatable roller;
- at least one biasing member positioned at least partially within the internal cavity of the rotatable roller;

a movable member having internal threads for engaging the external threads of the longitudinal member, wherein said movable member is mounted on said longitudinal member such that the movable member translates along the longitudinal member during rotation of the rotatable roller to vary a biasing force provided to said roller by the biasing member; and a vane orientation holding mechanism associated with the moveable member and configured to hold the at least one vane in the open position, wherein the moveable member comprises an engagement portion configured to increase frictional resistance to inhibit rotation of the rotatable roller to hold the at least one vane in the open position.

* * * * *